US009205766B2

(12) United States Patent
Yamada et al.

(10) Patent No.: US 9,205,766 B2
(45) Date of Patent: Dec. 8, 2015

(54) VEHICLE SEAT OPERATING DEVICE

(71) Applicant: Aisin Seiki Kabushiki Kaisha, Kariya-shi (JP)

(72) Inventors: Yukifumi Yamada, Toyota (JP); Naoki Goto, Tokai (JP)

(73) Assignee: AISIN SEIKI KABUSHIKI KAISHA, Kariya-shi (JP)

( * ) Notice: Subject to any disclaimer, the term of this patent is extended or adjusted under 35 U.S.C. 154(b) by 0 days.

(21) Appl. No.: 14/217,706

(22) Filed: Mar. 18, 2014

(65) Prior Publication Data

US 2014/0284983 A1    Sep. 25, 2014

(30) Foreign Application Priority Data

Mar. 22, 2013    (JP) .................. 2013-059885

(51) Int. Cl.
    *B60N 2/20* (2006.01)
    *B60N 2/235* (2006.01)

(52) U.S. Cl.
    CPC .............. *B60N 2/2356* (2013.01); *B60N 2/235* (2013.01); *B60N 2/2358* (2013.01)

(58) Field of Classification Search
    CPC ..... B60N 2/2356; B60N 2/2358; B60N 2/235
    USPC ......... 297/331, 378.12, 378.14, 367 R, 367 P, 297/367 L
    See application file for complete search history.

(56) References Cited

U.S. PATENT DOCUMENTS

| | | | |
|---|---|---|---|
| 6,773,068 B2* | 8/2004 | Shinozaki ................. | 297/331 X |
| 6,908,155 B1* | 6/2005 | Wieclawski ......... | 297/378.12 X |
| 7,252,320 B2* | 8/2007 | Tsujibayashi et al. ... | 297/378.14 X |
| 7,614,701 B2* | 11/2009 | Liang et al. .............. | 297/378.12 |
| 7,661,760 B2* | 2/2010 | Nakaya et al. ....... | 297/378.12 X |
| 7,695,058 B2* | 4/2010 | Satta et al. ................. | 297/331 X |
| 8,141,930 B2* | 3/2012 | Sayama ............... | 297/378.12 X |
| 8,186,753 B2* | 5/2012 | Fujisawa et al. .......... | 297/331 X |
| 8,465,096 B2* | 6/2013 | Sayama .................. | 297/378.14 |
| 8,534,750 B2* | 9/2013 | Sayama ............... | 297/378.12 X |
| 8,985,690 B2* | 3/2015 | Yamada et al. ...... | B60N 2/2358 297/367 L X |
| 9,056,566 B2* | 6/2015 | Nagura ................ | B60N 2/2356 297/367 P |
| 2006/0066144 A1* | 3/2006 | Tsujibayashi et al. ... | 297/378.14 |
| 2006/0214477 A1* | 9/2006 | Fukada et al. ............ | 297/331 X |

(Continued)

FOREIGN PATENT DOCUMENTS

| | | |
|---|---|---|
| DE | 20 2005 013 621 U1 | 2/2007 |
| DE | 10 2005 059 473 A1 | 6/2007 |
| JP | 2004-50868 | 2/2004 |

(Continued)

OTHER PUBLICATIONS

Extended European Search Report issued Aug. 28, 2014, in Patent Application No. 14157763.5.

*Primary Examiner* — Rodney B White

(74) *Attorney, Agent, or Firm* — Oblon, McClelland, Maier & Neustadt, L.L.P.

(57) ABSTRACT

A vehicle seat operating device includes: an input side member that performs an operation input; an output side member that is moved based on an operation of the input side member to operate a seat adjustment mechanism; and a speed change mechanism that changes a rate of change of a movement amount of the output side member with respect to an operation amount of the input side member according to an operation position of the input side member.

9 Claims, 32 Drawing Sheets

(56) References Cited

U.S. PATENT DOCUMENTS

2008/0203794 A1    8/2008    Steffen et al.
2011/0018326 A1*    1/2011    Sayama .................. 297/378.14

FOREIGN PATENT DOCUMENTS

| | | |
|---|---|---|
| JP | 2007-144131 | 6/2007 |
| WO | WO 2012/062357 A1 | 5/2012 |

* cited by examiner

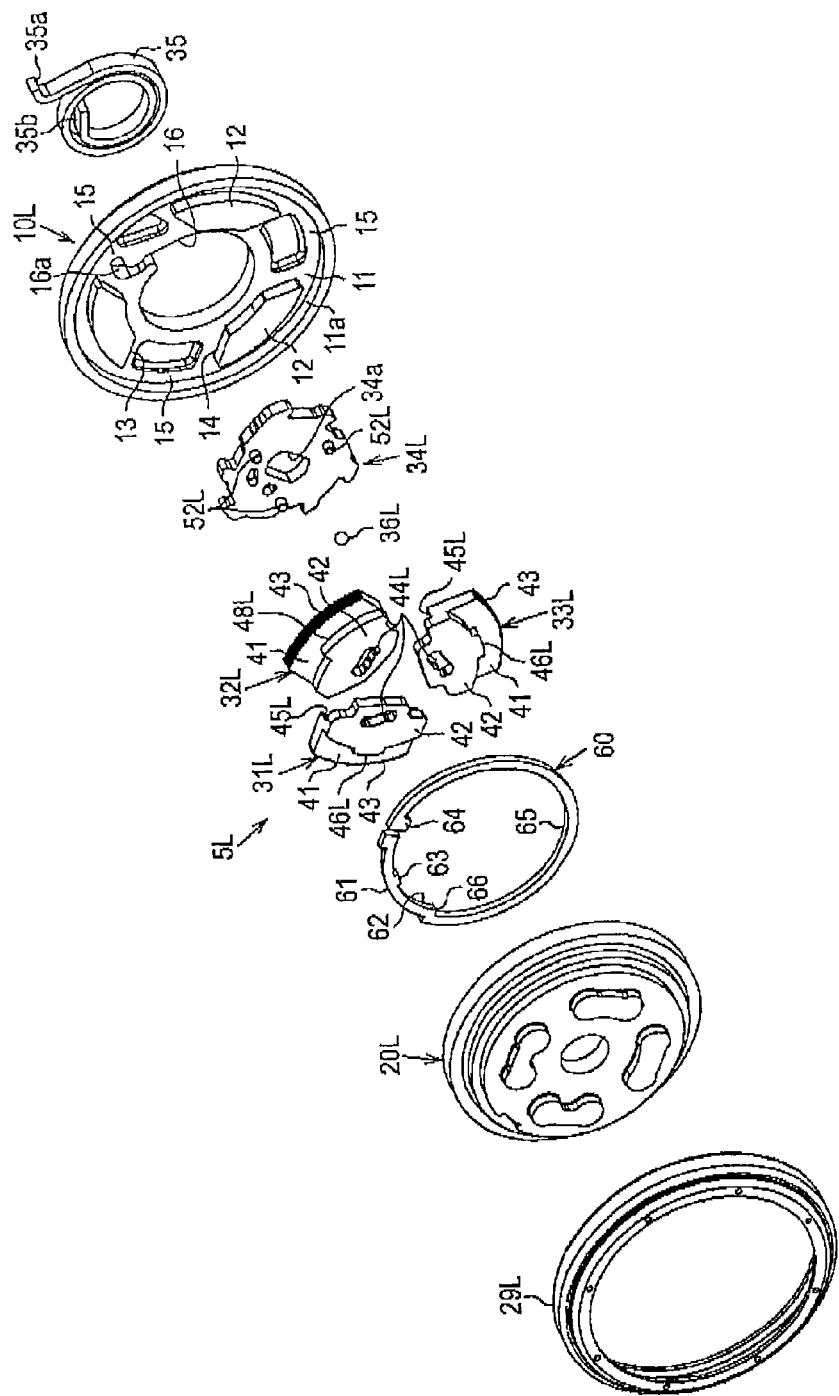

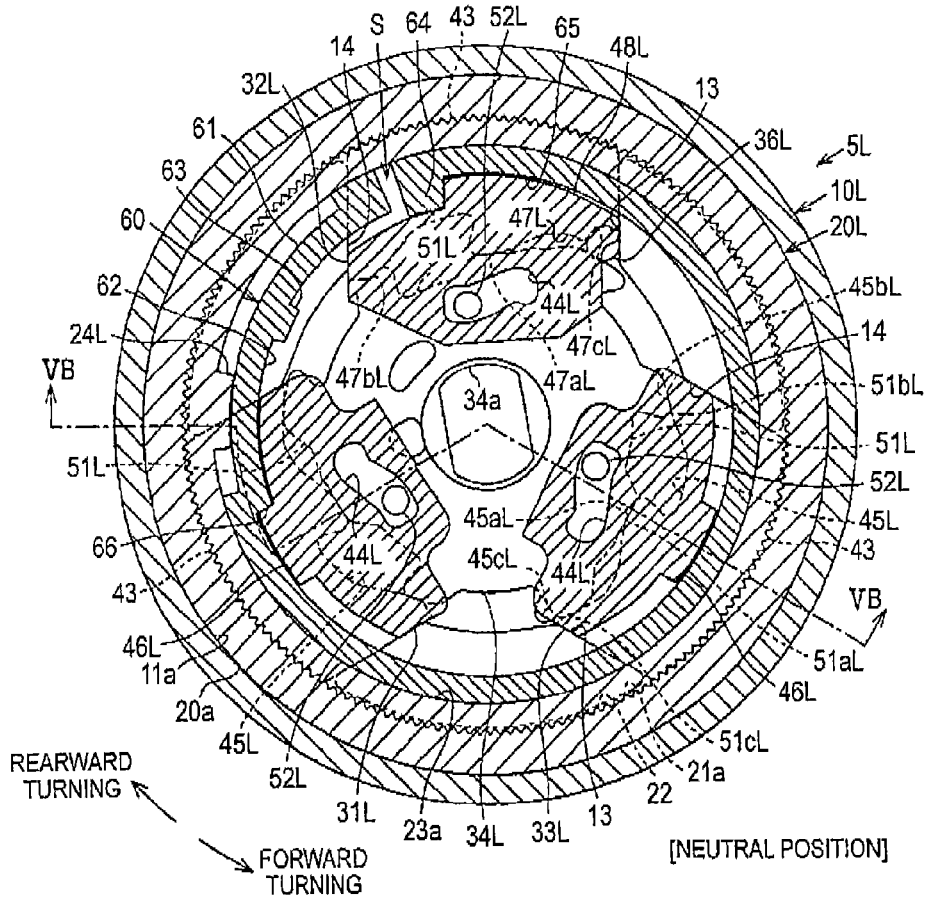
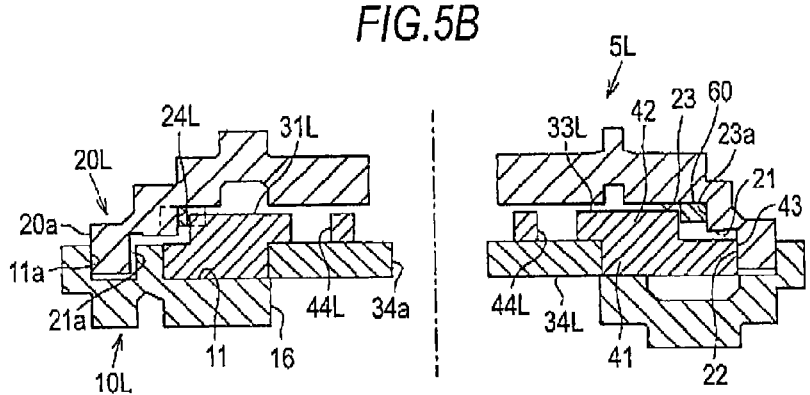

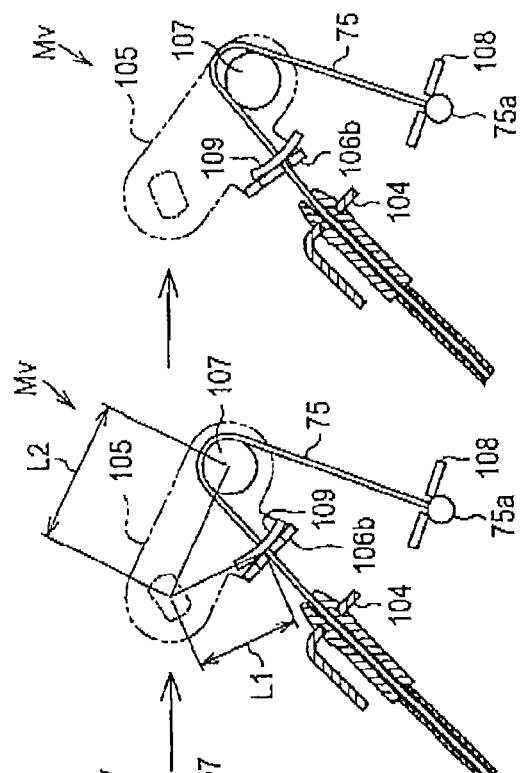

FORWARD ← → REARWARD

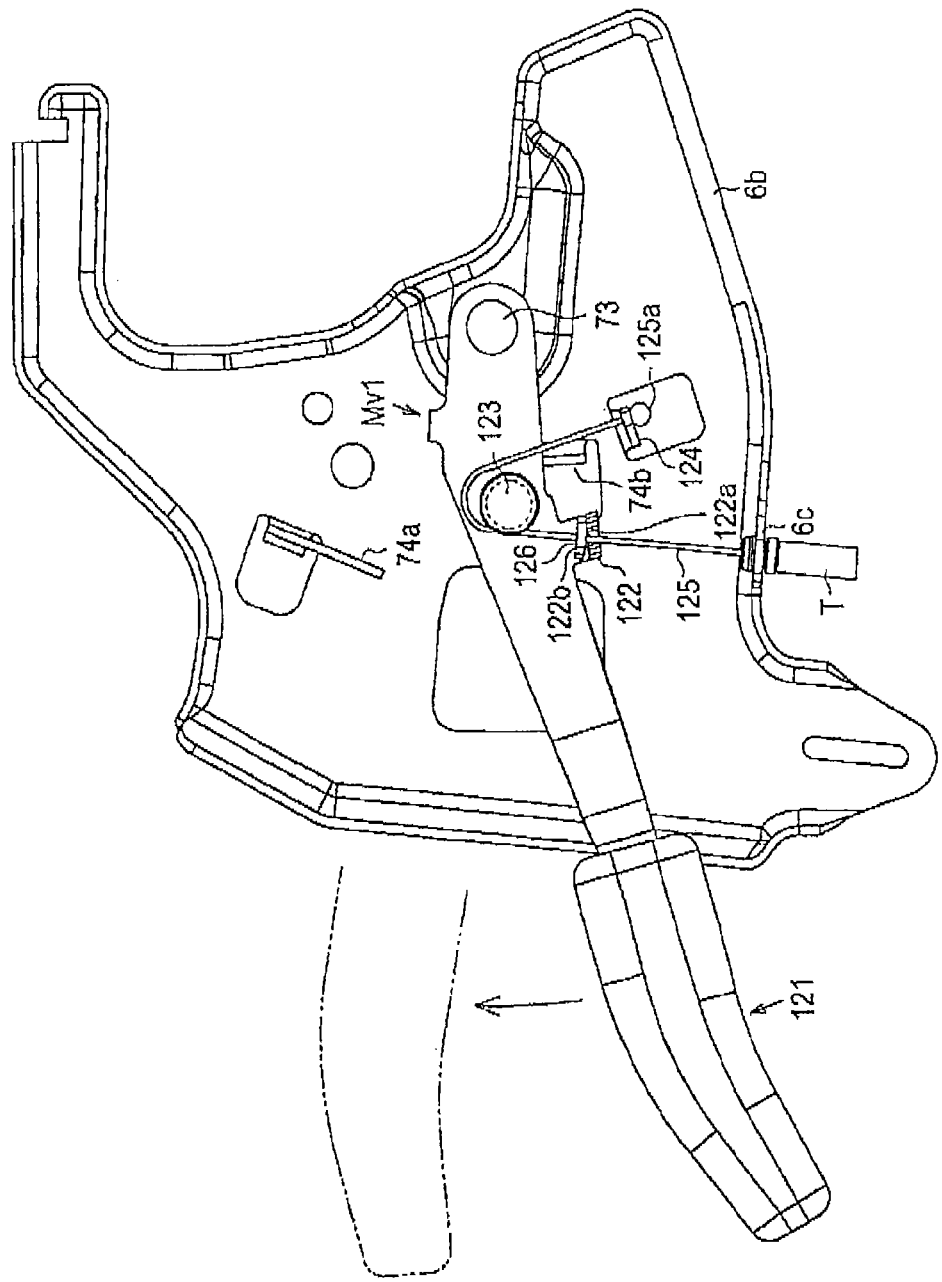

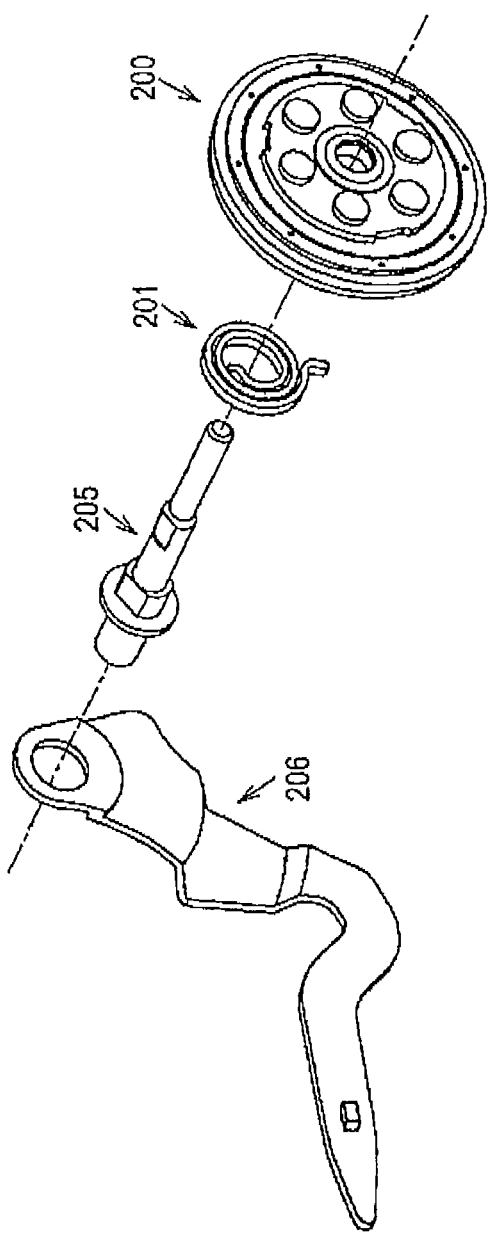

VEHICLE SEAT OPERATING DEVICE

CROSS REFERENCE TO RELATED APPLICATIONS

This application is based on and claims priority under 35 U.S.C. §119 to Japanese Patent Application 2013-059885, filed on Mar. 22, 2013, the entire contents of which are incorporated herein by reference.

TECHNICAL FIELD

This disclosure relates to a vehicle seat operating device.

BACKGROUND DISCUSSION

JP 2007-144131A (Reference 1) discloses a vehicle seat operating device that is applied to a vehicle seat reclining apparatus. In other words, as shown in FIG. 32, a switching cam (not shown) is disposed in a disk-shaped locking mechanism 200 that selectively switches between states allowing and regulating a tilt of a seat back with respect to a seat cushion, and a biasing member 201 that pivot-biases the cam onto a side of switching to the regulated state is disposed therein as well. Also, a stepped and substantially columnar hinge shaft 205 is inserted into the locking mechanism 200, and a substantially arcuate operation member 206 is connected to the hinge shaft 205 in such a manner as to be integrally pivoted. The cam is inserted in such a manner that the hinge shaft 205 is integrally pivoted, and is pivoted to a side of switching to the allowed state by an operation of the operation member 206 and against a biasing force of the biasing member 201.

Also suggested is, for example, that a second operation member (not shown) is disposed in addition to the operation member 206 in an upper portion of the seat back and is linked to the hinge shaft 205 which constitutes an output side member and the hinge shaft 205 (cam) is pivoted to the side of switching to the allowed state by an operation of the second operation member as an input side member and against the biasing force of the biasing member 201. Also performed is that a maximum operation amount of the second operation member is allowed to be larger than a maximum operation amount of the operation member 206 for utilization in an operation other than a usual operation for angular adjustment of the seat back with respect to the locking mechanism 200, an example of which includes an operation that allows a change (hereinafter referred to as a "forward tilt") from a seated state to a forward tilt state.

A pivot amount (movement amount) of the above-described hinge shaft 205 (output side member) is increased at a constant rate of change in response to an increase in the operation amount of the second operation member (input side member). However, a pivoting speed (movement speed) of the cam is different from an optimum movement speed during an operation continuing until the switching to the allowed state and a following operation, and thus optimization thereof is required.

SUMMARY

Thus, a need exists for a vehicle seat operating device which is not suspectable to the drawback mentioned above.

An aspect of this disclosure is directed to a vehicle seat operating device including an input side member that performs an operation input, an output side member that is moved based on an operation of the input side member to operate a seat adjustment mechanism, and a speed change mechanism that changes a rate of change of a movement amount of the output side member with respect to an operation amount of the input side member according to an operation position of the input side member.

According to this configuration, the rate of change of the movement amount of the output side member with respect to the operation amount of the input side member is changed according to the operation position of the input side member by the speed change mechanism, and the output side member can be moved at an optimum rate of change with respect to an operation of the seat adjustment mechanism at the operation position.

According to the aspect of this disclosure, the rate of change of the movement amount of the output side member with respect to the operation amount thereof can be changed according to the operation position of the input side member.

BRIEF DESCRIPTION OF THE DRAWINGS

The foregoing and additional features and characteristics of this disclosure will become more apparent from the following detailed description considered with the reference to the accompanying drawings, wherein:

FIG. 4 is an exploded perspective view showing a locking mechanism;

FIG. 5A is a cross-sectional view of a lock state of the locking mechanism taken along VA-VA line in FIG. 1, and FIG. 5B is a cross-sectional view taken along VB-VB line in FIG. 5A;

FIGS. 21A to 21D are explanatory views showing a speed change mechanism in the second unlock operation state of the second operation member;

FIG. 26 is a front view showing the second operation member and a structure in the vicinity thereof in the non-operation states of the first and second operation members;

FIG. 32 is an exploded perspective view showing the related art.

DETAILED DESCRIPTION

First Embodiment

A vehicle seat apparatus including a walk-in mechanism will be described with reference to FIGS. 1 to 23. In the description hereinafter, a front-back direction, a width direction, and an up-down direction are consistent with respective directions of a vehicle. Also, "L" and "R" are respectively attached to signs of members that are arranged in the left and right toward a vehicle front with respect to a part of the members which are provided in a pair on both width-direction sides.

Figure 1:
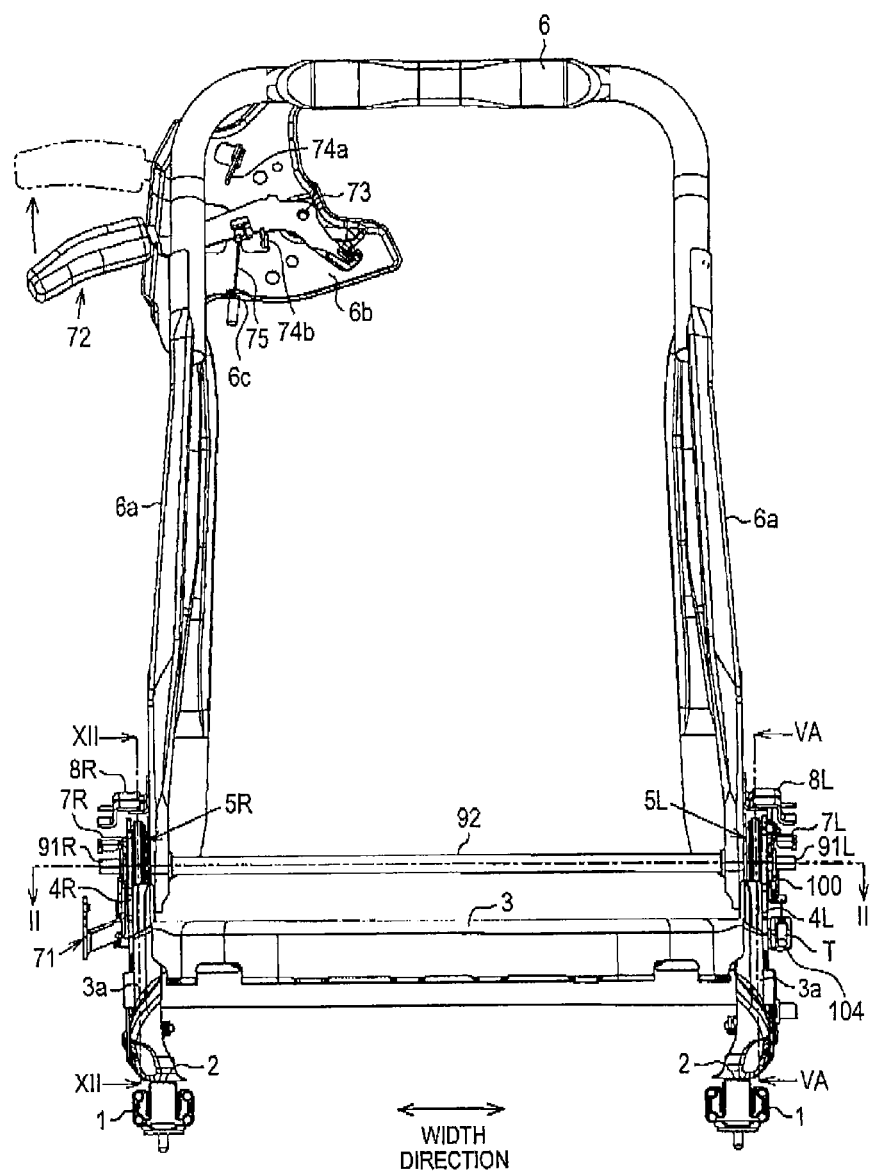
FIG. 1 is a front view showing a vehicle seat apparatus to which a first embodiment disclosed here is applied.

As shown in FIG. 1, a pair of lower rails 1 that are juxtaposed in the width direction are fixed on a vehicle floor (not shown) in such a manner as to extend in the front-back direction (direction which is orthogonal to the paper surface in FIG. 1), and a pair of upper rails 2 are respectively supported by both of the lower rails 1 in such a manner as to be movable in the front-back direction. The lower rails 1 and the upper rails 2 constitute a seat slide mechanism, and a front-back direction movement of the upper rails 2 with respect to the lower rails 1 is selectively allowed by a slide lock device (not shown).

A cushion frame 3 that has a substantially square frame shape and forms a frame of a seat cushion is mounted on both of the upper rails 2. In the cushion frame 3, a pair of lower plates 4L and 4R that are formed from a plate material are respectively fixed by welding on outer side surfaces in rear end portions of a pair of cushion side frames 3a which constitute both width-direction side portions thereof. A substantially square frame-shaped seat back frame 6 that forms a frame of a seat back is connected to both of the lower plates 4L and 4R in a pivotable (tiltable) manner via a pair of locking mechanisms 5L and 5R.

Figure 2:
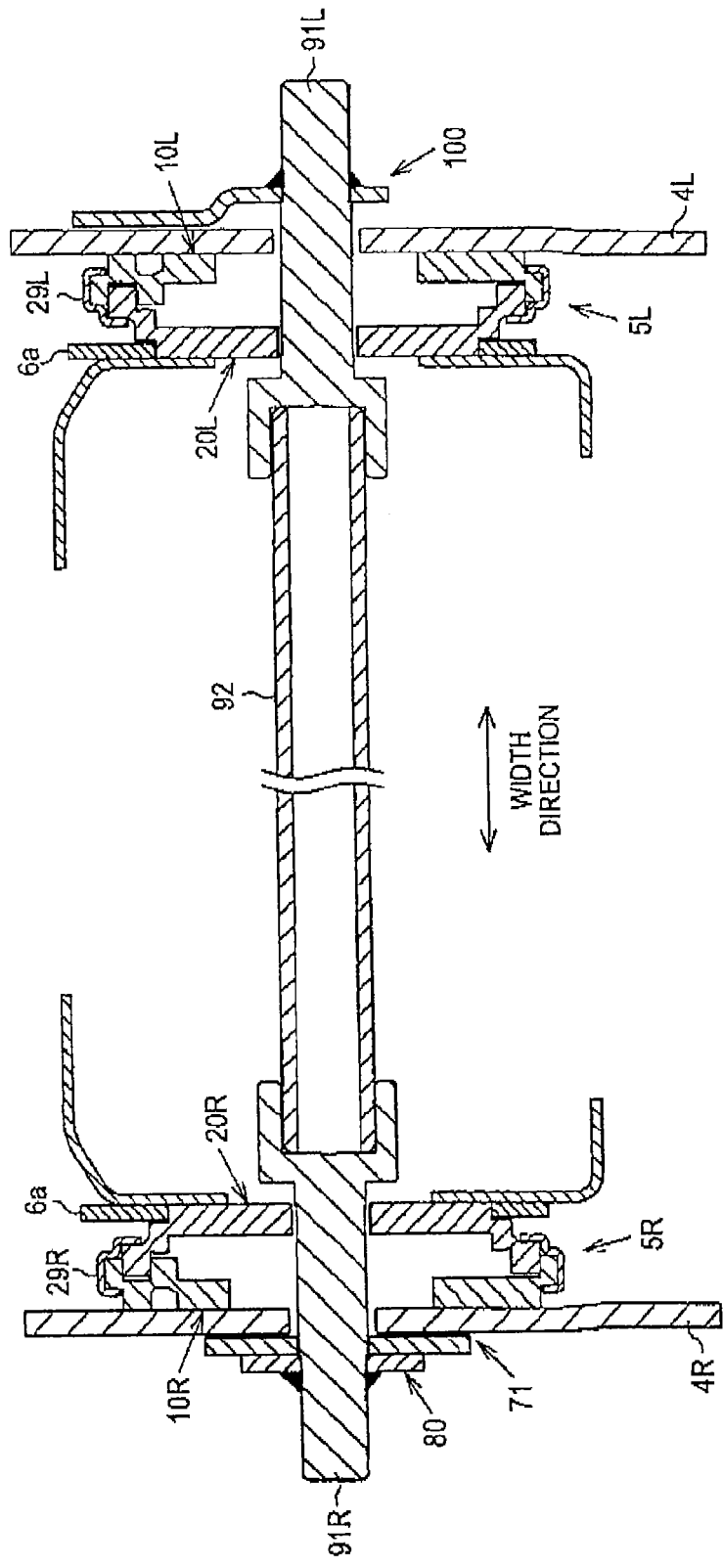
FIG. 2 is a cross-sectional view taken along II-II line in FIG. 1.

In other words, a pair of back side frames 6a that constitute both of the width-direction side portions of the seat back frame 6 are arranged in such a manner that lower end portions thereof are adjacent to respective width-direction inner sides of the rear end portions (lower plates 4L and 4R) of the cushion side frames 3a. As shown in FIG. 2 as well, a pair of rod-shaped hinge shafts 91L and 91R that have axes extending in the width direction respectively penetrate the lower end portions of both of the back side frames 6a along with both of the lower plates 4L and 4R and the like. Both of the hinge shafts 91L and 91R respectively support the members (second members 20L and 20R) of both of the locking mechanisms 5L and 5R on the back side frame 6a sides in a pivotable manner.

In respective width-direction inner side end portions thereof, both of the hinge shafts 91L and 91R are fixed to a cylindrical connection shaft 92 that extends in the width direction coaxially therewith in such a manner as to be integrally pivoted therewith. In other words, both of the hinge shafts 91L and 91R pivot in conjunction with each other via the connection shaft 92. As above, the seat back frame 6 is connected to both of the lower plates 4L and 4R via both of the locking mechanisms 5L and 5R in such a manner as to be pivotable about the axis of the connection shaft 92 or the like. In this manner, an angular position (inclination angle) of the seat back can be adjusted with respect to the seat cushion.

As shown in FIG. 1, fixed flanges 7L and 7R that extend to width-direction outer sides on upper sides of the hinge shafts 91L and 91R are disposed in a projecting manner on the lower plates 4L and 4R, and substantially L-shaped movable flanges 8L and 8R that extend to the width-direction outer sides on upper sides of the lower plates 4L and 4R and the fixed flanges 7L and 7R are connected to outer side surfaces of the back side frames 6a. An inner end portion and an outer end portion of a spiral spring (not shown) are respectively locked to the fixed flanges 7L and 7R and the movable flanges 8L and 8R. The spiral spring pivot-biases the seat back in a forward tilt direction with respect to the seat cushion.

Figure 3:
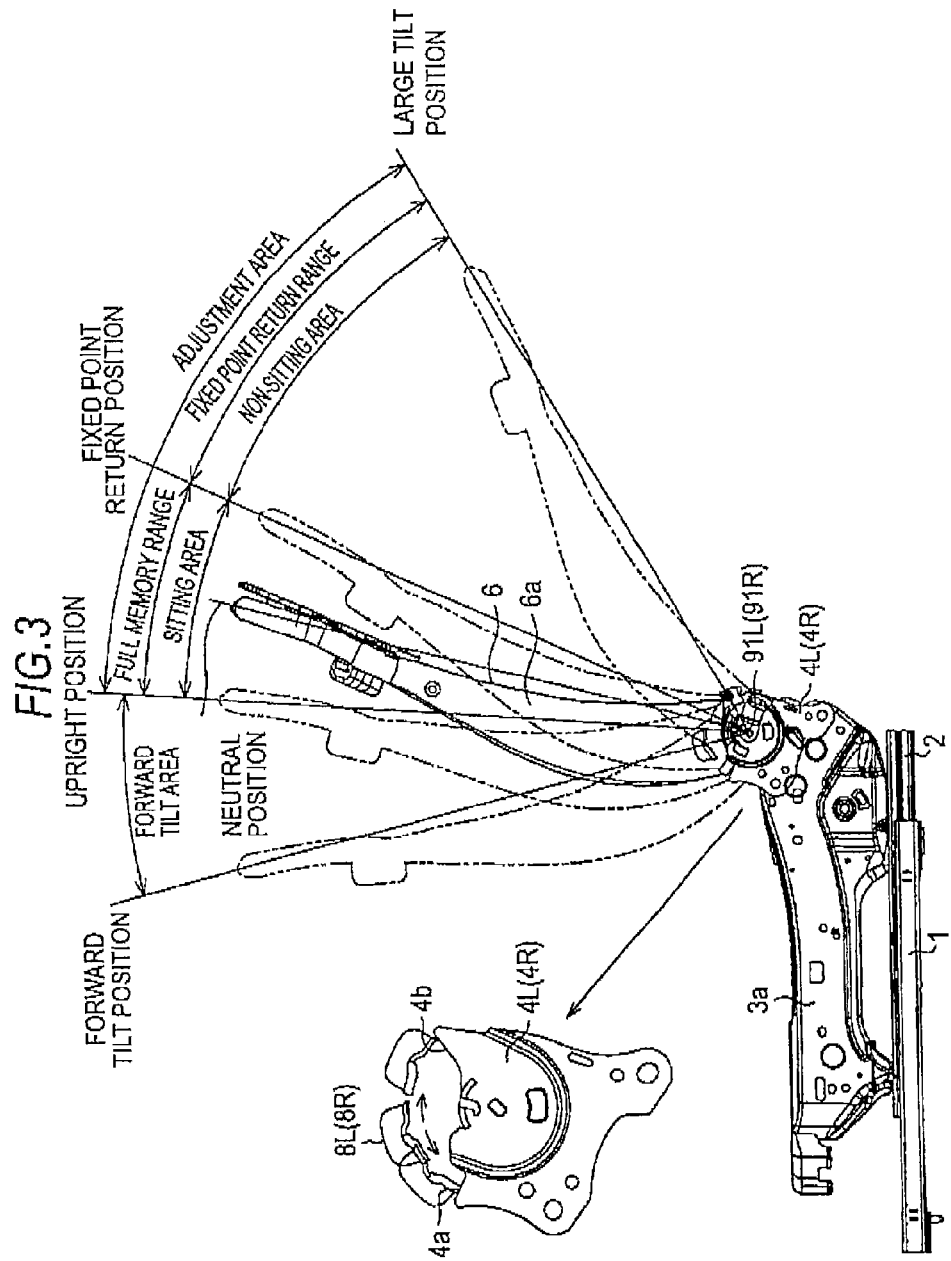
FIG. 3 is a side view showing the vehicle seat apparatus and an operation thereof.

As shown in FIG. 3, the seat back (seat back frame 6) is configured to be capable of tilting with respect to the seat cushion (seat cushion frame 3) about the axes of the hinge shafts 91L and 91R within a range of between a "forward tilt position" of large forward inclination and a "large tilt position" of large rearward inclination.

In other words, as shown enlarged in FIG. 3, a front side stopper 4a and a rear side stopper 4b that have substantially claw shapes are disposed in a projecting manner on radial-direction outer sides in upper portions of the lower plates 4L and 4R so that pivot trajectories of the movable flanges 8L and 8R are respectively blocked in both circumferential-direction side portions about the axes of the hinge shafts 91L and 91R. In this manner, the tilt range of the seat back (seat back frame 6) with respect to the seat cushion (seat cushion frame 3) is limited to a range where the movable flanges 8L and 8R abut against the front side stopper 4a or the rear side stopper 4b. In other words, the angular position of the seat back (seat back frame 6) at a time when the movable flanges 8L and 8R abut against the front side stopper 4a corresponds to the forward tilt position, and the angular position of the seat back (seat back frame 6) at a time when the movable flanges 8L and 8R abut against the rear side stopper 4b corresponds to the large tilt position. The movable flanges 8L and 8R and the front side stopper 4a constitute a front side stopper mechanism.

Also, the tilt range of the seat back with respect to the seat cushion is roughly divided into a forward tilt position-sided "forward tilt area" and a large tilt position-sided "adjustment area". At an "upright position" that is an angular position on a boundary between the forward tilt area and the adjustment area, the seat back is in a standing state. The above-described locking mechanisms 5L and 5R adjust and maintain the angular position of the seat back with respect to the seat cushion mainly in the adjustment area.

The adjustment area can be further divided into an upright position-sided "sitting area" and a large tilt position-sided "non-sitting area." An angular position on a boundary between the sitting area and the non-sitting area is referred to as a "fixed point return position." In a case where, for example, the seat back is tilted from any angular position of the sitting area to the forward tilt position within the tilt range of the seat back suitable for a general sitting posture, the seat back is lifted up thereafter, the forward tilt is released, and the seat back can return to an original angular position of immediately before the forward tilt (full memory range) in the sitting area.

In a case where, for example, the seat back is tilted from any angular position of the non-sitting area to the forward tilt position within the tilt range of the seat back suitable for a special sitting posture (for example, nap posture), the seat back is lifted up thereafter, the forward tilt is released, and the seat back can be installed at the fixed point return position (fixed point return range) in the non-sitting area.

In the drawing, the predetermined angular position of the seat back (seat back frame 6) that is shown by the solid line is the angular position (hereinafter referred to as a "neutral position") of the seat back which is mostly adopted when seated persons in general are seated.

The forward tilt position of the forward tilt area is an angular position of the seat back to improve sitting onto a rear seat side of the seat. When the seat back is tilted toward the forward tilt position, the above-described slide lock device is released or the like so that the seat cushion is slidingly moved forward with respect to the vehicle floor (so-called walk-in function).

Next, the locking mechanism 5L on one side will be described.

As shown in FIG. 2, the locking mechanism 5L has a first member 10L and a second member 20L that have disk shapes. The first member 10L is fixed by welding into an inner side surface (seat cushion side) of the lower plate 4L concentrically with the hinge shaft 91L (connection shaft 92) and, likewise, the second member 20L is fixed by welding to the outer side surface (seat back side) of the lower end portion of the back side frames 6a concentrically with the hinge shaft 91L (connection shaft 92). The first member 10L and the second member 20L are retained in an axial direction by a ring-shaped holder 29L that is formed from a metal plate.

As shown in FIGS. 4, 5A, and 5B, the first member 10L is molded by half blanking of a metal plate or the like, and has a circular concave portion 11 that is open to a second member 20L side. The concave portion 11 has an inner circumferential surface 11a about the axis of the hinge shaft 91L (first member 10L and second member 20L).

Three fan-shaped convex portions 12 are arranged at circumferentially equal angular intervals in the concave portion 11 of the first member 10L. Each of the convex portions 12 has guide walls 13 and 14 formed on both circumferential-direction sides thereof. The guide walls 13 and 14 of the adjacent convex portions 12 that face each other in the circumferential direction extend in parallel with each other in the radial direction about the axis, and form substantially U-shaped groove-like guide grooves 15 which extend in the radial direction about the axis at circumferentially equal angular intervals along with a bottom surface of the concave portion 11. The guide grooves 15 communicate with each other in a central portion and have a substantially Y shape as a whole.

Also, a substantially circular through-hole 16 is formed in the central portion where the three guide grooves 15 of the first member 10L communicate with each other. The through-hole 16 has a locking hole 16a formed on a radial-direction outer side at a predetermined angular position.

As shown in FIGS. 5A and 5B, the second member 20L is molded by half blanking of a metal plate or the like, has an outer circumferential surface 20a whose outer diameter is equal to an inner diameter of the inner circumferential surface 11a of the first member 10L, and has a circular concave portion 21 that is open to a first member 10L side. Internal teeth 22 are formed over an entire circumference on an inner circumferential surface 21a of the concave portion 21 about the axis of the hinge shaft 91L (first member 10L and second member 20L). Also, a substantially circular accommodating concave portion 23 is formed concentrically with the concave portion 21 on an inner circumferential side of the concave portion 21. A substantially arc-shaped engaging projecting portion 24L that projects toward a center is formed at a predetermined angular position on an inner circumferential surface 23a of the accommodating concave portion 23. The outer circumferential surface 20a of the second member 20L is fitted in such a manner as to be in sliding contact with the inner circumferential surface 11a of the first member 10L.

As shown in FIG. 4, the holder 29L is mounted on outer circumferential portions of the first member 10L and the second member 20L in a state where the inner circumferential surface 11a of the first member 10L and the outer circumferential surface 20a of the second member 20L are fitted. The first member 10L and the second member 20L are retained in the axial direction in a state where relative pivoting is allowed by the holder 29L.

Also, three first poles 31L, 32L, and 33L, a cam 34L, a spiral spring 35 as a biasing member, a pressing member 36L, and a memory ring 60 are provided between the first member 10L and the second member 20L.

The first poles 31L to 33L are mounted between the two adjacent guide walls 13 and 14 and are arranged at equal angular intervals in the circumferential direction about the axis. The first poles 31L to 33L are produced through forge processing of a steel material or the like and have first blocks 41 and second blocks 42 that are unevenly formed in the axial direction. In the first poles 31L to 33L, the first blocks 41 are arranged on an inner circumferential surface 21a side of the second member 20L in the radial direction and the second blocks 42 are arranged on a shaft center side of the second member 20L. Both width end portions of the first block 41 and the second block 42 are formed to be consistent with each other and to be straight lines parallel with each other.

External teeth 43 that can be engaged with the internal teeth 22 of the second member 20L are formed in an arc-shaped outer end (end face facing the internal teeth 22 of the second member 20L) of the first block 41 and, in the second block 42, a first pole side groove cam portion 44L is disposed in a penetrating manner in a plate thickness direction in a substantially central part in the width direction.

As shown in FIG. 5A, movements of the first poles 31L to 33L in the radial direction about the axis are guided in a state where both width end portions are in sliding contact with both of the guide walls 13 and 14. The first poles 31L to 33L are moved forward and backward in the radial direction along both of the guide walls 13 and 14 so that the external teeth 43 and the internal teeth 22 are engaged with or released (disengaged) from each other.

Herein, inner face cam portions 45L that are engaged with an outer circumferential portion of the cam 34L at inner ends (back surfaces that are end faces which are reverse to the outer end) of the first blocks 41 are formed in the two first poles 31L and 33L. The inner face cam portions 45L that are formed in step portions of the first poles 31L and 33L have three pole side cam surfaces 45aL, 45bL, and 45cL in circumferential-direction central portions of the first poles 31L and 33L and on both circumferential-direction sides. The pole side cam surfaces 45aL, 45bL, and 45cL face the outer circumferential portion (cam surface 51L) of the cam 34L. The pole side cam surfaces 45aL, 45bL, and 45cL constitute a cam surface that has an inclined surface which approaches the outer circumferential portion of the cam 34L during a lock operation caused by pivoting of the cam 34L in a counterclockwise direction shown in the drawing (hereinafter referred to as a "lock rotation direction").

Also, arc-shaped first pole side engaging projecting portions 46L are disposed in a projecting manner in the first poles 31L and 33L on radial-direction outer sides of the second blocks 42 in such a manner as to face the accommodating concave portion 23 (inner circumferential surface 23a) in the radial direction. The first pole side engaging projecting portions 46L are arranged in circumferential-direction central portions of the first poles 31L and 33L.

An inner face cam portion 47L that is engaged with the outer circumferential portion of the cam 34L at the inner end (back surface that is the end face which is reverse to the outer end) of the first block 41 is formed in the other one first pole 32L. The inner face cam portion 47L that is formed in a step portion of the first pole 32L has pole side cam surfaces 47aL and 47bL as with the pole side cam surfaces 45aL and 45bL and a pole side cam surface 47cL instead of a pole side cam surface 45cL. The pole side cam surface 47cL faces the outer circumferential portion (cam surface 51L) of the cam 34L, and is molded in such a manner as to form a wedge-shaped space between the guide wall 13 facing itself in the circumferential direction and itself. In other words, the molding is performed in such a manner that a gap between the guide wall 13 and the pole side cam surface 47cL becomes narrower in a radially outward direction.

Also, an arc-shaped first pole side engaging projecting portion 48L is disposed in a projecting manner in the first pole 32L on the radial-direction outer side of the second block 42 in such a manner as to face the accommodating concave portion 23 (inner circumferential surface 23a) in the radial direction. The first pole side engaging projecting portion 48L is arranged at a part on a side preceding in a clockwise direction in the drawing in the circumferential direction of the first pole 32L.

The cam 34L is arranged in such a manner as to be pivotable about the axis of the second member 20L or the like on inner circumferential sides of the first poles 31L to 33L in the concave portion 21 of the second member 20L. In other words, the cam 34L is produced through press working of a plate-shaped steel plate or the like, and basically has a flat plate shape without a step. A substantially oval cam fitting hole 34a that is formed in a penetrating manner in the plate thickness direction along the axis is formed in a central portion of the cam 34L. When a tip portion of the hinge shaft 91L is inserted into the cam fitting hole 34a, the cam 34L can be integrally pivoted with the hinge shaft 91L or the like on the inner circumferential sides of the first poles 31L to 33L (first blocks 41).

The cam 34L has three sets of the cam surfaces 51L at circumferentially equal angular intervals in the outer circumferential portion thereof. Each of the cam surfaces 51L has three pressing cam portions 51aL, 51bL, and 51cL in a circumferential-direction central portion thereof and on both circumferential-direction sides. The two pressing cam portions 51aL and 51bL can abut against the two facing pole side cam surfaces 45aL and 45bL of the first poles 31L and 33L or the two facing pole side cam surfaces 47aL and 47bL of the first pole 32L. The two pressing cam portions 51aL and 51bL press the pole side cam surfaces 45aL, 45bL, 47aL, and 47bL when the cam 34L is pivoted in the lock rotation direction.

The other one pressing cam portion 51cL can abut against the other facing pole side cam surface 45cL of the first poles 31L and 33L, and presses the pole side cam surface 45cL when the cam 34L is pivoted in the lock rotation direction. Alternatively, the pressing cam portion 51cL accommodates the spherical pressing member 36L in the above-described wedge-shaped space that is formed between the pole side cam surface 47cL of the first pole 32L and the guide wall 13 and itself. The pressing member 36L can be moved in the radial direction while being in sliding contact with the pole side cam surface 47cL and the guide wall 13. The pressing cam portion 51cL can circumscribe the pressing member 36L, and presses the pressing member 36L when the cam 34L is pivoted in the lock rotation direction.

In other words, the pressing cam portions 51aL to 51cL are held at the angular positions respectively abutting against (being in press contact with) the pole side cam surfaces 45aL to 45cL of the first poles 31L and 33L, the pole side cam surfaces 47aL and 47bL of the first pole 32L, and the pressing member 36L when the cam 34L is pivoted in the lock rotation direction.

The pressing member 36L is pressed by the cam 34L to be in press contact with each of the guide wall 13 and the pole side cam surface 47cL. In this case, a pressing force of the pressing member 36L is divided into a component force of a moving direction component (radial-direction component) of the first pole 32L and a component force of a width-direction component (circumferential-direction component) of the pole in a direction orthogonal to the moving direction. A circumferential-direction force with which the width end portion of the first pole 32L and the guide wall 13 are separated from each other is generated by a wedging action caused by the pressing using the component force of the width-direction component of the first pole 32L, and a gap between the width end portion of the first pole 32L and the guide wall 14 is filled. In this manner, backlash of the seat back with respect to the seat cushion is suppressed.

The pressing cam portions 51aL and 51bL are separated from the pole side cam surfaces 45aL and 45bL of the first poles 31L and 33L or the pole side cam surfaces 47aL and 47bL of the first pole 32L during an unlock operation caused by the pivoting of the cam 34L in the clockwise direction in the drawing (hereinafter referred to as an "unlock rotation direction"). Also, the pressing cam portion 51cL is separated from the pole side cam surface 45cL of the first poles 31L and 33L or is separated from the pressing member 36L.

As shown in FIG. 4, a plurality of (three) engagement projections 52L are disposed in a projecting manner circumferentially apart from each other on a side surface of the cam 34L. The engagement projections 52L are inserted into and engaged with the first pole side groove cam portions 44L of the first poles 31L to 33L. The first pole side groove cam portions 44L and the engagement projections 52L act in such a manner as to move the first poles 31L to 33L in a radially inward direction by using the pivoting of the cam 34L in the unlock rotation direction.

In other words, as shown in FIG. 5A, the first pole side groove cam portion 44L is molded in such a manner as to be basically progressive in the radially outward direction toward the unlock rotation direction (clockwise direction in the drawing) of the cam 34L. In this manner, when the cam 34L is pivoted in the unlock rotation direction, the pressed first poles 31L to 33L of the first pole side groove cam portion 44L are drawn in the radially inward direction into the engagement projections 52L.

As shown in FIG. 4, the spiral spring 35 pivot-biases the cam 34L in the lock rotation direction so as to move the first poles 31L to 33L in the radial direction of engagement with the second member 20L, and is accommodated in the through-hole 16 of the first member 10L. The spiral spring 35 is formed by bending a substantially rectangular flat wire rod or the like into a predetermined spiral shape, and is interposed between the first member 10L and the cam 34L. In other words, an outer end portion 35a of the spiral spring 35 is locked to the locking hole 16a, and an inner end portion 35b is locked to a locking portion (not shown) that is disposed in a projecting manner on an end face of the cam 34L.

The cam 34L is pivot-biased in the lock rotation direction (counterclockwise direction in FIG. 5A) with respect to the first member 10L by a biasing force of the spiral spring 35, the first poles 31L to 33L are pressed in the radially outward direction by the cam surface 51L, and each of the external teeth 43 are engaged with the internal teeth 22 of the second member 20L.

As shown in FIGS. 5A and 5B, the memory ring 60 has an annular shape that is divided at one site, can be reduced in diameter through an elastic deformation toward a radial-direction inner side, and can be increased in diameter through an elastic recovery toward a radial-direction outer side. The memory ring 60 is accommodated in such a manner as to be slidable, that is, pivotable in the circumferential direction with respect to the accommodating concave portion 23 of the second member 20L in a state where a divided part S is positioned between the first pole side engaging projecting portions 46L and 48L of the adjacent first poles 31L and 32L and in a state of being reduced in diameter.

In the memory ring 60, a first pole 31L side-sided part is relatively reduced in diameter across the divided part S, and an outer circumferential surface and an inner circumferential surface of the part which are arc-shaped form a pivot allowing portion 61 and a first unlock engagement surface 62. Also, the memory ring 60 has an arc-shaped fixed point return projecting portion 63 that projects from a circumferential-direction central portion of the first unlock engagement surface 62 to the radial-direction inner side.

Further, the memory ring 60 allows a first pole 32L (first pole side engaging projecting portion 48L) side-sided end portion to project to the radial-direction inner side across the divided part S to form an engaged portion 64. The engaged portion 64 is set in such a manner as to be overlapped all the time with the first pole side engaging projecting portion 48L at a radial-direction position regardless of a position of the first pole 32L that is moved in the radial direction along the guide groove 15. Accordingly, the rotation of the memory ring 60 in the clockwise direction in the drawing with respect to the first pole 32L, that is, the rotation in the clockwise direction in the drawing with respect to the first member 10L is regulated all the time when the engaged portion 64 is adjacent to the first pole side engaging projecting portion 48L.

An arc-shaped inner circumferential surface that is pinched between the first unlock engagement surface 62 of the memory ring 60 and the engaged portion 64 forms a first lock engagement surface 65 whose inner diameter is larger than an inner diameter of the first unlock engagement surface 62. A boundary position (step) between the first unlock engagement surface 62 and the first lock engagement surface 65 is set to be overlapped all the time with the first pole side engaging projecting portion 46L positioned on the first lock engagement surface 65 at a radial-direction position when, for example, the first pole 31L is moved to the radial-direction outer side along the guide groove 15, that is, when the external teeth 43 of the first pole 31L are engaged with the internal teeth 22. Accordingly, in this case, the rotation of the memory ring 60 in the counterclockwise direction in the drawing with respect to the first pole 31L, that is, the rotation in the counterclockwise direction in the drawing with respect to the first member 10L is regulated all the time. The step-shaped boundary position between the first unlock engagement surface 62 and the first lock engagement surface 65 forms a regulation surface 66.

Figure 6:
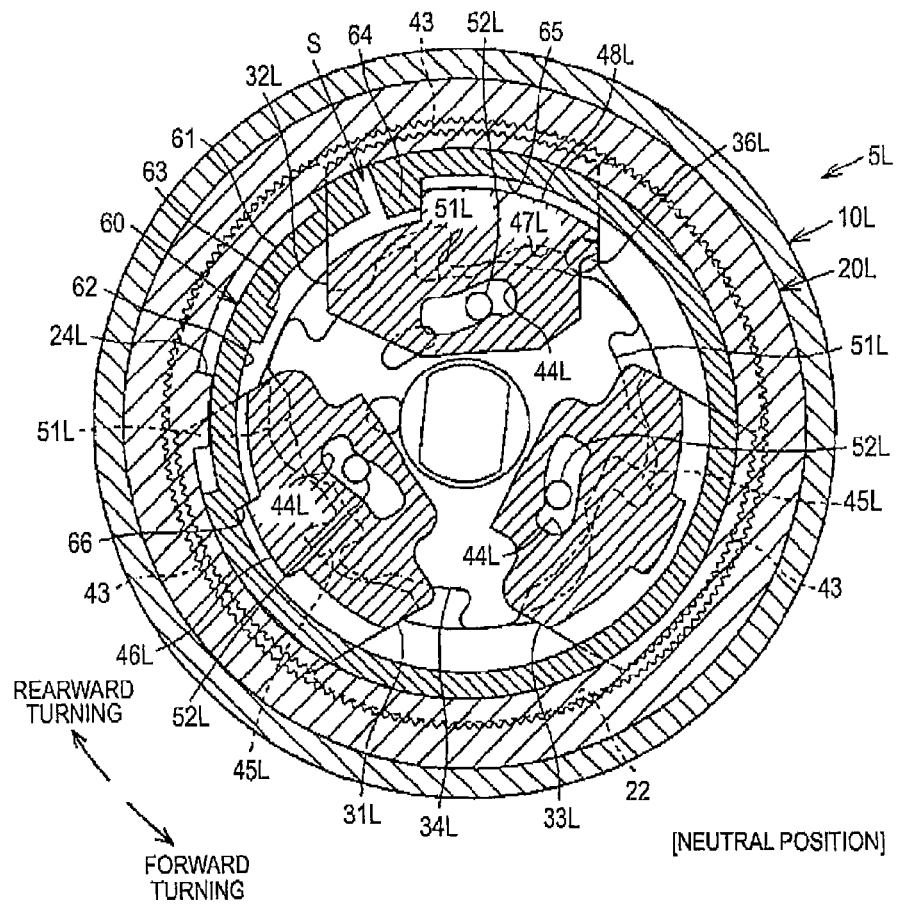
FIG. 6 is a cross-sectional view showing a first unlock operation state of the locking mechanism at a neutral position.

As shown in FIG. 6, the regulation surface 66 is set in such a manner as to be partially overlapped all the time with the first pole side engaging projecting portion 46L positioned on the first rock engagement surface 65 at a radial-direction position when the first pole 31L is moved to the radial-direction inner side along the guide groove 15 by the unlock operation of the cam 34L, that is, when the engagement between the external teeth 43 of the first pole 31L and the internal teeth 22 is released. Accordingly, also in this case, the rotation of the memory ring 60 in the counterclockwise direction in the drawing with respect to the first pole 31L, that is, the rotation in the counterclockwise direction in the drawing with respect to the first member 10L is regulated all the time because of radial-direction half-engagement with the first pole side engaging projecting portion 46L on the regulation surface 66. The unlock operation of the cam 34L in this case is referred to as a first unlock operation as well.

In other words, the pivoting of the memory ring 60 with respect to the first member 10L is regulated all the time in a state where the external teeth 43 of the first poles 31L to 33L are engaged with the internal teeth 22 and in a state where the engagement between the external teeth 43 of the first poles 31L to 33L and the internal teeth 22 is released by the first unlock operation of the cam 34L.

Herein, the engaging projecting portion 24L that is disposed in the second member 20L is arranged in the pivot allowing portion 61 in the circumferential direction. Accordingly, when the pivoting of the memory ring 60 with respect to the first member 10L is regulated, pivoting of the engaging projecting portion 24L (second member 20L) with a range of the pivot allowing portion 61 is allowed. FIGS. 5A and 6 show a state where the seat back is at the neutral position.

Figure 7:
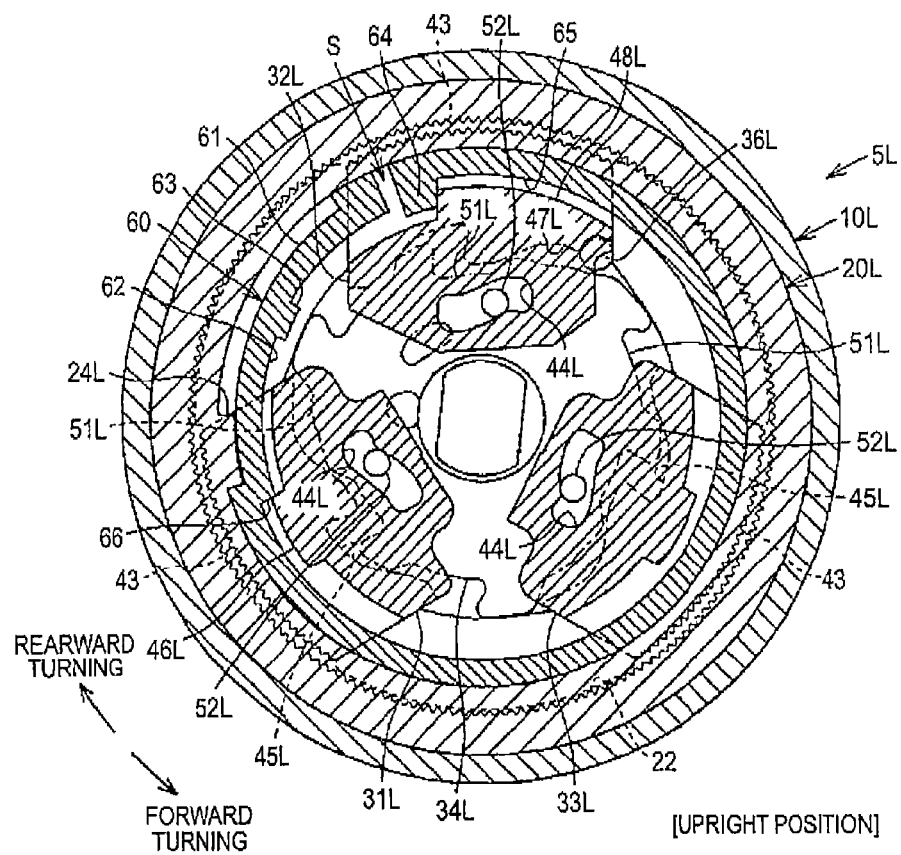
FIG. 7 is a cross-sectional view showing the first unlock operation state of the locking mechanism at an upright position.

As shown in FIG. 7, the pivoting of the second member 20L that is pivoted in the counterclockwise direction in the drawing with respect to the memory ring 60 (and the first member 10L) in a state where the engagement between the external teeth 43 and the internal teeth 22 is released is regulated as the engaging projecting portion 24L reaches a terminal end of the pivot allowing portion 61. The rotation of the second member 20L with respect to the first member 10L in this case tilts the seat back forward with respect to the seat cushion, which is hereinafter referred to as a forward rotation. Accordingly, a state where the engaging projecting portion 24L reaches the terminal end of the pivot allowing portion 61 in the forward rotation of the second member 20L corresponds to the upright position of the seat back.

Figure 8:
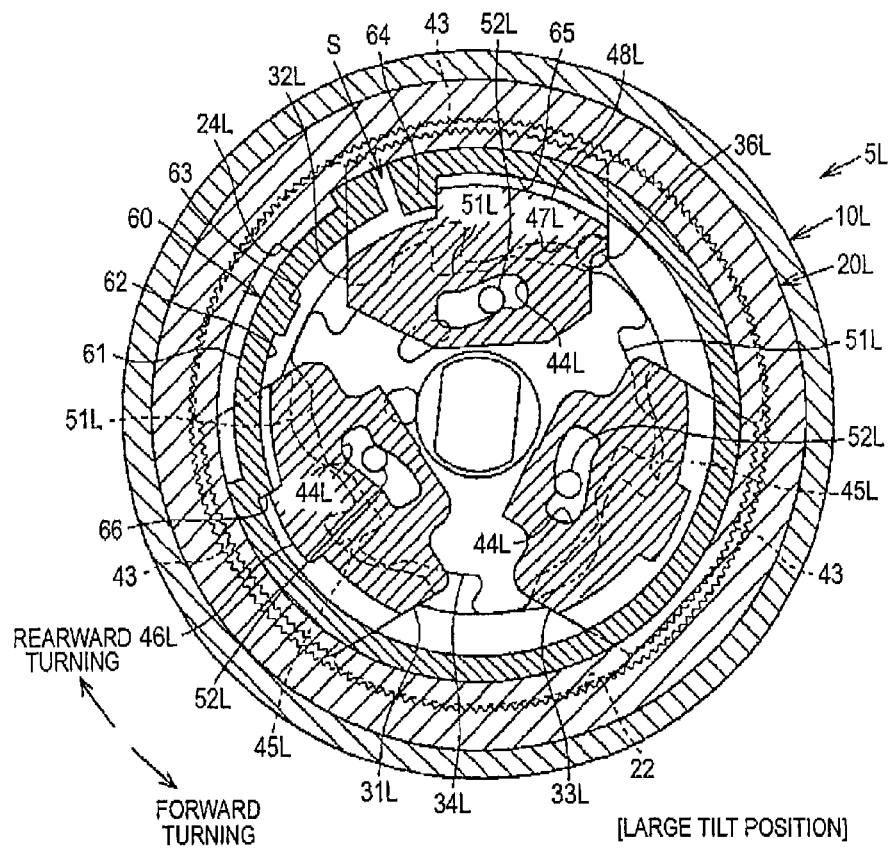
FIG. 8 is a cross-sectional view showing the first unlock operation state of the locking mechanism at a large tilt position.

Also, as shown in FIG. 8, the pivoting of the second member 20L that is pivoted in the clockwise direction in the drawing with respect to the memory ring 60 (and the first member 10L) in a state where the engagement between the external teeth 43 and the internal teeth 22 is released is regulated as the engaging projecting portion 24L reaches the terminal end of the pivot allowing portion 61. The rotation of the second member 20L with respect to the first member 10L in this case tilts the seat back rearward with respect to the seat cushion, which is hereinafter referred to as a rearward rotation. Accordingly, a state where the engaging projecting portion 24L reaches the terminal end of the pivot allowing portion 61 in the rearward rotation of the second member 20L corresponds to the large tilt position of the seat back.

Figure 9:
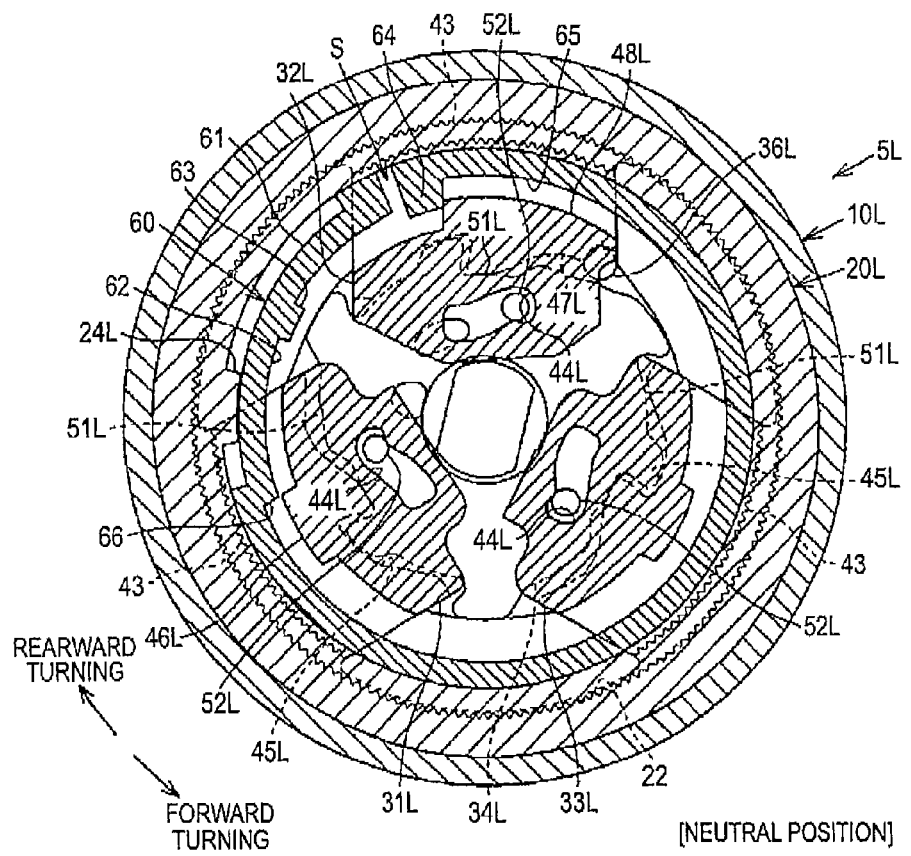
FIG. 9 is a cross-sectional view showing a second unlock operation state of the locking mechanism at the neutral position.

As shown in FIG. 9, the regulation surface 66 is set not to be overlapped with the first pole side engaging projecting portion 46L at the radial-direction position when the first pole 31L is further moved to the radial-direction inner side along the guide groove 15 by the unlock operation of the cam 34L. Accordingly, in this case, the memory ring 60 is released from the radial-direction engagement with the first pole side engaging projecting portion 46L on the regulation surface 66, and thus the rotation in the counterclockwise direction in the drawing with respect to the first pole 31L, that is, the counterclockwise direction in the drawing with respect to the first member 10L is allowed. At the same time, the memory ring 60 can be integrally pivoted with the second member 20L by a frictional engagement with the second member 20L caused by the elastic deformation of itself.

Accordingly, the memory ring 60 begins to be integrally pivoted with a relative position with respect to the second member 20L being maintained when the second member 20L starts the forward rotation with respect to the first member 10L in this state. Then, the first pole side engaging projecting portion 46L that is positioned on the regulation surface 66 rises from the first lock engagement surface 65 toward the first unlock engagement surface 62. In this case, a radial-direction outer side movement of the first pole 31L whose engagement with the internal teeth 22 is released is regulated by the first unlock engagement surface 62 where the first pole side engaging projecting portion 46L rises, and the release state is maintained. This is similar to the other first poles 32L and 33L that are in conjunction via the cam 34L. The unlock operation of the cam 34L in this case is referred to as a second unlock operation.

Figure 10:
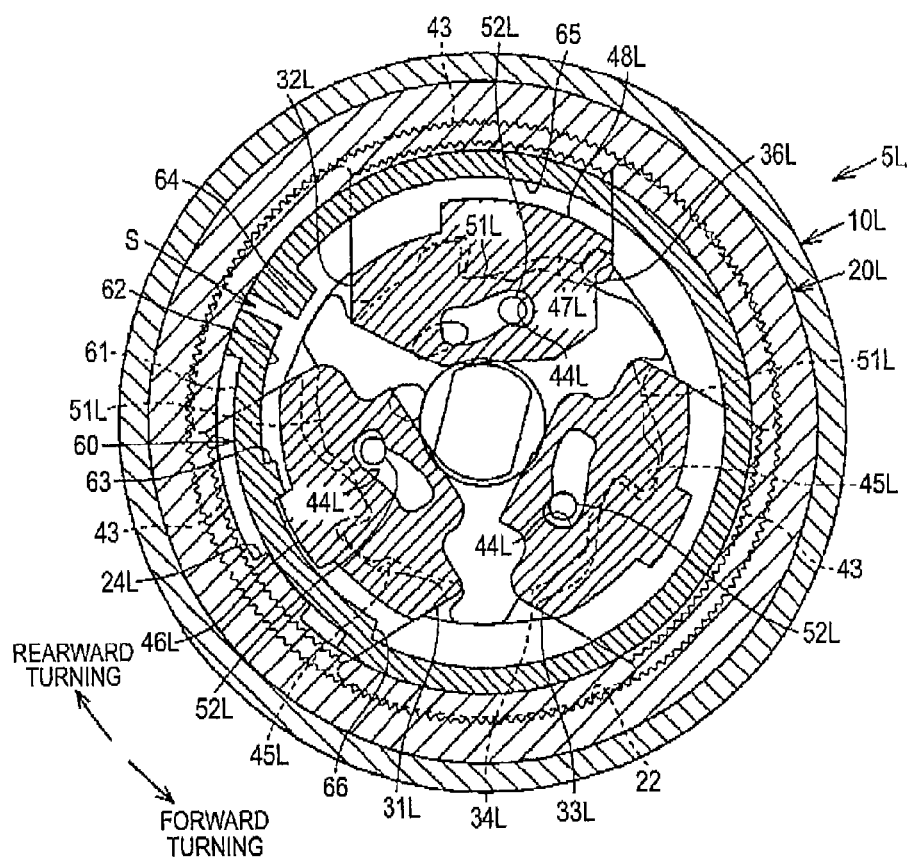
FIG. 10 is a cross-sectional view showing a state of the locking mechanism during a forward tilt from the neutral position.

Herein, as shown in FIG. 10, a rotation amount to the rotation position that corresponds to the forward tilt position of the seat back is relatively small in a case where the second member 20L is forward-rotated along with the memory ring 60 when the seat back is at the neutral position. Accordingly, the seat back is tilted forward through the forward tilt position in a stage where the first pole side engaging projecting portion 46L that rises to the first unlock engagement surface 62 reaches the fixed point return projecting portion 63. In other words, in a state where the seat back reaches the forward tilt position, the first pole side engaging projecting portion 46L is positioned further on a regulation surface 66 side than in the fixed point return projecting portion 63 of the first unlock engagement surface 62.

Accordingly, when the forward tilt is released by pulling up the seat back, the second member 20L is rotated rearward along with the memory ring 60, and the first pole 31L can be engaged with the internal teeth 22 at a point of time when the first lock engagement surface 65 reaches the first pole side engaging projecting portion 46L. This is similar to the other first poles 32L and 33L that are in conjunction via the cam 34L. As the first poles 31L to 33L are engaged with the internal teeth 22, a further rearward rotation of the second member 20L along with the memory ring 60 is regulated. The rotation position of the second member 20L with respect to the first member 10L in this case is consistent with the rotation position of the second member 20L beginning to be pivoted along with the memory ring 60 by the second unlock operation of the cam 34L. In other words, the angular position where the rearward tilt of the seat back is regulated is consistent with the initial angular position (hereinafter referred to as a "memory position") where the seat back begins to be tilted forward by the second unlock operation of the cam 34L.

Figure 11:
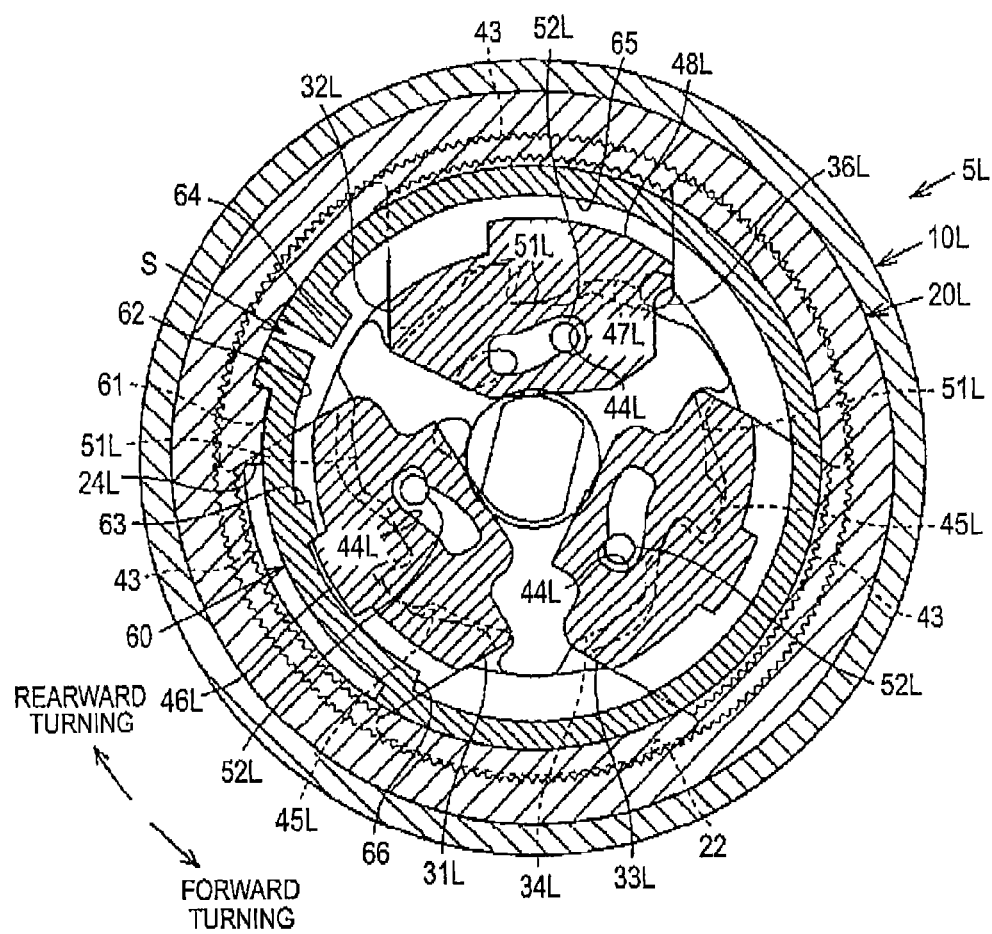
FIG. 11 is a crass-sectional view showing a state of the locking mechanism during a forward tilt from the large tilt position.

As shown in FIG. 11, the rotation amount to the rotation position that corresponds to the forward tilt position of the seat back is relatively large in a case where the second member 20L is forward-rotated along with the memory ring 60 when the seat back is at the large tilt position. Accordingly, the seat back does not reach the forward tilt position yet even when the first pole side engaging projecting portion 46L that rises to the first unlock engagement surface 62 reaches the fixed point return projecting portion 63. In this case, the memory ring 60 is engaged with the first pole side engaging projecting portion 46L in the radial direction in the fixed point return projecting portion 63, and the rotation in the counterclockwise direction in the drawing with respect to the first pole 31L, that is, the pivoting in the counterclockwise direction in the drawing with respect to the first member 10L is further regulated. In other words, the pivoting of the memory ring 60 with respect to the first member 10L is regulated all the time, and the memory ring 60 can be pivoted with respect to the second member 20L. In other words, even in a stage where the seat back reaches the forward tilt position, the memory ring 60 still maintains an abutting state of the fixed point return projecting portion 63 and the first pole side engaging projecting portion 46L.

Accordingly, when the forward tilt is released by pulling up the seat back, the second member 20L is rotated rearward along with the memory ring 60, and the first pole 31L can be engaged with the internal teeth 22 at a point of time when the first lock engagement surface 65 reaches the first pole side engaging projecting portion 46L. This is similar to the other first poles 32L and 33L that are in conjunction via the cam 34L. As the first poles 31L to 33L are engaged with the internal teeth 22, a further rearward rotation of the second member 20L along with the memory ring 60 is regulated.

A rotation amount of the second member 20L with respect to the first member 10L in this case is consistent with a predetermined angle that corresponds to an angle between the regulation surface 66 and the fixed point return projecting portion 63. In other words, the angular position where the rearward tilt of the seat back is regulated is consistent with the angular position tilted rearward by the predetermined angle from the forward tilt position. The above-described fixed point return position of the seat back corresponds to the angular position of return in this case. In other words, if the rotation amount of the second member 20L with respect to the first member 10L at a time when the seat back is tilted forward to the forward tilt position exceeds the predetermined angle, that is, in a case where the angular position at a time when the forward tilt of the seat back is initiated is included in the non-sitting area within a range of between the fixed point return position and the large tilt position, a point return position is set when the forward tilt is released by pulling up the seat back. This is to improve operability by housing the seat back in the sitting area after releasing the forward tilt in a case where the forward tilt is started from the non-sitting area for the special sitting posture.

Next, the locking mechanism 5R on the opposite side will be described.

As shown in FIG. 2, the locking mechanism 5R has a first member 10R and a second member 20R that have disk shapes. The first member 10R is fixed by welding into an inner side surface (seat cushion side) of the lower plate 4R concentrically with the hinge shaft 91R (connection shaft 92) and, likewise, the second member 20R is fixed by welding to the outer side surface (seat back side) of the lower end portion of the back side frames 6a concentrically with the hinge shaft 91R (connection shaft 92). The first member 10R and the second member 20R are retained in the axial direction by a ring-shaped holder 29R that is formed from a metal plate.

Figure 12:
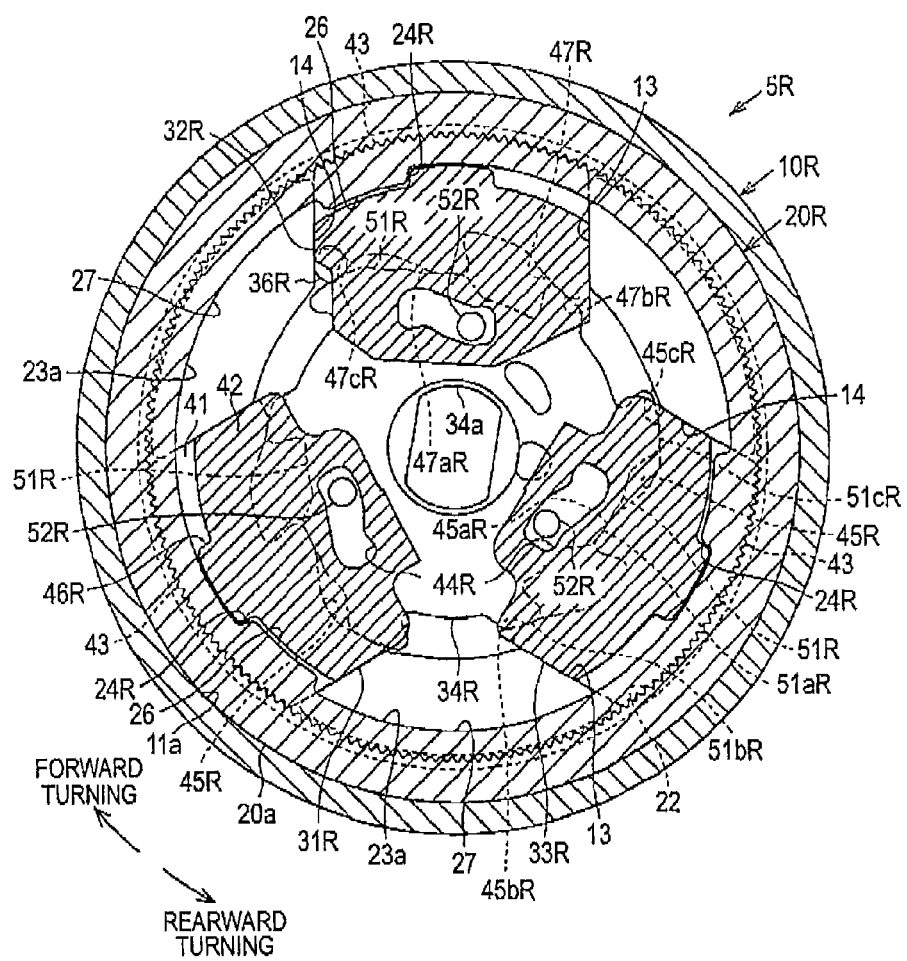
FIG. 12 is a cross-sectional view of the lock state of the locking mechanism taken along XII-XII line in FIG. 1.

As shown in FIG. 12, the first member 10R is molded by half blanking of a metal plate or the like, and has a substantially similar structure as the first member 10L with the exception of being symmetrical.

The second member 20R is molded by half blanking of a metal plate or the like, and has a substantially similar structure as the second member 20L with the exception of being symmetrical. A plurality of (three) substantially arc-shaped engaging projecting portions 24R that are arranged at equal angular intervals are disposed in a projecting manner toward a center on the inner circumferential surface 23a of the accommodating concave portion 23. The second member 20R forms a second unlock engagement surface 26 on inner circumferential surfaces of the engaging projecting portions 24R, and forms a second lock engagement surface 27 on the inner circumferential surface 23a between the adjacent engaging projecting portions 24R.

Also, three second poles 31R, 32R, and 33R, a cam 34R, a pressing member 36R, and the spiral spring 35 are provided between the first member 10R and the second member 20R.

The second poles 31R to 33R are produced through forge processing of a steel material or the like, and respectively have a substantially similar structure to the first poles 31L to 33L with the exception of being symmetrical. In the second block 42, a second pole side groove cam portion 44R is disposed in a penetrating manner in the plate thickness direction in a substantially central part in the width direction.

Also, an arc-shaped second pole side engaging projecting portion 46R is disposed in a projecting manner in the second poles 31R to 33R on the radial-direction outer side of the second block 42 in such a manner as to face the accommodating concave portion 23 (inner circumferential surface 23a) in the radial direction. The second pole side engaging projecting portion 46R is arranged in a circumferential-direction central portion of the second poles 31R to 33R.

Herein, inner face cam portions 45R that are engaged with an outer circumferential portion of the cam 34R at inner ends (back surfaces that are end faces which are reverse to the outer end) of the first blocks 41 are formed in the two second poles 31R and 33R. The inner face cam portions 45R that are formed in step portions of the second poles 31R and 33R have three pole side cam surfaces 45aR, 45bR, and 45cR in circumferential-direction central portions of the second poles 31R and 33R and on both circumferential-direction sides. The pole side cam surfaces 45aR, 45bR, and 45cR face the outer circumferential portion (cam surface 51R) of the cam 34R. The pole side cam surfaces 45aR, 45bR, and 45cR constitute a cam surface that has an inclined surface which approaches the outer circumferential portion of the cam 34R during a lock operation caused by pivoting of the cam 34R in a counterclockwise direction shown in the drawing (hereinafter referred to as a "lock rotation direction").

An inner face cam portion 47R that is engaged with the outer circumferential portion of the cam 34R at the inner end (back surface that is the end face which is reverse to the outer end) of the first block 41 is formed in the other one second pole 32R. The inner face cam portion 47R that is formed in a step portion of the second pole 32R has pole side cam surfaces 47aR and 47bR as with the pole side cam surfaces 45aR and 45bR and a pole side cam surface 47cR instead of a pole side cam surface 45cR. The pole side cam surface 47cR faces the outer circumferential portion (cam surface 51R) of the cam 34R, and is molded in such a manner as to form a wedge-shaped space between the guide wall 13 facing itself in the circumferential direction and itself. In other words, the molding is performed in such a manner that a gap between the guide wall 13 and the pole side earn surface 47cR becomes narrower in the radially outward direction.

The cam 34R is produced through press working of a plate-shaped steel plate or the like, and has a substantially similar structure as the cam 34L with the exception of being symmetrical. When a tip portion of the hinge shaft 91R is inserted into the cam fitting hole 34a, the cam 34R can be integrally pivoted with the hinge shaft 91L or the like on the inner circumferential sides of the second poles 31R to 33R. In other words, the left and right cams 34L and 34R (locking mechanisms 5L and 5R) are connected in such a manner as to operate in synchronization with each other via the hinge shafts 91L and 91R and the connection shaft 92.

The cam 34R has three sets of the cam surfaces 51R at circumferentially equal angular intervals in the outer circumferential portion thereof. Each of the cam surfaces 51R has three pressing cam portions 51aR, 51bR, and 51cR in a circumferential-direction central portion thereof and on both circumferential-direction sides. The two pressing cam portions 51aR and 51bR can abut against the two facing pole side cam surfaces 45aR and 45bR of the second poles 31R and 33R or the two facing pole side cam surfaces 47aR and 47bR of the second pole 32R. The two pressing cam portions 51aR and 51bR press the pole side cam surfaces 45aR, 45bR, 47aR, and 47bR when the cam 34R is pivoted in the lock rotation direction.

The other one pressing cam portion 51cR can abut against the other facing pole side cam surface 45cR of the second poles 31R and 33R, and presses the pole side cam surface 45cR when the cam 34R is pivoted in the lock rotation direction. Alternatively, the pressing cam portion 51cR accommodates the spherical pressing member 36R in the above-described wedge-shaped space that is formed between the pole side cam surface 47cR of the second pole 32R and the guide wall 13 and itself. The pressing member 36R can be moved in the radial direction while being in sliding contact with the pole side cam surface 47cR and the guide wall 13. The pressing cam portion 51cR can circumscribe the pressing member 36R, and presses the pressing member 36R when the cam 34R is pivoted in the lock rotation direction.

In other words, the pressing cam portions 51aR to 51cR are held at the angular positions respectively abutting against (being in press contact with) the pole side cam surfaces 45aR to 45cR of the second poles 31R and 33R, the pole side cam surfaces 47aR and 47bR of the second pole 32R, and the pressing member 36R when the cam 34R is pivoted in the lock rotation direction.

The pressing member 36R is pressed by the cam 34R to be in press contact with each of the guide wall 13 and the pole side cam surface 47cR. In this case, a pressing force of the pressing member 36R is divided into a component force of a moving direction component (radial-direction component) of the second pole 32R and a component force of a width-direction component (circumferential-direction component) of the pole in a direction orthogonal to the moving direction. A circumferential-direction force with which the width end portion of the second pole 32R and the guide wall 13 are separated from each other is generated by a wedging action caused by the pressing using the component force of the width-direction component of the second pole 32R, and a gap between the width end portion of the second pole 32R and the guide wall 14 is filled. In this manner, the backlash of the seat back with respect to the seat cushion is suppressed.

Figure 13:
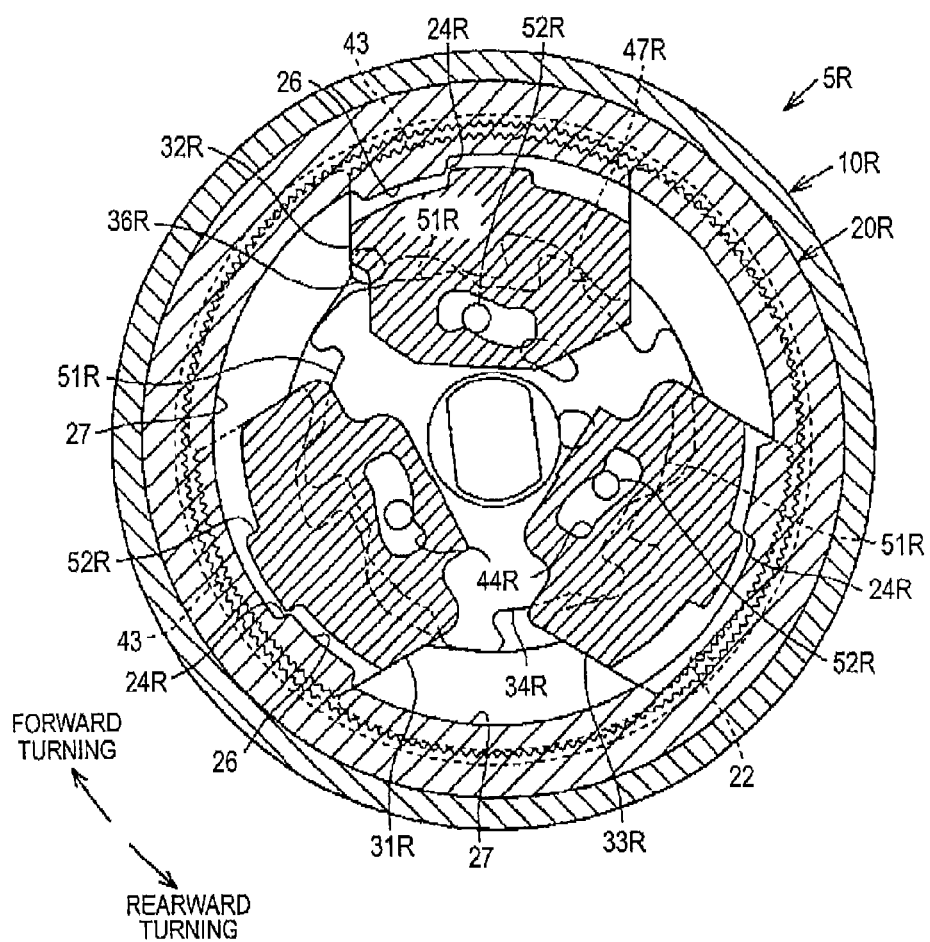
FIG. 13 is a cross-sectional view showing the first unlock operation state of the locking mechanism.

As shown in FIG. 13, the pressing cam portions 51aR and 51bR are separated from the pole side cam surfaces 45aR and 45bR of the second poles 31R and 33R or the pole side cam surfaces 47aR and 47bR of the second pole 32R during an unlock operation caused by the pivoting of the cam 34R in the clockwise direction in the drawing (hereinafter referred to as an "unlock rotation direction"). Also, the pressing cam portion 51cR is separated from the pole side cam surface 45cR of the second poles 31R and 33R or is separated from the pressing member 36R.

As shown in FIG. 12, a plurality of (three) engagement projections 52R are disposed in a projecting manner circumferentially apart from each other on a side surface of the cam 34R. The engagement projections 52R are inserted into and engaged with the second pole side groove cam portions 44R of the second poles 31R to 33R. The second pole side groove cam portions 44R and the engagement projections 52R act in such a manner as to move the second poles 31R to 33R in the radially inward direction by using the pivoting of the cam 34R in the unlock rotation direction.

In other words, as shown in FIG. 13, the second pole side groove cam portion 44R is molded in such a manner as to be basically progressive in the radially outward direction toward the unlock rotation direction (clockwise direction in the drawing) of the cam 34R. In this manner, when the cam 34R is pivoted in the unlock rotation direction, the pressed second poles 31R to 33R of the second pole side groove cam portion 44R are drawn in the radially inward direction into the engagement projections 52R.

The cam 34R is pivot-biased in the lock rotation direction (counterclockwise direction in FIG. 12) with respect to the first member 10R by a biasing force of the spiral spring 35, the second poles 31R to 33R are pressed in the radially outward direction by the cam surface 51R, and each of the external teeth 43 are engaged with the internal teeth 22 of the second member 20R.

When the second poles 31R to 33R are moved to the radial-direction outer side along the guide groove 15, that is, when the external teeth 43 of the second poles 31R to 33R are engaged with the internal teeth 22, the second pole side engaging projecting portion 46R is positioned between the adjacent engaging projecting portions 24R, that is, on the second lock engagement surface 27.

As shown in FIG. 13, the engaging projecting portion 24R is set in such a manner as to be partially overlapped all the time with the second pole side engaging projecting portion 46R positioned on the second lock engagement surface 27 at a radial-direction position when the second poles 31R to 33R are moved to the radial-direction inner side along the guide groove 15 by the unlock operation of the cam 34R, that is, when the engagement between the external teeth 43 of the second poles 31R to 33R and the internal teeth 22 is released.

Accordingly, relative pivoting of the second pole side engaging projecting portion 46R with respect to the second member 20R is allowed within a range of the second lock engagement surface 27. The unlock operation of the cam 34R in this case is referred to as a first unlock operation as well.

The pivoting of the second member 20R that is pivoted in the clockwise direction in the drawing with respect to the first member 10R in a state where the engagement between the external teeth 43 and the internal teeth 22 is released is regulated as the engaging projecting portion 24R reaches the second pole side engaging projecting portion 46R. The rotation of the second member 20R with respect to the first member 10R in this case is referred to as a forward rotation.

The pivoting of the second member 20R that is pivoted in the counterclockwise direction in the drawing with respect to the first member 10R in a state where the engagement between the external teeth 43 and the internal teeth 22 is released is regulated as the engaging projecting portion 24R reaches the second pole side engaging projecting portion 46R. The rotation of the second member 20R with respect to the first member 10R in this case is referred to as a rearward rotation.

Figure 14:
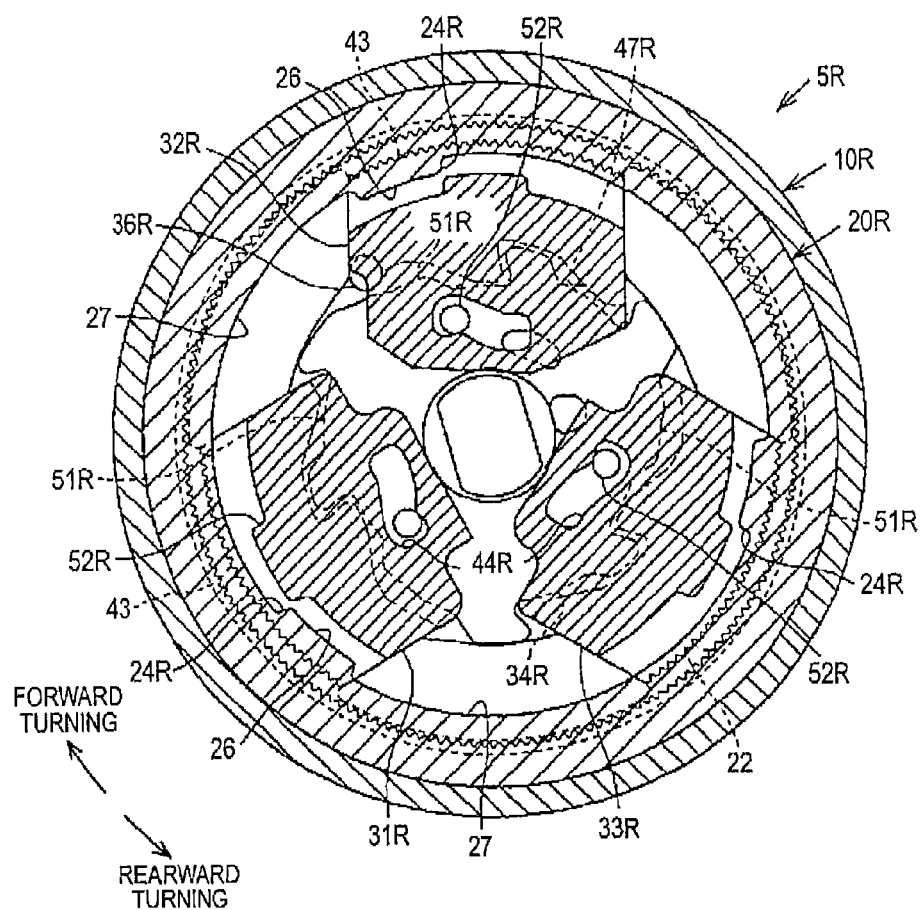
FIG. 14 is a cross-sectional view showing the second unlock operation state of the locking mechanism.

As shown in FIG. 14, the engaging projecting portion 24R is set not to be overlapped with the second pole side engaging projecting portion 46R positioned on the second lock engagement surface 27 at the radial-direction position when the second poles 31R to 33R are further moved to the radial-direction inner side along the guide groove 15 by the unlock operation of the cam 34R, that is, when the engagement between the external teeth 43 of the second poles 31R to 33R and the internal teeth 22 is released.

Accordingly, in this case, the second member 20R is released from the radial-direction engagement with the second pole side engaging projecting portion 46R in the engaging projecting portion 24R, and thus a further rotation in the clockwise direction in the drawing with respect to the second poles 31R to 33R, that is, a further rotation in the clockwise direction in the drawing with respect to the first member 10R is allowed.

Accordingly, when the second member 20R starts the forward rotation with respect to the first member 10R in this state, the second pole side engaging projecting portion 46R positioned on the second lock engagement surface 27 begins to rise from the second lock engagement surface 27 to the second unlock engagement surface 26 in response. In this case, a radial-direction outer side movement of the second poles 31R to 33R whose engagement with the internal teeth 22 is released is regulated by the second unlock engagement surface 26 where the second pole side engaging projecting portion 46R rises, and the release state is maintained. Accordingly, the forward rotation of the second member 20R in this case is allowed until reaching the rotation position corresponding to the forward tilt position of the seat back. The unlock operation of the cam 34R in this case is referred to as a second unlock operation as well.

Accordingly, when the forward tilt is released by pulling up the seat back, the second member 20R is rotated rearward, and the second poles 31R to 33R can be engaged with the internal teeth 22 at a point of time when the second pole side engaging projecting portion 46R reaches the second lock engagement surface 27. However, in order for the second poles 31R to 33R to be engaged with the internal teeth 22, the first poles 31L to 33L on the opposite side that are in conjunction via the connection shaft 92 or the like are required to be engageable with the internal teeth 22. In other words, an operation at a time when the second poles 31R to 33R are engaged with the internal teeth 22 is restricted by an operation of the first poles 31L to 33L on the opposite side associated with the return to the memory position or the like. In other words, a function of the device as a whole is satisfied even in a configuration in which a function associated with the return to the memory position or the like is installed only in the locking mechanism 5L on the one side. Also, as the second poles 31R to 33R are engaged with the internal teeth 22 along with the first poles 31L to 33L, a further rearward rotation of the second member 20R is regulated. It is a matter of course that the rotation position of the second member 20R with respect to the first member 10R in this case is consistent with the rotation position that corresponds to the memory position of the seat back or the fixed point return position.

As shown in FIG. 1 herein, the tip portion of the hinge shaft 91R that projects in the axial direction from the lower plate 4R on the one side is linked to a first operation member 71 which is formed from a plate material or the like, and the cam 34R that is connected to the hinge shaft 91R is configured to be pivoted on a first unlock operation side when a tip portion of the first operation member 71 is in a pull-up operation (hereinafter referred to as a "first unlock operation"). In this case, the cam 34L on the opposite side is also pivoted to the first unlock operation side via the connection shaft 92 and the hinge shaft 91L.

A mounting member 6b that is expanded to a corner portion of the seat back frame 6 is disposed in a shoulder portion thereof in an upper left portion of the drawing. In the mounting member 6b, an arm-shaped second operation member 72 that is formed from a plate material or the like is supported in such a manner as to be pivotable in the up-down direction by a shaft 73. The second operation member 72 is pivot-biased downward all the time by a return spring (not shown). Also, in the mounting member 6b, stoppers 74a and 74b are disposed on an upper side and a lower side of the second operation member 72, and an operation range of the second operation member 72 is defined by the stoppers 74a and 74b.

Also, the tip portion of the hinge shaft 91L that projects in the axial direction from the lower plate 4L on the one side is linked to a release link 100 which is formed from a plate material or the like. A tip portion of the release link 100 is connected to a longitudinal-direction middle portion of the second operation member 72 via a cable 75 which is guided into an external cylinder T of a double tube type cable having flexibility or the like. The cam 34L that is connected to the hinge shaft 91L is configured to be pivoted on a second unlock operation side when a tip portion of the second operation member 72 is in a pull-up operation (hereinafter referred to as a "second unlock operation"). In this case, the cam 34R on the opposite side is also pivoted to the second unlock operation side via the connection shaft 92 and the hinge shaft 91R.

One terminal of the external cylinder T of the cable 75 is held by a cable holder 6c that is formed in the mounting member 6b, and the other terminal is held by a cable holder 104 that is fixed to the lower plate 4L. In FIG. 1, middle parts of the cable 75 and the external cylinder T are not shown.

Figure 15:
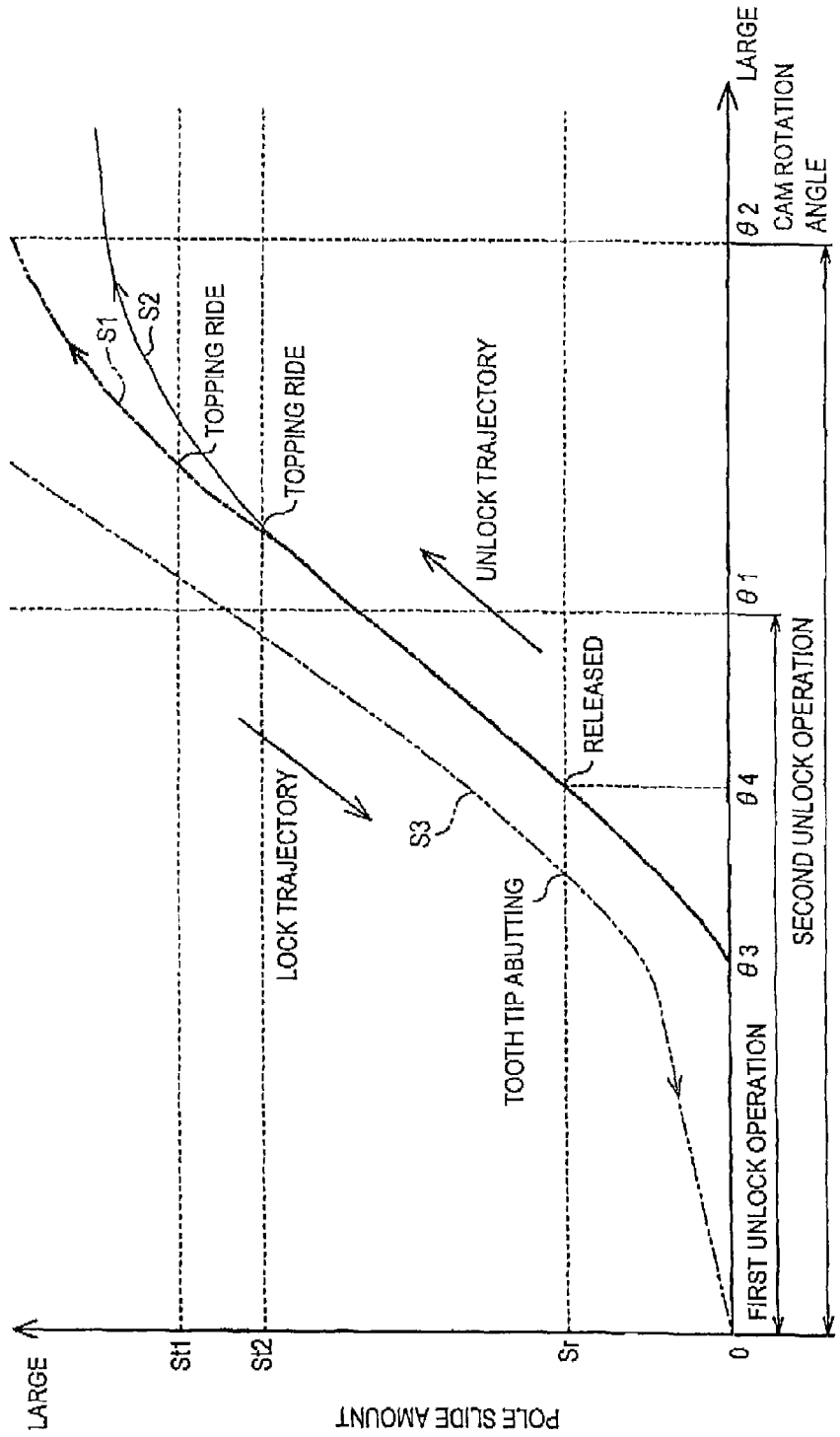
FIG. 15 is a graph showing a relationship between a rotation angle of a cam and a slide amount of a pole.

Herein, a relationship between a rotation angle θ of the cams 34L and 34R starting from the rotation angle of the cams 34L and 34R in a state where the external teeth 43 of the first pole 31L and the second pole 31R are engaged with the internal teeth 22 of the second members 20L and 20R by the biasing force of the spiral spring 35 and a slide amount SL that is a radial-direction movement amount of separating from the internal teeth 22 of the first pole 31L and the second pole 31R corresponding thereto will be described with reference to FIG. 15. Description of the other first poles 32L and 33L and second poles 32R and 33R is omitted since these are respectively in conjunction with the first pole 31L and the second pole 31R.

In FIG. 15, a rotation angle θ1 represents the rotation angle θ corresponding to a maximum operation amount at a time when the first operation member 71 is in the first unlock operation, and a rotation angle θ2 (>θ1) represents the rotation angle θ corresponding to a maximum operation amount at a time when the second operation member 72 is in the second unlock operation. Accordingly, the rotation angle θ2 is consistent with the rotation angle θ of the cam 34L corresponding to the operation amount at which the second operation member 72 abuts against the stopper 74a. Also, a slide amount S1 represents a change in the slide amount SL of the first pole 31L during the second unlock operation of the cams 34L and 34R, and a slide amount S2 represents a change in the slide amount SL of the second pole 31R during the second unlock operation of the cams 34L and 34R.

A rotation angle θ3 represents the rotation angle θ at a time when the engagement projections 52L and 52R abut against the first pole side engaging projecting portion 46L and the second pole side engaging projecting portion 46R through a free-run section during the unlock operation of the cams 34L and 34R. Further, a rotation angle θ4 represents the rotation angle θ corresponding to a slide amount Sr at a time when the external teeth 43 of the first pole 31L and the second pole 31R and the internal teeth 22 of the second members 20L and 20R are tooth tip-released.

A slide amount S3 represents a change in the slide amount SL of the external teeth 43 of the first pole 31L and the second pole 31R and the internal teeth 22 of the second members 20L and 20R at a time when these are engaged with each other by the biasing force of the spiral spring 35. In other words, when the external teeth 43 of the first pole 31L and the second pole 31R and the internal teeth 22 of the second members 20L and 20R are engaged with each other, the slide amount SL is set to be equally changed. The change in the slide amount SL in this case is adjusted and set by shapes of the cam surfaces 51L and 51R of the cams 34L and 34R and the inner face cam portions 45L and 45R of the first pole 31L and the second pole 31R.

As is apparent in the drawing, the slide amounts S1 and S2 are set in such a manner that the slide amount SL is equally changed when the second unlock operation of the cams 34L and 34R is initiated and the tooth tip release of the external teeth 43 of the first pole 31L and the second pole 31R and the internal teeth 22 of the second members 20L and 20R is finished at first.

Also, different changes are set in the vicinity of where the second pole side engaging projecting portion 46R of the second pole 31R rises to the second unlock engagement surface 26 of the second member 20R.

In other words, a slide amount St1 at a time when the first pole side engaging projecting portion 46L of the first pole 31L rises to the first unlock engagement surface 62 of the memory ring 60 is set to be larger than a slide amount St2 at a time when the second pole side engaging projecting portion 46R of the second pole 31R rises to the second unlock engagement surface 26 of the second member 20R. This is to reduce the possibility of the rotation angle θ (operation amount of the first operation member 71) at a time when the first pole side engaging projecting portion 46L of the first pole 31L rises to the first unlock engagement surface 62 of the memory ring 60 being smaller than the rotation angle θ (operation amount of the second operation member 72) at a time when the second pole side engaging projecting portion 46R of the second pole 31R rises to the second unlock engagement surface 26 of the second member 20R due to component irregularities or the like. In this manner, the impossibility of the forward tilt of the seat back exceeding the predetermined angular range is suppressed regardless of the integral pivoting of the memory ring 60 and the second member 20L, that is, performing of memory position setting or the like in a second unlock operation state or the like.

Also, an increment of the slide amount S1 of the first pole 31L with respect to an increment of the rotation angle θ is set to be larger than an increment of the slide amount S2 of the second pole 31R from the vicinity of the rotation angle θ at a time when the second pole side engaging projecting portion 46R of the second pole 31R rises to the second unlock engagement surface 26 of the second member 20R. In other words, a radial-direction movement speed at which the first pole 31L is separated from the internal teeth 22 is set to be higher than a radial-direction movement speed at which the second pole 31R is separated from the internal teeth 22. This is to suppress a timing shift thereof with a difference in both of the movement speeds between the first pole 31L and the second pole 31R although the slide amount St1 at a time when the first pole side engaging projecting portion 46L of the first pole 31L rises to the first unlock engagement surface 62 of the memory ring 60 is set to be larger than the slide amount St2 at a time when the second pole side engaging projecting portion 46R of the second pole 31R rises to the second unlock engagement surface 26 of the second member 20R. In this manner, in the second unlock operation state, the impossibility of integral pivoting of the memory ring 60 and the second member 20L, that is, the impossibility of the memory position setting or the like is suppressed regardless of the forward tilt of the seat back exceeding the predetermined angular range.

Figure 16:
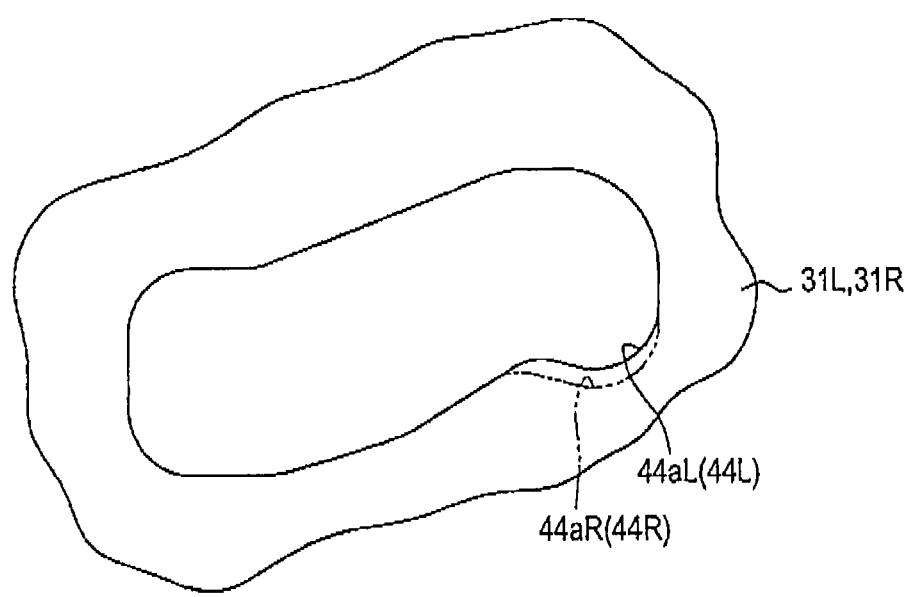
FIG. 16 is an explanatory view showing first and second pole side groove cam portions in comparison.

As shown in FIG. 16, the change in the slide amount SL at a time when the first pole side engaging projecting portion 46L of the first pole 31L rises to the first unlock engagement surface 62 of the memory ring 60 and the change in the slide amount SL at a time when the second pole side engaging projecting portion 46R of the second pole 31R rises to the second unlock engagement surface 26 of the second member 20R are adjusted and set by shapes of the first pole side groove cam portion 44L and the second pole side groove cam portion 44R with which the engagement projections 52L and 52R of the cams 34L and 34R are engaged. In other words, an inner wall surface 44aL of the first pole side groove cam portion 44L drawn with the solid line in FIG. 16 and associated with the drawing of the first pole 31L in the vicinity of the rising of the second pole side engaging projecting portion 46R of the second pole 31R to the second unlock engagement surface 26 of the second member 20R is raised onto a further radial-direction outer side than an inner wall surface 44aR of the second pole side groove cam portion 44R drawn with the two-dot chain line in FIG. 16 and also associated with the drawing of the second pole 31R. In this manner, a relative increase in the radial-direction movement speed at which the first pole 31L is separated from the internal teeth 22 is realized.

Next, the first operation member 71 and a structure in the vicinity thereof will be described.

Figure 17:
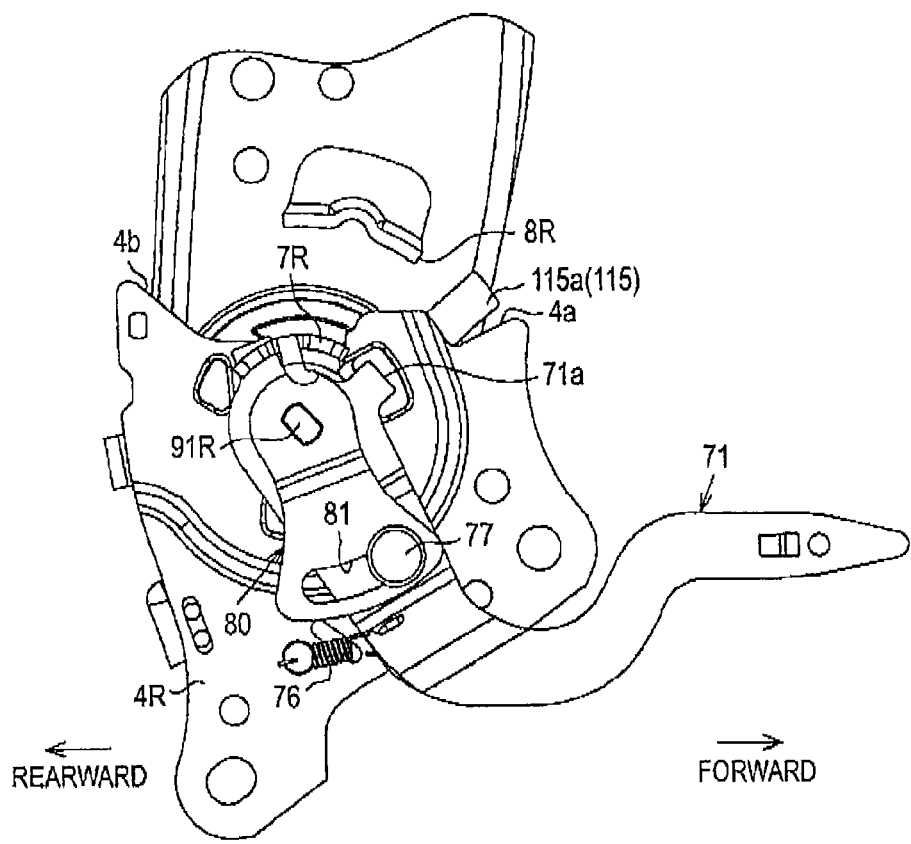
FIG. 17 is a side view showing a first operation member and a structure in the vicinity thereof in non-operation states of the first operation member and a second operation member.

As shown in FIG. 17, the first operation member 71 is molded into a substantially arcuate shape, and is supported in a pivotable manner by the tip portion of the hinge shaft 91R. The first operation member 71 has a movable stopper 71a that extends to an upper front side from a base end portion thereof substantially along the radial direction about the hinge shaft 91R. The movable stopper 712 is arranged on a side preceding in the clockwise direction in the drawing about the hinge shaft 91R with respect to the fixed flange 7R, and is arranged in such a manner that a pivot trajectory thereof is blocked by the fixed flange 7R. Also, the first operation member 71 is biased and held (pulled) at a predetermined initial pivot position by a return spring 76 that extends between the lower plate 4R and itself.

Figure 18:
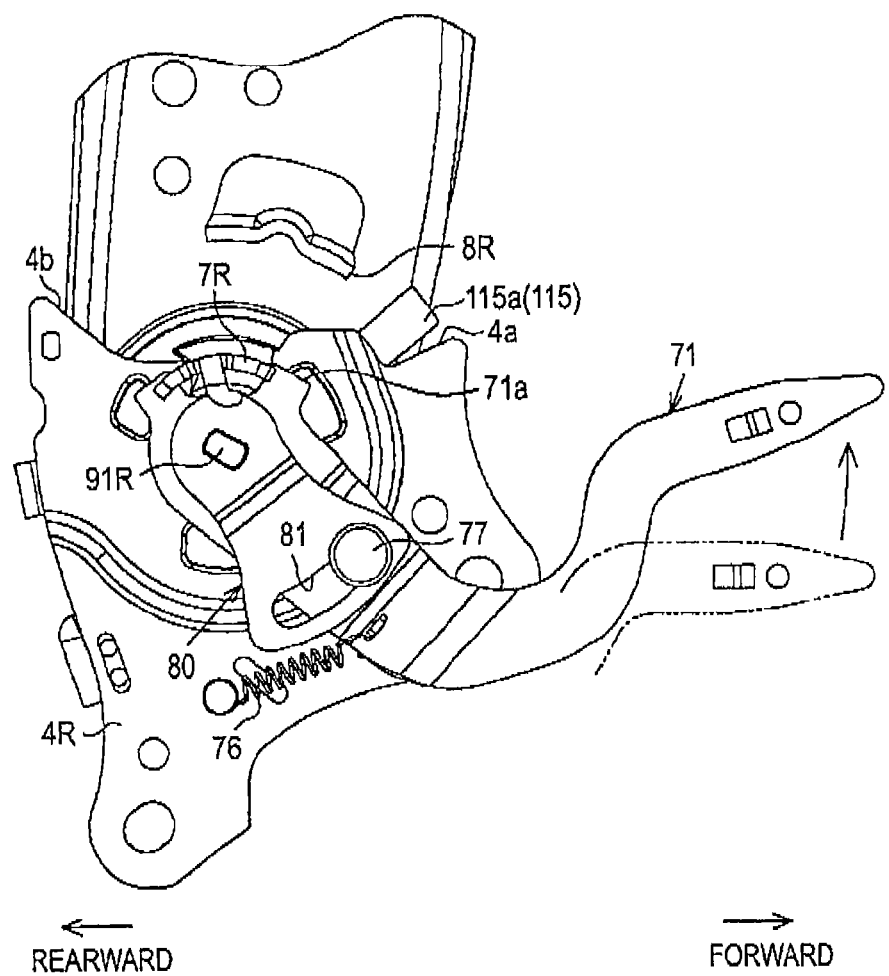
FIG. 18 is a side view showing the first operation member and the structure in the vicinity thereof in a first unlock operation state of the first operation member.

Accordingly, as shown in FIG. 18, a maximum pivot range at a time when the tip portion of the first operation member 71 is in the pull-up operation (first unlock operation) is limited to a range of up to an abutting of the movable stopper 71a against the fixed flange 7R. The rotation angle θ corresponding to the operation amount of the first operation member 71 in this case is consistent with the rotation angle θ1.

Also, as shown in FIG. 17, the tip portion of the hinge shaft 91R is adjacent to an outer side of the first operation member 71 that is a lower side of the fixed flange 7R, and is inserted into and fixed to a link member 80 which is formed from a plate material. An arc-shaped long hole 81 about the hinge shaft 91R is formed in a tip portion of the link member 80. A pin 77 that is inserted in a slidable manner into the long hole 81 is fixed to the first operation member 71.

As described above, the first operation member 71 is supported in such a manner as to be pivotable with respect to the tip portion of the hinge shaft 91R, and is biased and held at the predetermined initial pivot position by the return spring 76. The link member 80 is pivot-biased all the time in the rotation direction (clockwise direction in FIG. 17) on the side of the lock operation of the cam 34R integrated with the hinge shaft 91R by the spiral spring 35 and, usually, is arranged at a position where one end portion (front end portion) of the long hole 81 is locked to the pin 77 of the first operation member 71 at the initial pivot position.

Accordingly, as shown in FIG. 18, the one end portion (front end portion) of the long hole 81 of the link member 80 is pressed by the pin 77 in a first unlock operation state of the first operation member 71, and the link member 80 is pivoted in the counterclockwise direction in the drawing integrally with the first operation member 71. The hinge shaft 91R is integrally pivoted in the same direction by the pivot of the link member 80. In this case, the cam 34R integrated with the hinge shaft 91R is in the first unlock operation against the biasing force of the spiral spring 35.

Figure 19:
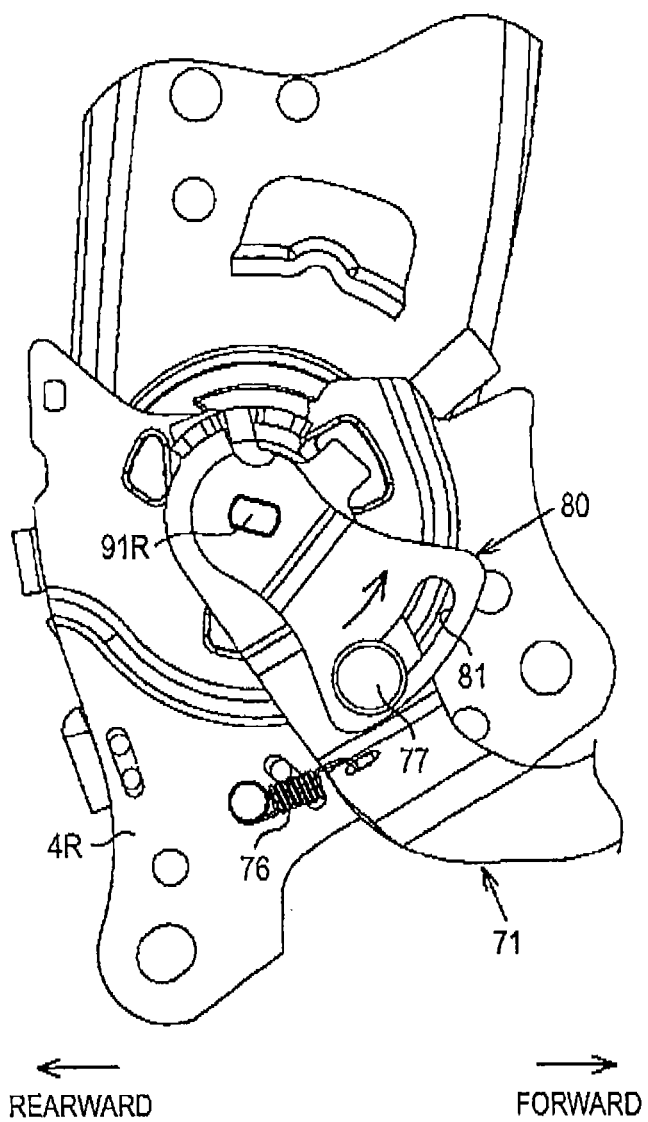
FIG. 19 is a side view showing the first operation member and the structure in the vicinity thereof in a second unlock operation state of the second operation member.

In contrast, when the link member 80 is pivoted in the counterclockwise direction in the drawing in the state shown in FIG. 17, a movement of the pin 77 in the long hole 81 is allowed as shown in FIG. 19 and the pivot of the link member 80 is not transmitted to the first operation member 71.

Next, a release link 105 and a structure in the vicinity thereof will be described.

Figure 20A:
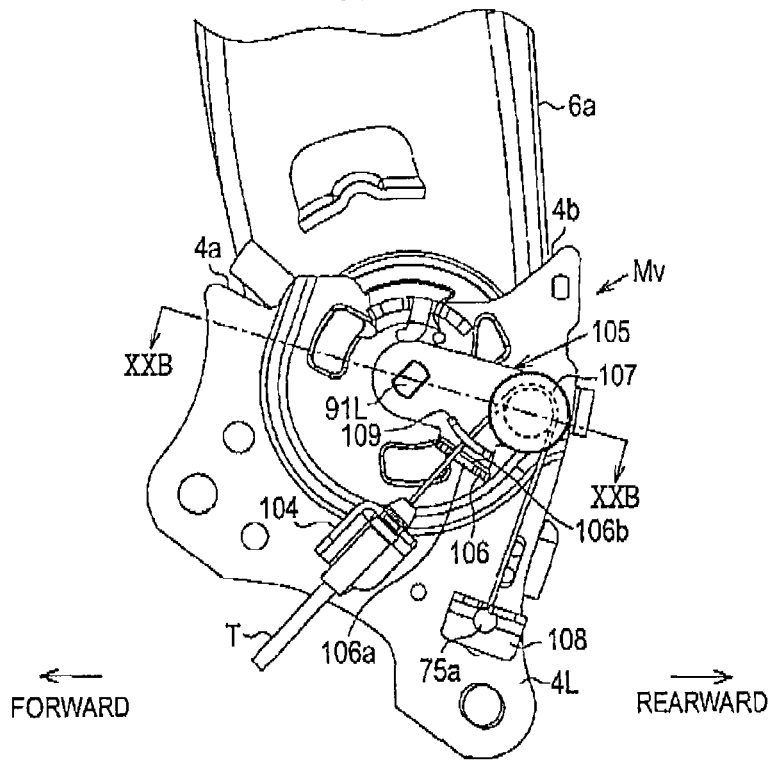
FIG. 20A is a side view showing a release link and a structure in the vicinity thereof in the non-operation states of the first and second operation members.
Figure 20B:
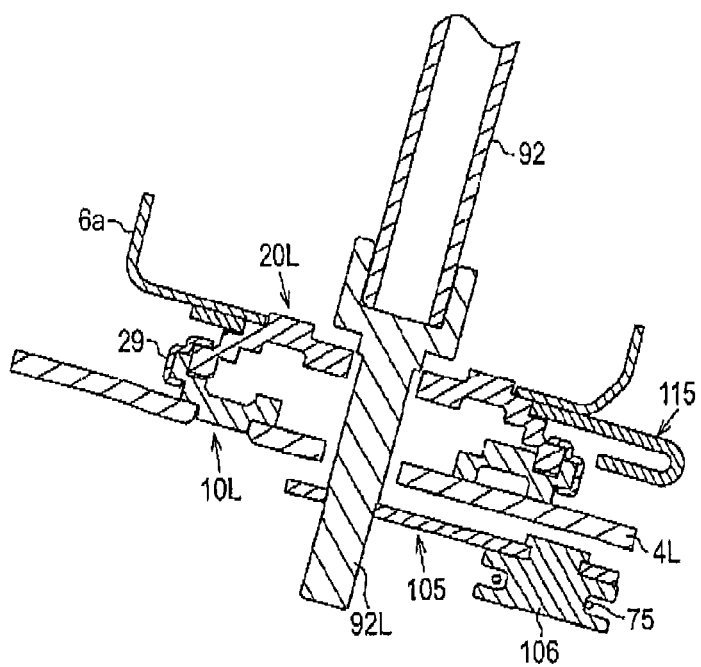
FIG. 20B is a cross-sectional view taken along XXB-XXB line in FIG. 20A.

As shown in FIGS. 20A and 20B, the release link 105 is molded into a substantially I shape, and the tip portion of the hinge shaft 91L is inserted thereinto and fixed thereto. In other words, the release link 105 is pivot-biased all the time in the rotation direction (counterclockwise direction in FIG. 20A) on the side of the lock operation of the cam 34L integrated with the hinge shaft 91L by the spiral spring 35 and, usually, is held at a predetermined initial pivot position therewith.

Also, a substantially L-shaped guide piece 106 that stands to an outer side (front side orthogonal to the paper surface in FIG. 20A) is formed in a lower portion of a longitudinal-direction middle portion of the release link 105. A substantially U-shaped cable insertion groove 106a is formed in the guide piece 106. The guide piece 106 has substantially planar-shaped abutting portions 106b formed in both side portions thereof across the cable insertion groove 106a. Further, a pulley 107 that has an axis which is parallel with the axis of the hinge shaft 91L is axially supported in a tip portion of the release link 105.

A substantially L-shaped cable terminal holding bracket 108 that stands to the outer side (front side orthogonal to the paper surface in FIG. 20A) is fixed to a lower rear portion of the lower plate 4L. The cable 75 that extends from the cable holder 104 which is fixed to a lower end portion of the lower plate 4L extends rearward through the cable insertion groove 106a and hung by the pulley 107 to turn downward and, in addition, a terminal 75a thereof is locked to the cable terminal holding bracket 108. Also, an arc-shaped abutting piece 109 that is convex to a guide piece 106 side between the guide piece 106 and the pulley 107 is fixed to the cable 75.

In the above-described configuration, the abutting portions 106b and the abutting piece 109 are separated when the release link 105 is held at the initial pivot position. Also, the abutting portions 106b are inclined with respect to a tangential direction of the abutting piece 109 at the position of the cable 75.

Accordingly, as shown with the change from FIG. 21A to FIG. 21B, the cable 75 pulls the release link 105 downward via the pulley 107 when the cable 75 is drawn by the second unlock operation of the second operation member 72, and allows the abutting piece 109 to approach the abutting portions 106b while causing the release link 105 to pivot in the clockwise direction in the drawing. A pivot amount of the release link 105 in this case is based on a drawing amount of the cable 75 following the second unlock operation of the second operation member 72 halved on a terminal 75a side thereof and an abutting piece 109 side across the pulley 107, and thus a pivoting speed of the release link 105 is relatively slow.

When the cable 75 is further drawn by the second unlock operation of the second operation member 72 as shown with the change from FIG. 21B to FIG. 21C, the abutting piece 109 abuts against the abutting portions 106b at an arc-shaped topmost portion thereof.

Then, as shown with the change from FIG. 21C to FIG. 21D, the cable 75 directly presses down the guide piece 106 (abutting portions 106b) of the release link 105 by using the abutting piece 109 and causes the release link 105 to pivot in the clockwise direction in the drawing when the cable 75 is further drawn by the second unlock operation of the second operation member 72. A pivot amount of the release link 105 in this case is based on a drawing amount of the cable 75 following the second unlock operation of the second operation member 72, and thus a pivoting speed of the release link 105 is relatively fast.

The cable 75, the abutting portions 106b (guide piece 106), the pulley 107, the cable terminal holding bracket 108 (lower plate 4L), and the abutting piece 109 constitute a speed change mechanism Mv.

The abutting piece 109 and the abutting portions 106b abut in a state of substantial line contact by the arc shape of the abutting piece 109, and thus the transmission of the force therebetween is stabilized. In particular, as shown in FIG. 21C, abutting sites of the abutting piece 109 and the abutting portions 106b at a time when the abutting piece 109 begins to abut against the abutting portions 106b match each other on a center line (that is, drawing direction of the cable 75) of the cable 75, and thus response of the abutting portions 106b pressed by the abutting piece 109, that is, response of the release link 105 is substantially maximized.

Also, in FIG. 21C for example, a distance L1 is set to be shorter than a distance L2 when a distance from a shaft center of the release link 105 to abutting parts of the abutting piece 109 and the abutting portions 106b is assumed to be L1 and a distance from a shaft center of the release link 105 to a shaft center of the pulley 107 is assumed to be L2. In this manner, when compared to a case where the distance from the shaft center of the release link 105 to the shaft center of the pulley 107 is equal to the distance from the shaft center of the release link 105 to the abutting parts of the abutting piece 109 and the abutting portions 106b, a rate of change (pivoting speed) of the pivot amount of the release link 105 with respect to the operation amount of the second operation member 72 can be increased by a multiplier of the value of a ratio thereof (=L2/L1>1) and, in addition, the response of the release link 105 can be improved.

Herein, a relationship between an operation angle α of the second operation member 72 starting from an operation angle (operation amount) of the second operation member 72 at a time when the second operation member 72 is in a state of abutting against the stopper 74b and a movement amount (pivot amount) of the release link 105 and an operation load of the second operation member 72 corresponding thereto will be described with reference to FIG. 22. It is a matter of course that the movement amount of the release link 105 correlates with the rotation angle θ of the cam 34L and the movement amount (pole slide amount) of the first poles 31L to 33L.

Figure 22:
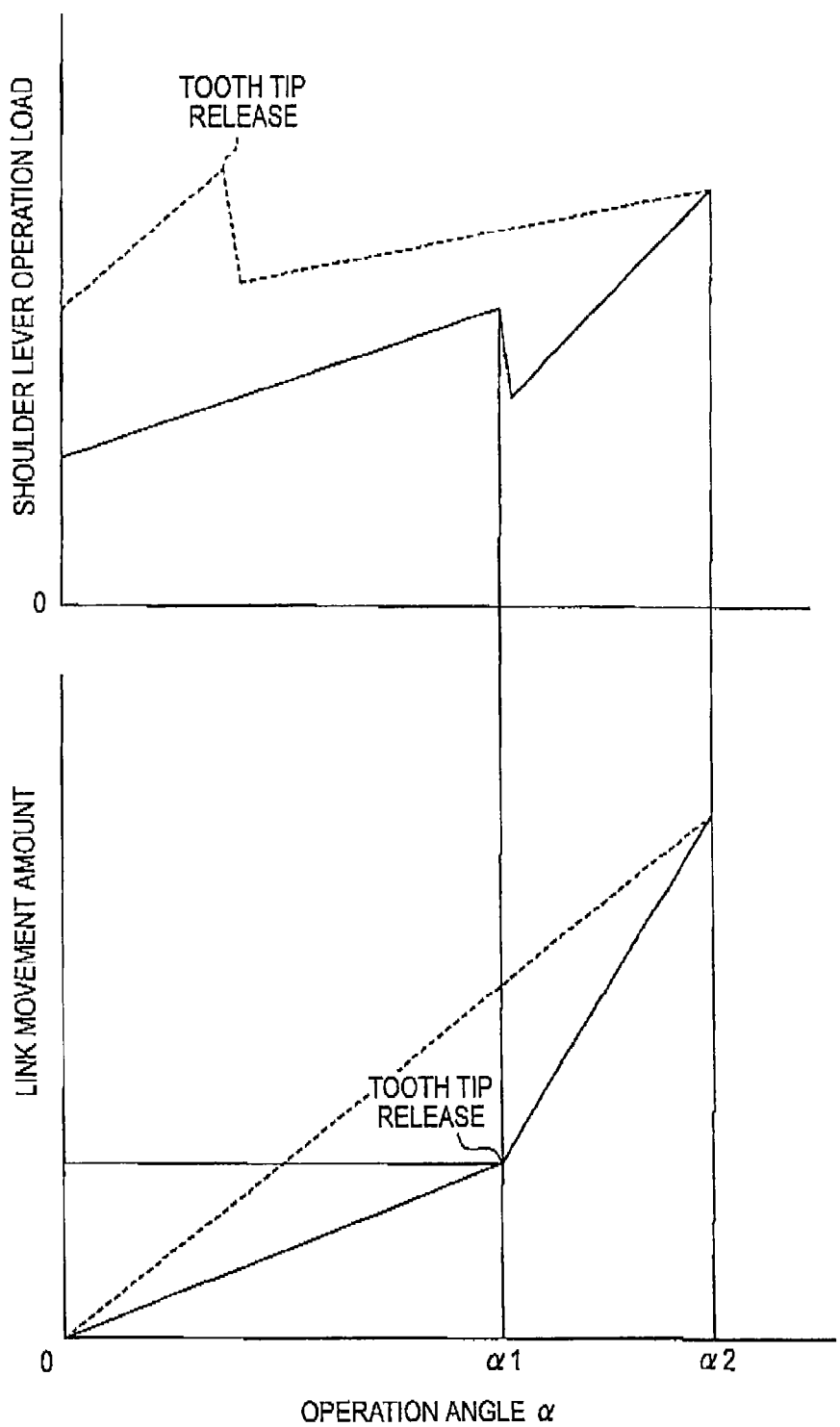
FIG. 22 is a graph showing a relationship between an operation angle of the second operation member and a movement amount of the release link and an operation load of the second operation member.

In FIG. 22, an operation angle α1 represents the operation angle α corresponding to the above-described rotation angle θ4 and the slide amount Sr at a time when the external teeth 43 of the first poles 31L to 33L and the internal teeth 22 of the second member 20L are tooth tip-released. Also, an operation angle α2 (>α1) represents the operation angle α of the second operation member 72 at a time when the second operation member 72 is in a state of abutting against the stopper 74a, that is, the maximum operation angle α2. The graph drawn with the solid line corresponds to this embodiment, and the graph drawn with the dashed line corresponds to an example of the related art. Therein, the movement amount of the release link 105 and the operation load of the second operation member 72 at the maximum operation angle α2 are common and compared to each other.

As is apparent in the drawing, in this embodiment, a rate of change (pivoting speed) of the pivot amount of the release link 105 with respect to the operation angle α of the second operation member 72 at the operation angle α1 is doubled. In other words, a state shown in FIG. 21C where the abutting sites of the abutting piece 109 and the abutting portions 106b match each other on the center line of the cable 75 is set to coincide with the timing of the above-described tooth tip release.

This is to suppress a maximum operation load by relatively decreasing the movement speed of the release link 105 during an operation period in which the external teeth 43 of the first poles 31L to 33L and the internal teeth 22 of the second member 20L are in an engagement state immediately after the initiation of the second unlock operation of the second operation member 72 and operation resistance such as contact resistance thereof and frictional resistance in the vicinity thereof reaches a peak at a timing of the tooth tip release.

Alternatively, this is to relatively increase the movement speed of the release link 105 at a timing of sudden decrease in the operation load and rapidly complete the operation of the locking mechanism 5L or the like thereafter (for example, rise of the first pole side engaging projecting portion 46L from the first lock engagement surface 65 to the first unlock engagement surface 62, that is, memory setting, or the like).

Figure 23:
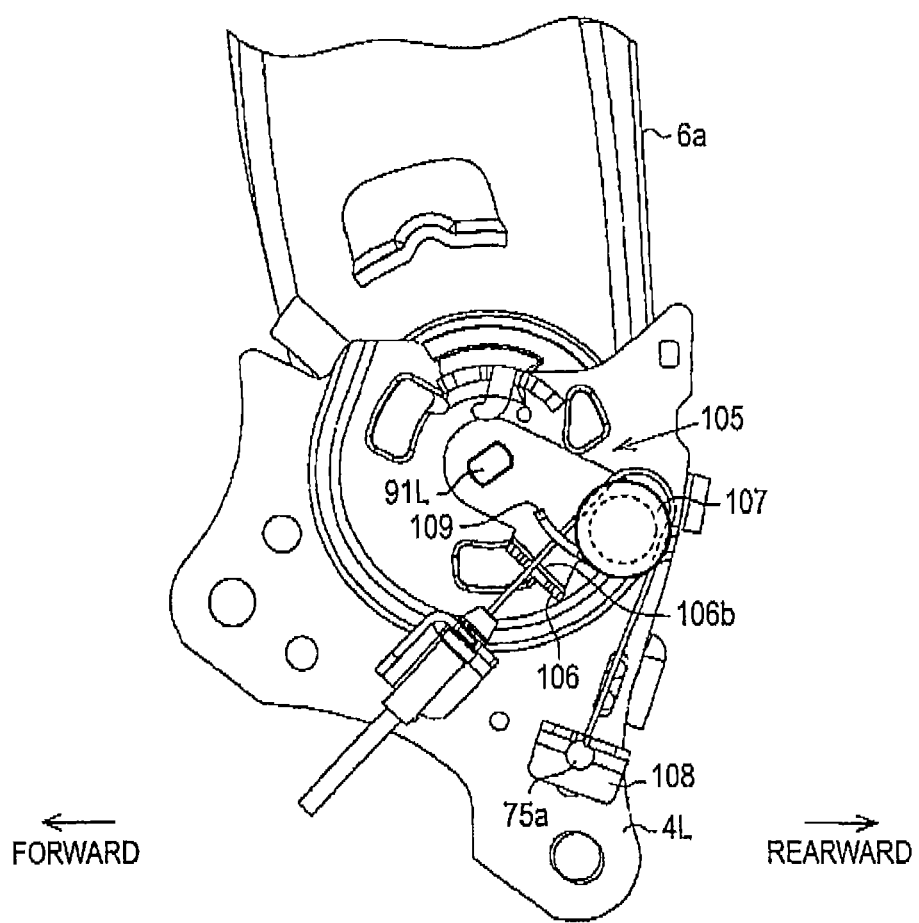
FIG. 23 is a side view showing the release link and the structure in the vicinity thereof in the first unlock operation state of the first operation member.

As shown in FIG. 23, the release link 105 is pivoted in the clockwise direction in the drawing when the first operation member 71 is in the first unlock operation state. In this case, the release link 105 separates the abutting portions 106b from the abutting piece 109 and separates the pulley 107 from a turning portion of the cable 75. In other words, the pivot of the release link 105 is not transmitted to the second operation member 72.

When the hinge shaft 91L, the connection shaft 92, and the hinge shaft 91R are pivoted along with the release link 105 by the second unlock operation of the second operation member 72, the link member 80 is pivoted integrally therewith. In this case, the movement of the pin 77 in the long hole 81 is allowed as described above, and the pivot of the link member 80 is not transmitted to the first operation member 71.

In this manner, oscillation of the other one of the first and second operation members 71 and 72 is suppressed by the unlock operation of one of the first and second operation members 71 and 72.

Next, an effect of this embodiment will be described.

In this embodiment, the rate of change of the movement amount of the release link 105 (and the cam 34L and the like) with respect to the operation amount of the second operation member 72 is changed according to the operation position of the second operation member 72 by the speed change mechanism Mv, and thus the release link 105 can be moved at an optimum rate of change with respect to the operation of the locking mechanism 5L at the operation position.

The following effects can be achieved by this embodiment as described above.

(1) In this embodiment, the rate of change of the pivot amount (movement amount) of the release link 105 with respect to the operation amount of the second operation member 72 is changed according to the operation position of the second operation member 72 by the speed change mechanism Mv, and thus the release link 105 can be pivoted (moved) at an optimum rate of change with respect to the operation of the locking mechanism 5L or the like at the operation position.

(2) In this embodiment, the abutting piece 109 is separated from the abutting portions 106b of the release link 105 in a stage preceding the initiation of the operation of the second operation member 72, and the release link 105 is pivoted (moved) with respect to the lower plate 4L while being drawn to the cable 75 via the pulley 107. Accordingly, the pivot amount of the release link 105 is based on the drawing amount of the cable 75 correlating with the operation amount of the second operation member 72 halved on the terminal 75a side thereof and the abutting piece 109 side across the pulley 107, and thus the pivoting speed of the release link 105 can be relatively slow.

In a stage following the operation of the second operation member 72 when the abutting piece 109 abuts against the abutting portions 106b of the release link 105, the release link 105 is pivoted (moved) while being drawn by the cable 75 in the abutting portions 106b. Accordingly, the pivot amount of the release link 105 is based on the drawing amount of the cable 75 correlating with the operation amount of the second operation member 72, and thus the pivoting speed of the release link 105 can be relatively fast.

In this manner, the release link 105 can be moved (pivoted) at an optimum rate of change (pivoting speed) with respect to the operation of the locking mechanism 5L or the like at the operation position of the second operation member 72 by using the extremely simple structure of the pulley 107 provided in the release link 105 and the like.

(3) In this embodiment, the abutting piece 109 is molded into an arc shape to be convex toward the abutting portions 106b, and thus the abutting piece 109 and the abutting portions 106b abut in a state of substantial line contact and the transmission of the force therebetween is stabilized.

(4) In this embodiment, the distance L1 from the shaft center of the release link 105 to the abutting parts of the abutting piece 109 and the abutting portions 106b are set to be shorter than the distance L2 from the shaft center of the release link 105 to the shaft center of the pulley 107. As such, when compared to a case where the distance from the shaft center of the release link 105 to the shaft center of the pulley 107 is equal to the distance from the shaft center of the release link 105 to the abutting parts of the abutting piece 109 and the abutting portions 106b, the rate of change (pivoting speed) of the pivot amount (movement amount) of the release link 105 with respect to the operation amount of the second operation member 72 can be increased by the multiplier of the value of the ratio thereof (=L2/L1>1).

(5) In this embodiment, the movement speed of the release link 105 is relatively decreased until the tooth tip release of the external teeth 43 of the first poles 31L to 33L and the internal teeth 22 of the second member 20L that are engaged with each other. As such, a sudden increase in the operation load can be suppressed. Alternatively, the possibility of an immediate misoperation of the locking mechanism 5L or the like caused by a misoperation of the second operation member 72 can be reduced.

Also, the movement speed of the release link 105 is relatively increased at a timing of the tooth tip release. As such, the operation of the locking mechanism 5L or the like thereafter (for example, rise of the first pole side engaging projecting portion 46L from the first lock engagement surface 65 to the first unlock engagement surface 62, that is, memory setting, or the like) can be completed rapidly.

(6) In this embodiment, it is not necessary to change the locking mechanism 5L itself according to the change in the pivoting speed of the release link 105 (cam 34L), and thus design load can be reduced.

(7) In this embodiment, the timing shift can be suppressed with the difference in both of the movement speeds between the first pole 31L and the second poles 31R to 33R although the operation amount of the second operation member 72 at a time when the first pole side engaging projecting portion 46L rises from the first lock engagement surface 65 to the first unlock engagement surface 62 is set to be larger than the operation amount of the second operation member 72 at a time when the second pole side engaging projecting portion 46R rises from the second lock engagement surface 27 to the second unlock engagement surface 26 due to component irregularities or the like. In the second unlock operation state by the second operation member 72, the impossibility of integral pivoting of the memory ring 60 and the second member 20L, that is, the impossibility of the memory position setting or the like can be suppressed regardless of the forward tilt of the seat back exceeding the adjustment area.

(8) In this embodiment, in the second unlock operation state by the second operation member 72, the radial-direction movement amount of the first pole 31L at a time when the first pole side engaging projecting portion 46L rises from the first lock engagement surface 65 to the first unlock engagement surface 62 is set to be larger than the radial-direction movement amount of the second poles 31R to 33R at a time when the second pole side engaging projecting portion 46R rises from the second lock engagement surface 27 to the second unlock engagement surface 26. As such, the possibility of the operation amount of the second operation member 72 at a time when the first pole side engaging projecting portion 46L rises from the first lock engagement surface 65 to the first unlock engagement surface 62 being smaller than the second operation member 72 at a time when the second pole side engaging projecting portion 46R rises from the second lock engagement surface 27 to the second unlock engagement surface 26 due to component irregularities or the like can be reduced. Accordingly, in the second unlock operation state by the second operation member 72, the impossibility of the forward tilt of the seat back exceeding the adjustment area can be suppressed regardless of the integral pivoting of the memory ring 60 and the second member 20L, that is, performing of memory position setting or the like.

(9) In this embodiment, the setting of the changes of the operations of the first pole 31L (32L and 33L) and the second poles 31R to 33R in the second unlock operation state by the second operation member 72 can be performed with the extremely simple structure using the shapes of the first pole side groove cam portion 44L (inner wall surface 44aL) and the second pole side groove cam portion 44R (inner wall surface 442R).

(10) As shown in FIG. 5B, in this embodiment, both the engaging projecting portion 24L of the second member 20L (accommodating concave portion 23) that is associated with the setting of the adjustment area of the seat back and the first pole side engaging projecting portion 46L of the first pole 31L that is associated with the memory position setting or the like are arranged in the radial direction in such a manner as to be at least partially overlapped at an axial-direction position of the memory ring 60 to be engageable with the memory ring 60. As such, an increase in size in the axial direction can be suppressed unlike in a case where the setting of the adjustment area of the seat back is performed independently of the memory ring 60 by shifting the engaging projecting portion 24L of the second member 20L from an axial-direction position of the memory ring 60.

(11) In this embodiment, the angular position of the seat back can be set to the fixed point return position following the release of the forward tilt in a case where the seat back is tilted forward to a predetermined forward tilt position from a state (seated area) of being further tilted rearward than a predetermined angular position. As such, in a case where the seat back is tilted forward to the predetermined forward tilt position from a state of being significantly tilted rearward in the second unlock operation state by the second operation member 72, the return to the state following the release of the forward tilt, that is, the state that is not suitable for use for general purposes can be avoided. In other words, the inconvenience of having to newly adjust the angular position so as to be in a state that is suitable for use for general purposes can be reduced by setting the angular position of the seat back to the fixed point return position.

(12) In this embodiment, the first unlock operation and second unlock operation can be performed independently of each other by the first operation member 71 and the second operation member 72 and a misoperation can be suppressed. In particular, the maximum operation amount of the first operation member 71 is set to be smaller than the operation amount necessary for the second unlock operation, and the possibility of the second unlock operation can be reduced even when the first operation member 71 is operated to the maximum.

(13) In this embodiment, the seat back can be returned to the memory position following the release of the forward tilt in a case of the forward tilt to the predetermined forward tilt position when the seat back is in the sitting area.

(14) In this embodiment, the elastic deformation in which the diameter is decreased can be easily performed when compared to a case where, for example, the memory ring 60 is extended to the tip since the fixed point return projecting portion 63 is arranged in a part of the tip (divided part S) of the memory ring 60.

Second Embodiment

A second embodiment of the vehicle seat apparatus including the walk-in mechanism will be described with reference to FIGS. 24 to 30. In general, the second embodiment is changed in configuration in such a manner that the speed change mechanism of the first embodiment is installed on the second operation member side, and thus detailed description of similar parts will be omitted.

Figure 24:
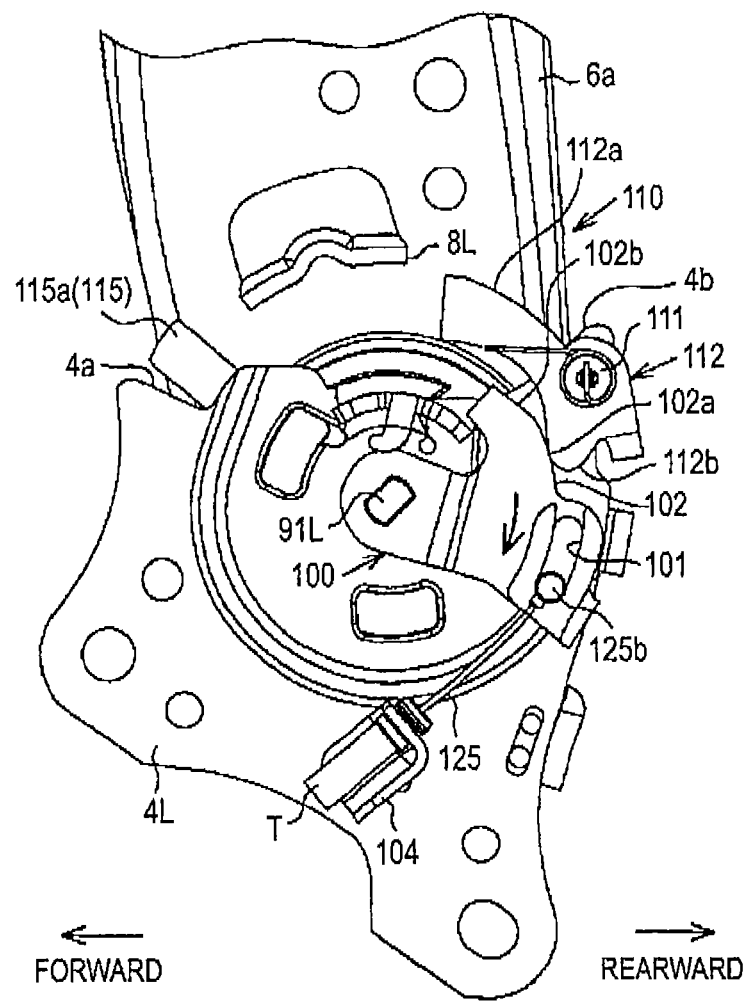
FIG. 24 is a side view showing a release link and a structure in the vicinity thereof in non-operation states of first and second operation members according to a second embodiment disclosed here.

As shown in FIG. 24, the release link 100 that replaces the release link 105 is molded into a substantially L shape, and the tip portion of the hinge shaft 91L is inserted thereinto and fixed thereto. In other words, the release link 100 is pivot-biased all the time in the rotation direction (counterclockwise direction in FIG. 24) on the side of the lock operation of the cam 34L integrated with the hinge shaft 91L by the spiral spring 35 and, usually, is held at a predetermined initial pivot position therewith. Also, an arc-shaped long hole 101 about the hinge shaft 91L is formed in the tip portion of the release link 100.

A terminal 125b of a cable 125 that extends from the cable holder 104 (second operation member) is inserted in a slidable manner into the long hole 101. In a state where the release link 100 is held at the initial pivot position, the terminal 125b of the cable 125 is positioned in one end portion (lower end portion) of the long hole 101. Accordingly, the release link 100 is pivoted along with the hinge shaft 91L when the cable 125 is drawn. In this case, the cam 34L integrated with the hinge shaft 91L is in the second unlock operation against the biasing force of the spiral spring 35 as described above.

Figure 25:
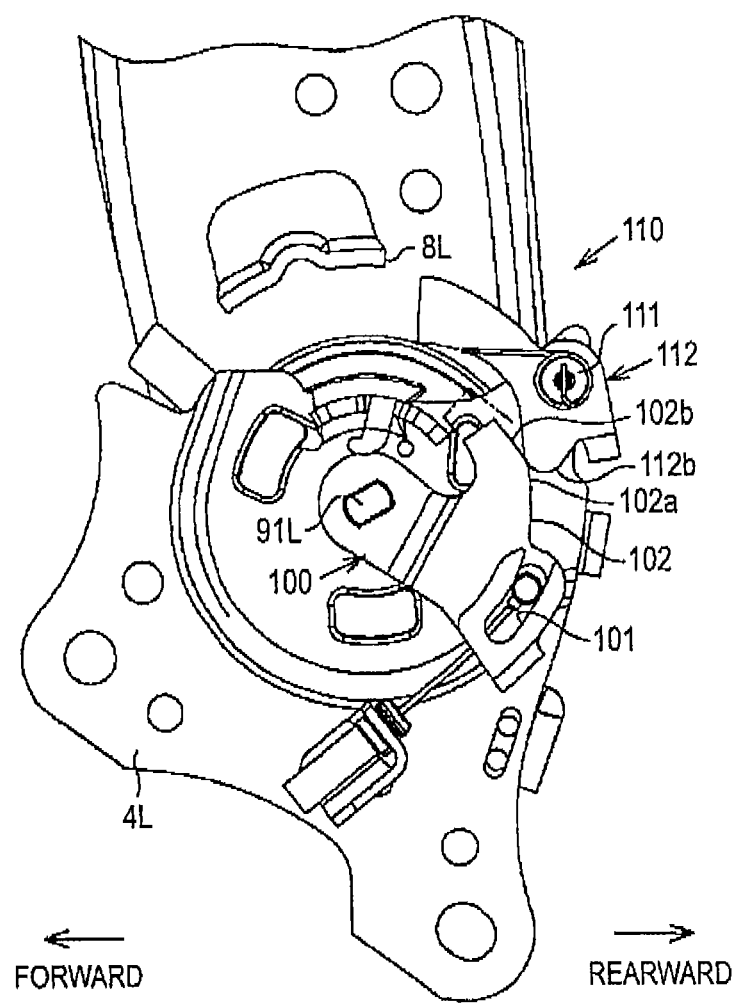
FIG. 25 is a side view showing the release link and the structure in the vicinity thereof in a first unlock operation state of the first operation member.

Also, as shown in FIG. 25, a movement of the terminal 125b in the long hole 101 is allowed when the release link 100 is pivoted in the clockwise direction in the drawing, and the pivot of the release link 100 is not transmitted to the cable 125 or the like.

As shown in FIG. 26, a second operation member 121 that replaces the second operation member 72 is biased and held at the initial pivot position (operation angle) abutting against the stopper 74b by a return spring (not shown), and a speed change mechanism Mv1 is disposed on a second operation member 121 side. In other words, a substantially L-shaped guide piece 122 that stands to an outer side (front side orthogonal to the paper surface in FIG. 26) is formed in a lower portion of a longitudinal-direction middle portion of the second operation member 121. A substantially U-shaped cable insertion groove 122a is formed in the guide piece 122. The guide piece 122 has substantially planar-shaped abutting portions 122b formed in both side portions thereof across the cable insertion groove 122a. Further, a pulley 123 that has an axis which is parallel with the axis of the shaft 73 is axially supported in a further shaft 73-sided middle portion of the second operation member 121 than the guide piece 122.

A substantially L-shaped cable terminal holding bracket 124 that stands to the outer side (front side orthogonal to the paper surface in FIG. 26) between and below the shaft 73 and the pulley 123 is fixed to the mounting member 6b. The cable 125 that extends from the cable holder 6c extends upward through the cable insertion groove 122a, turns upward to be capable of being wound around the pulley 123 and, in addition, a terminal 125a thereof is locked to the cable terminal holding bracket 124. Also, an arc-shaped abutting piece 126 that is convex to a guide piece 122 side between the guide piece 122 and the pulley 123 is fixed to the cable 125.

In the above-described configuration, the abutting portions 122b and the abutting piece 126 abut against each other when the second operation member 121 is held at the initial pivot position. Accordingly, the abutting piece 126 and the abutting portions 122b abut in a state of substantial line contact by the arc shape of the abutting piece 126, and the transmission of the force therebetween is stabilized. Also, the abutting portions 122b are inclined with respect to a tangential direction of the abutting piece 126 at the position of the cable 125.

Figure 27A:
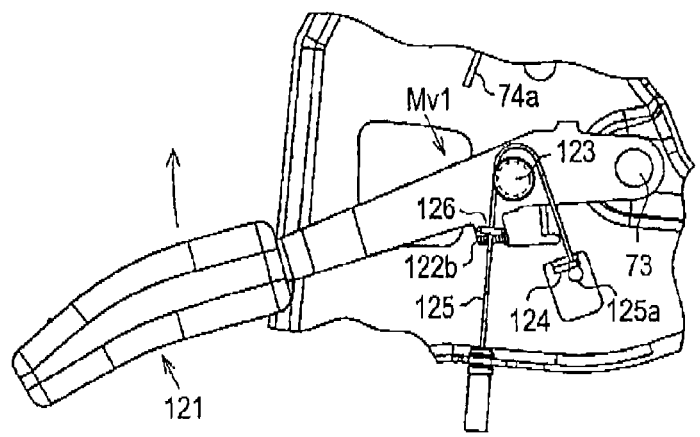
FIGS. 27A to 27C are explanatory views showing an operation of a speed change mechanism in a second unlock operation state of the second operation member.
Figure 27B:
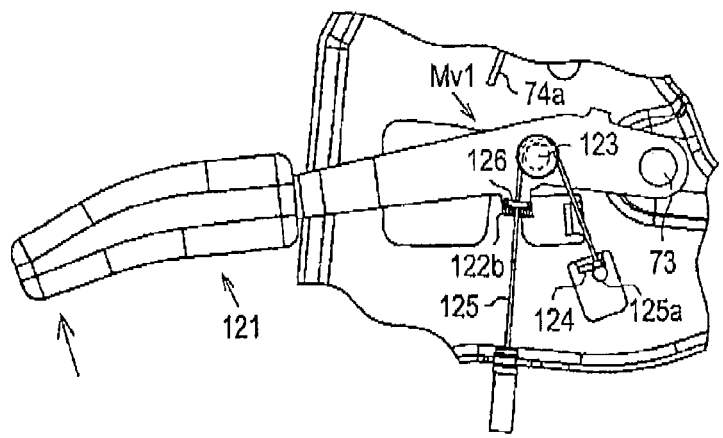

As shown with the change from FIG. 27A to FIG. 27B, when the second operation member 121 is in the second unlock operation, the cable 125 is drawn as the abutting piece 126 is pressed by the abutting portions 122b. In this manner, the release link 100 is pivoted in the clockwise direction in the drawing as one end portion (lower end portion) of the long hole 101 is pressed by the terminal 125b. The release link 100 is pivoted. In this case, a pivot amount of the release link 100 is based on a drawing amount of the cable 125 correlating with an operation angle (operation amount) of the second operation member 121, and thus a pivoting speed of the release link 100 is relatively slow.

As shown in FIG. 27B, in a state where the abutting piece 126 begins to be separated from the abutting portions 106b, abutting sites thereof match each other on a center line of the cable 125, and thus response of the abutting piece 126 pressed by the abutting portions 122b, that is, response of the release link 100 is maximized. Also, in this case, the pulley 123 reaches a turning portion of the cable 125.

Figure 27C:
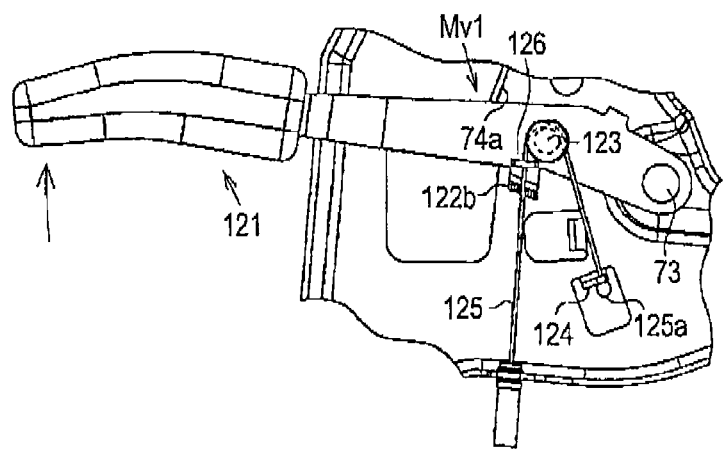

Accordingly, as shown with the change from FIG. 27B to FIG. 27C, the cable 125 is drawn by the pulley 123 while being unwound from the pulley 123 when the second unlock operation of the second operation member 121 is in further progress. In this case, the drawing amount of the cable 125 is based on the operation amount of the second operation member 121 doubled on a terminal 125a side thereof and an abutting piece 126 side across the pulley 123, and thus the pivoting speed of the release link 100 is relatively fast.

Also, the cam 34L that is integrated with the hinge shaft 91L is in the second unlock operation against the biasing force of the spiral spring 35 by the pivot of the release link 100 following the second unlock operation of the second operation member 121 as described above.

As described above, the relationship between the operation angle (operation amount) a of the second operation member 121 and the movement amount (pivot amount) of the release link 105 and the operation load of the second operation member 72 is obtained in a similar manner to the first embodiment (refer to FIG. 22).

As shown in FIG. 25, when the hinge shaft 91R, the connection shaft 92, and the hinge shaft 91L are pivoted along with the link member 80 by the first unlock operation of the first operation member 71, the release link 100 is pivoted integrally therewith. In this case, the movement of the terminal 125b in the above-described long hole 101 is allowed, and the pivot of the release link 100 is not transmitted to the second operation member 121.

Also, when the hinge shaft 91L, the connection shaft 92, and the hinge shaft 91R are pivoted along with the release link 100 by the second unlock operation of the second operation member 121, the link member 80 is pivoted integrally therewith. In this case, the movement of the pin 77 in the above-described long hole 81 is allowed, and the pivot of the link member 80 is not transmitted to the first operation member 71.

In this manner, oscillation of the other one of the first and second operation members 71 and 72 is suppressed by the unlock operation of one of the first and second operation members 71 and 72.

As shown in FIG. 24, a substantially arcuate switching piece 102 that extends upward in the circumferential direction about the hinge shaft 91L is formed in a longitudinal-direction middle portion of the release link 100. An outer circumferential surface of a base end portion of the switching piece 102 has an operation regulation surface 102a as a circular first cam surface formed about the hinge shaft 91L. Also, an outer circumferential surface of a tip portion of the switching piece 102 has a substantially linear-shaped operation allowing surface 102b formed toward a further inner circumferential side than the circular shape along the operation regulation surface 102a toward the tip. The switching piece 102 constitutes a stopper mechanism 110 that regulates the rearward tilt of the seat back at the fixed point return position (predetermined regulation angular position) in a case where the second operation member 72 is in the second unlock operation when the seat back is in the sitting area.

Figure 28:
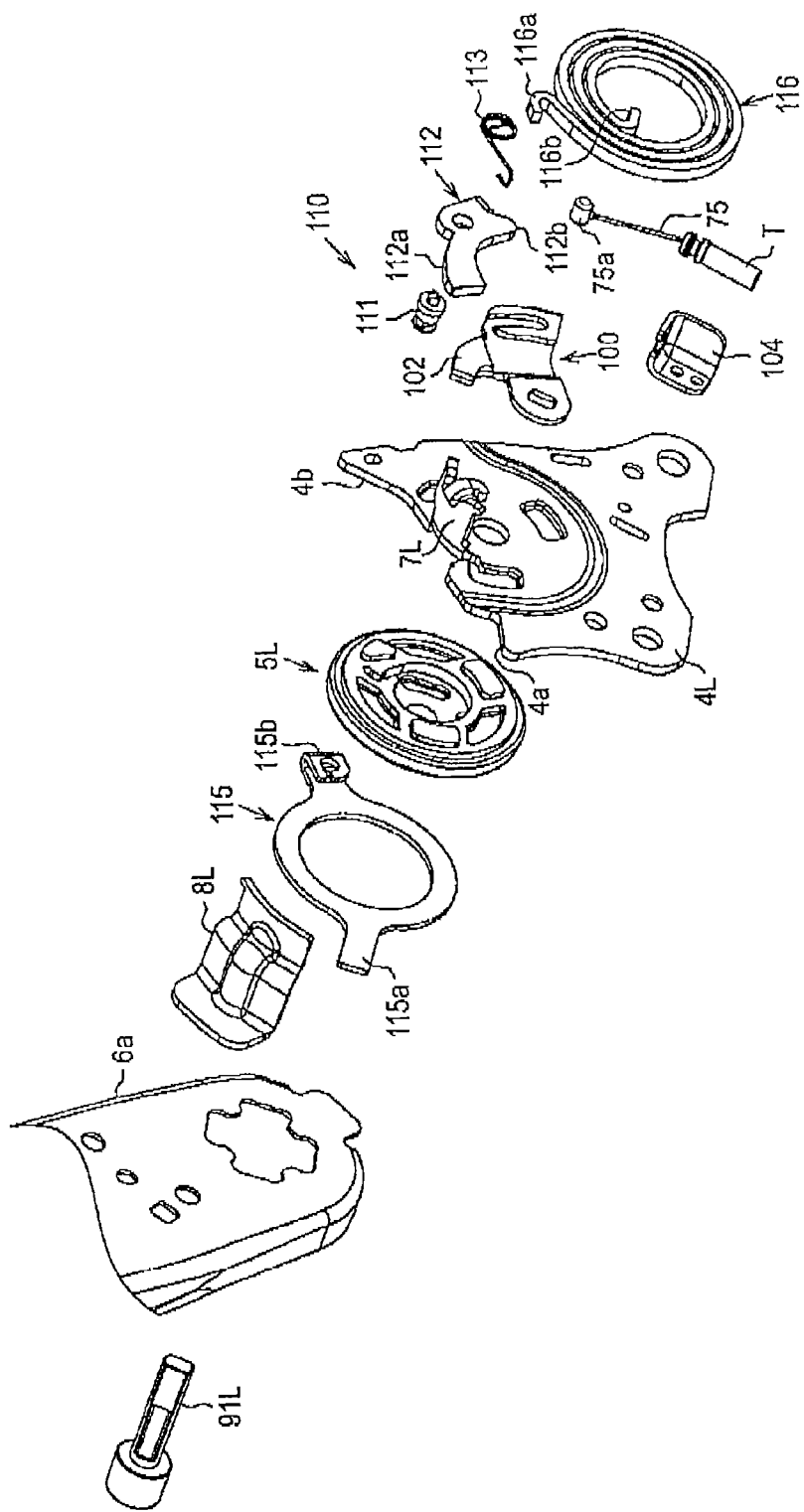
FIG. 28 is an exploded perspective view showing a stopper mechanism.

In other words, as shown in FIG. 28 as well, the stopper mechanism 110 is configured to have the movable flange 8L, the switching piece 102, a stopper link 112 that is connected in a pivotable manner by a pin 111 in an upper rear portion (that is, in the vicinity of the rear side stopper 4b) of the lower plate 4L above the switching piece 102, and a stopper link biasing member 113.

The stopper link 112 has a substantially arcuate stopper piece 112a that is formed from a plate material or the like and extends toward the movable flange 8L substantially along the circumferential direction about the hinge shaft 91L, and has a substantially bay-shaped engagement surface 112b as a second cam surface which extends downward toward the release link 100 (switching piece 102). A further pivoting of the stopper link 112 is regulated as the engagement surface 112b abuts against the outer circumferential surface of the switching piece 102 when being pivoted basically in the clockwise direction in the drawing around the pin 111.

The stopper link biasing member 113 is formed from a torsional coil spring or the like, and one terminal thereof is locked to the pin 111 which is fixed to the lower plate 4L and the other terminal is locked to the stopper piece 112a to bias the stopper link 112 to a side of pivot in the clockwise direction in the drawing around the pin 111.

Herein, an operation of the stopper mechanism 110 will be described.

Figures 29A, 29B, 29C:
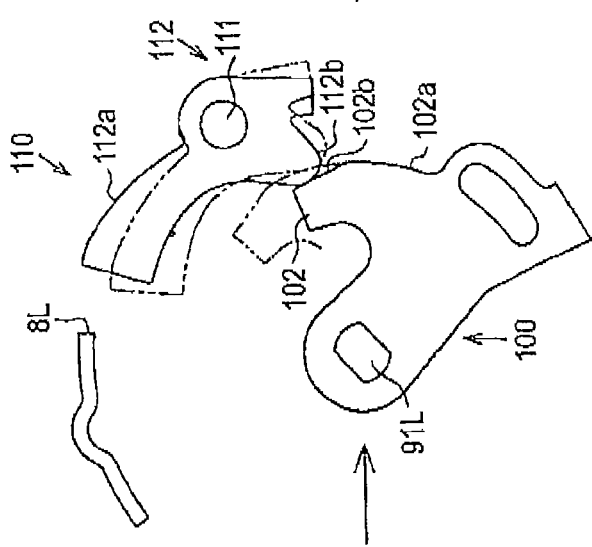
FIGS. 29A to 29C are explanatory views showing an operation of the stopper mechanism at a time when a seat back is in a sitting area.

In FIG. 29A, the second operation member 72 is in a non-operation state and the release link 100 is held at the initial pivot position. Also, the seat back is relatively forward tilt side-sided in the sitting area. In this case, the stopper link 112 that is pivot-biased by the stopper link biasing member 113 abuts against the operation regulation surface 102a of the switching piece 102 on the engagement surface 112b. Accordingly, the stopper link 112 causes the stopper piece 112a to approach to the hinge shaft 91L side as the engagement surface 112b is relatively pressed to the radial-direction outer side about the hinge shaft 91L by the operation regulation surface 102a. The outer circumferential surface of the stopper piece 112a is arranged on a further inner circumferential side than the movable flange 8L substantially along the circumferential direction about the hinge shaft 91L.

Further, the movable flange 8L further precedes forward with respect to the seat than a front end of the stopper piece 112a, and opens the stopper piece 112a upward.

When the second operation member 72 is in the second unlock operation state as shown in FIG. 29B, the operation allowing surface 102b of the switching piece 102 reaches the engagement surface 112b of the stopper link 112 following the pivot of the release link 100 in the clockwise direction in the drawing, that is, the operation regulation surface 102a of the switching piece 102 releases the engagement surface 112b of the stopper link 112 so that the stopper piece 112a of the stopper link 112 that is pivot-biased by the stopper link biasing member 113 projects to block the pivot trajectory of the movable flange 8L.

Accordingly, even when the seat back in this state is to be tilted rearward, the tilt is regulated at a point of time when the movable flange 8L abuts against the stopper piece 112a as shown in FIG. 29C. In this case, the seat back is set to the fixed point return position.

Also, the stopper piece 112a that projects in such a manner as to block the pivot trajectory of the movable flange 8L following the second unlock operation of the second operation member 72 is pressed again by the operation regulation surface 102a which is moved to the stopper piece 112a as the release link 100 is pivoted in the counterclockwise direction in the drawing following the release of the second operation member 72. In this manner, the outer circumferential surface of the stopper piece 112a is arranged on a further inner circumferential side than the movable flange 8L substantially along the circumferential direction about the hinge shaft 91L. In other words, the biasing force of the spiral spring 35 that lock-operates the cam 34L is set to be sufficiently larger than the biasing force of the stopper link biasing member 113.

Figure 30A:
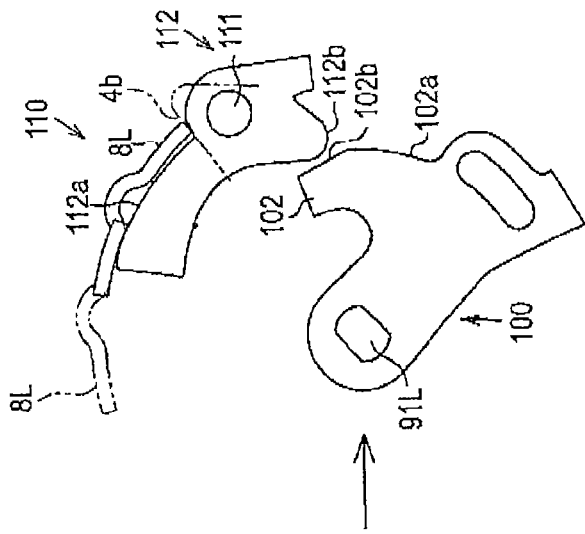
FIGS. 30A to 30C are explanatory views showing the operation of the stopper mechanism at a time when the seat back is in a non-sitting area.

In FIG. 30A, the second operation member 72 is in a non-operation state, and the release link 100 is held at the initial pivot position. Also, the seat back is relatively rearward tilt side-sided in the non-sitting area. In this case, the movable flange 8L is positioned above the stopper piece 112a and regulates the pivot of the stopper link 112 in the clockwise direction in the drawing about the pin 111.

Figure 30B:
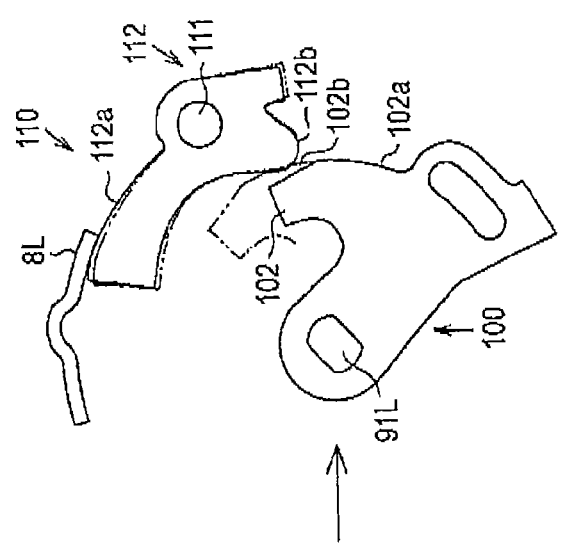

When the second operation member 72 is in the second unlock operation state as shown in FIG. 30B, the release link 100 is pivoted in the clockwise direction in the drawing with the stopper link 112 whose pivot is regulated by the movable flange 8L being mounted.

Figure 30C:
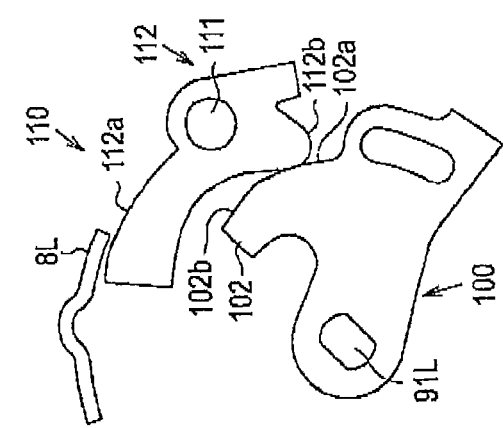

Accordingly, as shown in FIG. 30C, the stopper piece 112a causes the pivot trajectory of the movable flange 8L to remain open, and the seat back is tilted rearward until the movable flange 8L abuts against the rear side stopper 4b, that is, until reaching the large tilt position.

Even when the first operation member 71 is in the first unlock operation state as shown in FIG. 25, the release link 100 is pivoted in the clockwise direction in the drawing. However, the operation amount of the first operation member 71 in this case is relatively small, and the release link 100 (switching piece 102) is in sliding contact with the engagement surface 112b of the stopper link 112 within the range of the operation regulation surface 102a. Accordingly, the stopper piece 112a of the stopper link 112 does not block the pivot trajectory of the movable flange 8L regardless of the state (sitting area or non-sitting area) of the seat back. In other words, in the first unlock operation state of the first operation member 71, the seat back can be angularly adjusted in the adjustment area without being hindered by the stopper mechanism 110.

In FIG. 28, a relay ring 115 that is interposed in a pivotable manner between the back side frame 6a and the locking mechanism 5L has a pressed piece 115a that extends in the radial direction on an upper front side and a cable connection portion 115b that extends in the radial direction on a rear side.

The pressed piece 115a is arranged on the pivot trajectory of the movable flange 8L at a time of the forward tilt of the seat back, and the relay ring 115 is integrally pivoted as the pressed piece 115a is pressed by the movable flange 8L following the forward tilt of the seat back. The cable connection portion 115b is connected to the above-described slide lock device via a cable (not shown). The relay ring 115 is pivoted following the tilt of the seat back to the forward tilt position, and releases the slide lock device. In this manner, the seat cushion is slidingly moved forward with respect to the vehicle floor.

Also, a spiral spring 116 on a lower right side in FIG. 28 pivot-biases the seat back in the forward tilt direction with respect to the seat cushion described above. An outer end portion 116a thereof is locked to the movable flange 8L and an inner end portion 116b is locked to the fixed flange 7L.

The relay ring 115 and the spiral spring 116 are provided on the opposite side of the seat as well.

As described above, according to this embodiment, the following effects can be achieved in addition to the (1), (3), and (5) to (14) of the first embodiment.

(1) In this embodiment, the cable 125 is drawn as the abutting piece 126 is pressed by the abutting portions 122b in a stage preceding the initiation of the operation of the second operation member 121. The release link 100 is pivoted (moved) while being drawn by the cable 125. As such, the pivot amount of the release link 100 is based on the drawing amount of the cable 125 correlating with the operation amount of the second operation member 121, and thus the pivoting speed of the release link 100 can be relatively slow.

In a stage following the operation of the second operation member 121 when the cable 125 is wound around the pulley 123, the cable 125 is drawn by the pulley 123 while being unwound from the pulley 123. The release link 100 is pivoted (moved) while being drawn by the cable 125. In this case, the drawing amount of the cable 125 is based on the operation amount of the second operation member 121 doubled on the terminal 75a side thereof and the abutting piece 126 side across the pulley 123, and thus the pivoting speed of the release link 100 can be relatively fast.

In this manner, the release link 100 can be moved (pivoted) at an optimum rate of change (pivoting speed) by the operation of the locking mechanism 5L or the like at the operation position of the second operation member 121 by using the extremely simple structure of the pulley 123 provided on the second operation member 121 side and the like.

(2) In this embodiment, the tilt of the seat back with respect to the seat cushion in the adjustment area and the tilt of the seat back with respect to the seat cushion to a predetermined forward tilt position can be realized by the locking mechanisms 5L and 5R which are arranged in a concentrated manner around the axis thereof, and the structure can be further simplified.

(3) In this embodiment, in the second unlock operation state of the second operation member 121 or the like, the stopper link 112 where the engagement surface 112b is released from the operation regulation surface 102a is biased by the stopper link biasing member 113 and is pivoted to block the pivot trajectory of the movable flange 8L which corresponds to a rearward tilt direction of the seat back. As such, the rearward tilt-direction tilt of the seat back can be regulated at the angular position (predetermined regulation angular position) which abuts against the stopper link 112 of the movable flange 8L.

(4) In this embodiment, when the seat back is in the non-sitting area (state of being further tilted in the rearward tilt direction than the predetermined angular position), that is, when the seat back is already in a rearward tilt posture to some extent and thus is allowed to be further tilted rearward, the blocking of the pivot trajectory of the movable flange 8L by the stopper link 112 in vain can be hindered by the movable flange 8L.

(5) In this embodiment, the engagement surface 112b abuts against the operation regulation surface 102a even in the first unlock operation state of the first operation member 71. As such, in the first unlock operation state of the first operation member 71, the stopper link 112 that is in sliding contact with the operation regulation surface 102a on the engagement surface 112b opens the pivot trajectory of the movable flange 8L. Accordingly, the tilt of the seat back is not regulated by the stopper link 112 and the adjustment of the angular position of the seat beck in the adjustment area is not hindered.

(6) In this embodiment, the similar stopper mechanism 110 can be constituted even when the switching piece 102 is formed in the link member 80. In other words, the stopper mechanism can be constituted by sharing the stopper link 112 or the like regardless of the presence or absence of a memory function of the locking mechanism.

The above-described embodiments can be changed as follows.

Figure 31:
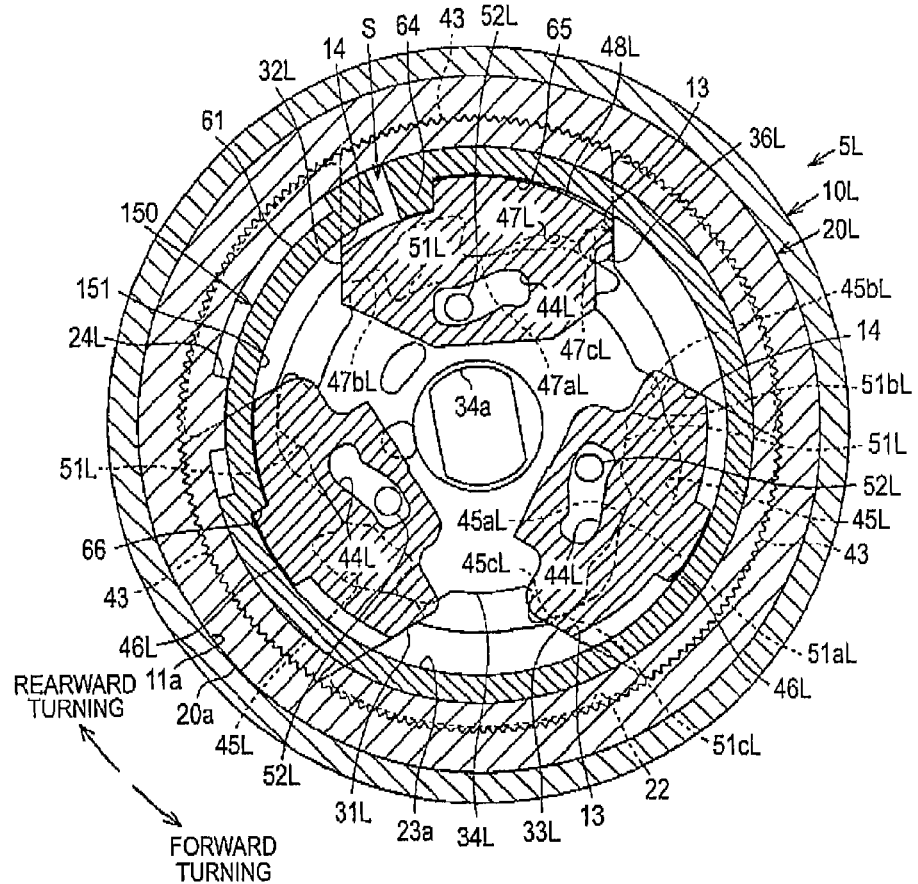
FIG. 31 is a horizontal cross-sectional view showing a modified embodiment disclosed here.

As shown in FIG. 31, a memory ring 150 may have a first unlock engagement surface 151 of the fixed point return projecting portion 63 which is omitted. In this case, the first unlock engagement surface 151 continues to be moved with respect to the first pole side engaging projecting portion 46L until reaching the forward tilt position regardless of the angular position at a time of the forward tilt of the seat back. When the forward tilt is released by pulling up the seat back, the second member 20L is rotated rearward along with the memory ring 150, and a further rearward rotation of the second member 20L along with the memory ring 150 is regulated at a point of time when the first lock engagement surface 65 reaches the first pole side engaging projecting portion 46L. In other words, the seat back can be returned to the memory position by releasing the forward tilt regardless of the angular position at a time of the forward tilt of the seat back.

In the first embodiment, a timing (state shown in FIG. 21C) when the abutting piece 109 and the abutting portions 106b abut against each other and the abutting sites thereof match each other on the center line of the cable 75 may be shifted from the timing when the external teeth 43 of the first poles 31L to 33L and the internal teeth 22 of the second member 20L are tooth tip-released. For example, the tooth tip release may be set to be performed at a timing (for example, state shown in FIG. 21B) preceding the timing when the abutting sites of the abutting piece 109 and the abutting portions 106b match each other on the center line of the cable 75.

In the first embodiment, the distance L1 from the shaft center of the release link 105 to the abutting parts of the abutting piece 109 and the abutting portions 106b may be set to be equal to or longer than the distance L2 from the shaft center of the release link 105 to the shaft center of the pulley 107.

In the first embodiment, the number of the pulleys axially supported by the release link 105 to change the speed of the release link 105 is not limited.

In the second embodiment, the distance from the shaft center of the second operation member 121 to the abutting parts of the abutting piece 126 and the abutting portions 122b may be set to be shorter than the distance from the shaft center of the second operation member 121 to the shaft center of the pulley 123. In this manner, when compared to a case, for example, where the distance from the shaft center of the second operation member 121 to the shaft center of the pulley 123 is equal to the distance from the shaft center of the second operation member 121 to the abutting parts of the abutting piece 126 and the abutting portions 122b, the rate of change (pivoting speed) of the pivot amount of the release link 100 with respect to the operation amount of the second operation member 121 can be increased by the multiplier of the value of the ratio thereof and, in addition, the response of the release link 100 can be improved.

Alternatively, the distance from the shaft center of the second operation member 121 to the abutting parts of the abutting piece 126 and the abutting portions 122b may be set to be equal to or longer than the distance from the shaft center of the second operation member 121 to the shaft center of the pulley 123.

In the second embodiment, the number of the pulleys axially supported by the second operation member 121 to change the speed of the release link 105 is not limited.

In the second embodiment, the connection structure of the second operation member 121 and the hinge shaft 91L is an example and, for example, the terminal 125b of the cable 125 that extends from the second operation member 121 may be directly connected to the hinge shaft 91L.

In the second embodiment, the stopper mechanism 110 may be omitted.

In each of the embodiments, the pivoting speed of the release links 100 and 105 is changed on the assumption that the maximum operation angle α2 of the second operation members 72 and 121 is common to an example of the related art. In contrast, the pivoting speed of the release links 100 and 105 may be changed so as to, for example, more reduce the maximum operation angle of the second operation members 72 and 121 than in the example of the related art.

In each of the embodiments, the abutting pieces 109 and 126 may be molded into a planar shape and the abutting portions 106b and 122b may be molded into an arc shape to be convex toward the abutting pieces 109 and 126. Alternatively, all of the abutting pieces 109 and 126 and the abutting portions 106b and 122b may be molded into a planar shape.

In each of the embodiments, the cables 75 and 125 may not be accommodated in the external cylinder T if the bending between the second operation members 72 and 121 and the release links 100 and 105 can be absorbed.

In each of the embodiments, the pivoting speed (movement speed) of the release links 100 and 105 is changed in the two preceding and following stages according to the operation amount (operation angle α) of the second operation members 72 and 121. However, the pivoting speed (movement speed) of the release links 100 and 105 may be changed in three or more stages.

In each of the embodiments, the speed change mechanism may be configured to have a gear mechanism, a cam mechanism, a link mechanism, or a combination thereof.

In each of the embodiments, the fixed point return position by the fixed point return projecting portion 63 of the memory ring 60 can be set to be any through a change in arrangement thereof. However, the memory position setting or the like does not function when the angular position of the seat back is on a further rearward tilt side than the fixed point return position and thus, preferably, the fixed point return position is set on a further rearward tilt side than, for example, the neutral position.

In each of the embodiments, the fixed point return projecting portion 63 of the memory ring 60 may extend to the tip (divided part 8) of the memory ring 60.

In each of the embodiments, the memory rings 60 and 150 may have a linked annular shape without the divided part S if the elastic deformation is allowed to be reduced in diameter.

In each of the embodiments, the connection structure of the first operation member 71 and the hinge shaft 91R is an example and, for example, the first operation member 71 may be directly connected to the hinge shaft 91R.

In each of the embodiments, the connection relationship between the first operation member 71 and the second operation members 72 and 121 and the hinge shafts 91R and 91L may be reversed.

In each of the embodiments, the adjustment area of the seat back may be set by engaging the engaging projecting portion 24L of the second member 20L (accommodating concave portion 23) with the first pole side engaging projecting portion 46L of the first poles 31L to 33L. In other words, the engaging projecting portion 24L of the second member 20L (accommodating concave portion 23) that is associated with the setting of the adjustment area of the seat back and the first pole side engaging projecting portion 46L of the first pole 31L that is associated with the setting of the memory position or the like may be arranged in such a manner as not to be overlapped at the axial-direction position of the memory ring 60.

Alternatively, the locking mechanism 5L with the memory function may not have the function (engaging projecting portion 24L and pivot allowing portion 61) of setting the adjustment area of the seat back.

In each of the embodiments, what has the symmetrical structure of the locking mechanism 5R may be disposed instead of the locking mechanism 5L. In other words, a locking mechanism that does not have the memory function may be employed.

In each of the embodiments, what has the symmetrical structure of the locking mechanism 5L may be disposed instead of the locking mechanism 5R. In other words, the locking mechanism 5L with the function (engaging projecting portion 24L and pivot allowing portion 61) of setting the adjustment area of the seat back and the memory function may be employed as left and right locking mechanisms alike.

In each of the embodiments, the number of the poles of the locking mechanism 5L may be any if at least two, and any appropriate number may be employed according to a required lock strength, full memory range, and the like. Also, all of the plurality of poles may have the same shape or different shapes. Further, the plurality of poles may not be arranged at equal angular intervals, and the movement directions thereof may not be completely consistent with the radial direction of the hinge shaft 91L.

In each of the embodiments, the number of the poles of the locking mechanism 5R may be any, and any appropriate number may be employed according to a required lock strength, full memory range, and the like. Also, all of the plurality of poles may have the same shape or different shapes. Further, the plurality of poles may not be arranged at equal angular intervals, and the movement directions thereof may not be completely consistent with the radial direction of the hinge shaft 91R.

Also, one of the plurality of poles may be connected to the cam 34R to be in conjunction with the unlock operation thereof, and the other poles may be in conjunction with the unlock operation of the cam 34R via an appropriate connection member.

In each of the embodiments, the adjustment area of the seat back of the single locking mechanism 5R may differ if at least the adjustment area of the seat back of the single locking mechanism 5L is included. Even in this case, the locking mechanism 5R is operated to follow the locking mechanism 5L, and thus both the setting of the memory position and the setting of the adjustment area are available by the device as a whole. However, it is preferable that the locking mechanisms 5L and 5R (engaging projecting portion 24L and engaging projecting portions 24R) work along with each other for the setting of the adjustment area when strength is taken into consideration.

In each of the embodiments, the lower plates 4L and 4R may be integrally formed in the respective first members 10L and 10R. Likewise, both of the back side frames 6a may be integrally formed in the respective second members 20L and 20R.

In each of the embodiments, the fixing relationship between the first member 10L and the second member 20L of the locking mechanism 5L and the seat cushion side (lower plate 4L) and the seat cushion side (back side frame 6a) may be reversed. Likewise, the fixing relationship between the first member 10R and the second member 20R of the locking mechanism 5R and the seat cushion side (lower plate 4R) and the seat cushion side (back side frame 6a) may be reversed.

In each of the embodiments, at least one of both of the hinge shafts 91L and 91R may be integrally formed with the connection shaft 92.

In each of the embodiments, the first and second unlock operations may be performed by omitting the first operation member 71 and switching the operation amount of the second operation members 72 and 121.

In each of the embodiments, the second operation members 72 and 121 may be arranged in a seat cushion rear portion (foot on the rear seat side).

The embodiments disclosed here may be employed in a vehicle seat apparatus that does not include a walk-in mechanism.

The embodiments disclosed here may be applied to other seat adjustment mechanisms such as a vehicle seat sliding apparatus and a lifting apparatus.

An aspect of this disclosure is directed to a vehicle seat operating device including an input side member that performs an operation input, an output side member that is moved based on an operation of the input side member to operate a seat adjustment mechanism, and a speed change mechanism that changes a rate of change of a movement amount of the output side member with respect to an operation amount of the input side member according to an operation position of the input side member.

According to this configuration, the rate of change of the movement amount of the output side member with respect to the operation amount of the input side member is changed according to the operation position of the input side member by the speed change mechanism, and the output side member can be moved at an optimum rate of change with respect to an operation of the seat adjustment mechanism at the operation position.

In the vehicle seat operating device of the aspect of this disclosure, it is preferable that the speed change mechanism includes a base member that axially supports the output side member, a pulley that is axially supported by the output side member, an abutting portion that is disposed in the output side member, a cable that is hung by the pulley to turn, one terminal thereof being locked to the input side member and the other terminal thereof being locked to the base member, and an abutting piece that is fixed to a part of the cable which extends from the pulley toward the input side member and can abut against the abutting portion in response to an increase in the operation amount of the input side member.

According to this configuration, the abutting piece is separated from the abutting portion of the output side member in a stage preceding an initiation of the operation of the input side member, and the output side member is drawn by the cable via the pulley to be pivoted (moved) with respect to the base member. As such, a pivot amount of the output side member is based on a drawing amount of the cable correlating with the operation amount of the input side member halved on a terminal side thereof and an abutting piece side across the pulley, and thus a pivoting speed of the output side member can be relatively slow.

In a stage following the operation of the input side member when the abutting piece abuts against the abutting portion of the output side member, the output side member is pivoted (moved) while being drawn by the cable in the abutting portion. Accordingly, the pivot amount of the output side member is based on the drawing amount of the cable correlating with the operation amount of the input side member, and thus the pivoting speed of the output side member can be relatively fast.

In this manner, the output side member can be moved (pivoted) at an optimum rate of change (pivoting speed) with respect to the operation of the seat adjustment mechanism at the operation position of the input side member by using the extremely simple structure of the pulley provided on the output side member side and the like.

In the vehicle seat operating device of the aspect of this disclosure, it is preferable that the speed change mechanism includes a base member that axially supports the input side member, a pulley that is axially supported by the input side member, an abutting portion that is disposed in the input side member, a cable that turns to be capable of being wound around the pulley in response to an increase in the operation amount of the input side member, one terminal thereof being locked to the output side member and the other terminal thereof being locked to the base member, and an abutting piece that is fixed to a part of the cable which extends from the pulley toward the output side member, abuts the abutting portion, and can be separated from the abutting portion in response to the increase in the operation amount of the input side member.

According to this configuration, the cable is drawn as the abutting piece is pressed by the abutting portion in the stage preceding the initiation of the operation of the input side member. The output side member is pivoted (moved) as the cable is drawn. As such, the pivot amount of the output side member is based on the drawing amount of the cable correlating with the operation amount of the input side member, and thus the pivoting speed of the output side member can be relatively slow.

In the stage following the operation of the input side member when the cable is wound around the pulley, the cable is drawn by the pulley while being unwound from the pulley. The output side member is pivoted (moved) while being drawn by the cable. In this case, the drawing amount of the cable is based on the operation amount of the input side member doubled on the terminal side thereof and the abutting piece side across the pulley, and thus the pivoting speed of the output side member can be relatively fast.

In this manner, the output side member can be moved (pivoted) at an optimum rate of change (pivoting speed) with respect to the operation of the seat adjustment mechanism at the operation position of the input side member by using the extremely simple structure of the pulley provided on the input side member side and the like.

In the vehicle seat operating device of the aspect of this disclosure, it is preferable that one of the abutting portion and the abutting piece is molded into an arc shape to be convex toward the other one.

According to this configuration, the abutting portion and the abutting piece abut against each other in a state of substantial line contact, and the transmission of the force therebetween can be stabilized.

In the vehicle seat operating device of the aspect of this disclosure, it is preferable that a distance from a shaft center of the output side member to abutting parts of the abutting portion and the abutting piece is set to be shorter than a distance from a shaft center of the output side member to a shaft center of the pulley.

According to this configuration, when compared to a case where the distance from the shaft center of the output side member to the shaft center of the pulley is equal to the distance from the shaft center of the output side member to the abutting parts of the abutting portion and the abutting piece, the rate of change (pivoting speed) of the movement amount of the output side member with respect to the operation amount of the input side member can be increased by a multiplier of the value of a ratio thereof ($>1$).

In the vehicle seat operating device of the aspect of this disclosure, it is preferable that the seat adjustment mechanism have a first member that is fixed to one of a seat cushion side and a seat back side, a second member that is fixed to the other one of the seat cushion side and the seat back side and is supported in a pivotable manner by the first member, a pole whose radial-direction movement is guided by a guide groove formed in the first member, the pole having external teeth which can be engaged and disengaged with internal teeth disposed in the second member, a cam that is disposed in a pivotable manner in the first member, releases an engagement between the external teeth and the internal teeth by drawing the pole to a radial-direction inner side in an unlock operation state of pivoting in one direction, and engages the external teeth with the internal teeth by pressing the pole to a radial-direction outer side in a lock operation state of pivoting in the other direction, a biasing member that pivot-biases the cam toward a side of the lock operation, an operation member as the input side member that causes the cam to pivot to a side of the unlock operation against a biasing force of the biasing member via the output side member in the unlock operation state, and a memory ring that is disposed in a pivotable manner in an accommodating concave portion which is formed coaxially with the internal teeth in the second member in an elastic deformation state in which a diameter is reduced, the memory ring having a first unlock engagement surface that is formed on an inner circumferential surface thereof and is engaged with a pole side engaging projecting portion disposed in the pole so that the external teeth of the pole cannot be engaged with the internal teeth and a first lock engagement surface that is adjacent to the first unlock engagement surface in a circumferential direction, is formed on the inner circumferential surface, and releases the pole side engaging projecting portion so that the external teeth of the pole can be engaged with the internal teeth, being half-engaged in the radial direction at a boundary position of the first unlock engagement surface and the first lock engagement surface with respect to the pole side engaging projecting portion of the pole drawn to the radial-direction inner side in a state of a first unlock operation as the unlock operation to regulate a rise of the pole side engaging projecting portion from the first lock engagement surface toward the first unlock engagement surface, being integrally pivoted with the first member during a relative pivoting of the first member and the second member, allowing the rise of the pole side engaging projecting portion from the first lock engagement surface toward the first unlock engagement surface through a release of a radial-direction engagement with respect to the pole side engaging projecting portion in a state of a second unlock operation as the unlock operation, and being integrally pivoted with the second member during the relative pivoting of the first member and the second member which corresponds to a forward tilt of the seat back.

According to this configuration, when the boundary position of the first unlock engagement surface and the first lock engagement surface of the memory ring is positioned in the pole side engaging projecting portion of the pole, the external teeth of the pole can be engaged with the internal teeth. As such, the pole is biased by the biasing member via the cam, and the external teeth are engaged with the internal teeth. In this manner, the tilt of the seat back with respect to the seat cushion is regulated.

Also, in the state of the first unlock operation, the pole is drawn into the radial-direction inner side by the cam and the engagement between the external teeth and the internal teeth is released. In this manner, the tilt of the seat back with respect to the seat cushion is allowed. Also, in the state of the first unlock operation, the boundary position of the first unlock engagement surface and the first lock engagement surface of the memory ring is positioned in the pole side engaging projecting portion of the pole, and thus the rise of the pole side engaging projecting portion from the first lock engagement surface to the first unlock engagement surface is regulated through the radial-direction half-engagement with respect to the pole side engaging projecting portion. The memory ring is integrally pivoted with the first member in the state of relative pivoting of the first member and the second member.

In the state of the second unlock operation, the pole is drawn into the radial-direction inner side by the cam and the engagement between the external teeth and the internal teeth is released. In this manner, the tilt of the seat back with respect to the seat cushion is allowed.

In this case, the radial-direction engagement of the memory ring with respect to the pole side engaging projecting portion is released and the rise of the pole side engaging projecting portion from the first lock engagement surface to the first unlock engagement surface is allowed. Also, the relative pivoting of the pole (that is, the first member) and the memory ring corresponding to the side where the pole side engaging projecting portion rises to the first unlock engagement surface is allowed. Also, the memory ring is integrally pivoted with the second member by a frictional engagement with the second member caused by the elastic deformation of itself. In other words, in the state of the second unlock operation, the second member and the memory ring are integrally pivoted when the seat back is tilted forward from the angular position at a time of the operation.

In this case, the external teeth of the pole where the pole side engaging projecting portion rises to the first unlock engagement surface cannot be engaged with the internal teeth. In other words, in the state of the second unlock operation, the seat back whose tilt with respect to the seat cushion is allowed can be tilted forward while remaining in the allowed state.

The tilt of the seat back that is in the state where the tilt is allowed can be regulated as the first lock engagement surface reaches the pole side engaging projecting portion of the pole, that is, returns to the original angular position during the second unlock operation (hereinafter referred also to as a "memory position"). In other words, the tilt of the seat back that is tilted forward in the state of the second unlock operation is regulated as the seat back returns to the memory position in response to the release of the forward tilt. In this manner, the angular position of the seat back can be returned to the memory position.

In this case, by the speed change mechanism or the like, the possibility of a misoperation of the memory ring can be reduced by increasing the rate of change of the output side member (and the cam) that is pivoted while the operation member is changed from the state of the first unlock operation to the state of the second unlock operation.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A vehicle seat operating device comprising:
an input side member that performs an operation input;
an output side member that is moved based on an operation of the input side member to operate a seat adjustment mechanism; and
a speed change mechanism that changes a rate of change of a movement amount of the output side member with respect to an operation amount of the input side member according to an operation position of the input side member,
wherein the speed change mechanism includes:
a base member that axially supports the output side member;
a pulley that is axially supported by the output side member;
an abutting portion that is disposed in the output side member;
a cable that is hung by the pulley to turn, one terminal thereof being locked to the input side member and the other terminal thereof being locked to the base member; and
an abutting piece that is fixed to a part of the cable which extends from the pulley toward the input side member and can abut against the abutting portion in response to an increase in the operation amount of the input side member.

2. A vehicle seat operating device comprising:
an input side member that performs an operation input;
an output side member that is moved based on an operation of the input side member to operate a seat adjustment mechanism; and
a speed change mechanism that changes a rate of change of a movement amount of the output side member with respect to an operation amount of the input side member according to an operation position of the input side member,
wherein the speed change mechanism includes:
a base member that axially supports the input side member;
a pulley that is axially supported by the input side member;
an abutting portion that is disposed in the input side member;
a cable that turns to be capable of being wound around the pulley in response to an increase in the operation amount of the input side member, one terminal thereof being locked to the output side member and the other terminal thereof being locked to the base member; and
an abutting piece that is fixed to a part of the cable which extends from the pulley toward the output side member, abuts the abutting portion, and can be separated from the abutting portion in response to the increase in the operation amount of the input side member.

3. The vehicle seat operating device according to claim 2, wherein one of the abutting portion and the abutting piece is molded into an arc shape to be convex toward the other one.

4. The vehicle seat operating device according to claim 2, wherein the seat adjustment mechanism includes:
a first member that is fixed to one of a seat cushion side and a seat back side;
a second member that is fixed to the other one of the seat cushion side and the seat back side and is supported in a pivotable manner by the first member;
a pole whose radial-direction movement is guided by a guide groove formed in the first member, the pole having external teeth which can be engaged and disengaged with internal teeth disposed in the second member;
a cam that is disposed in a pivotable manner in the first member, releases an engagement between the external teeth and the internal teeth by drawing the pole to a radial-direction inner side in an unlock operation state of pivoting in one direction, and engages the external teeth with the internal teeth by pressing the pole to a radial-direction outer side in a lock operation state of pivoting in the other direction;
a biasing member that pivot-biases the cam toward a side of a lock operation;
an operation member as the input side member that causes the cam to pivot to a side of an unlock operation against a biasing force of the biasing member via the output side member in the unlock operation state; and
a memory ring that is disposed in a pivotable manner in an accommodating concave portion which is formed coaxially with the internal teeth in the second member in an elastic deformation state in which a diameter is reduced, the memory ring having a first unlock engagement surface that is formed on an inner circumferential surface thereof and is engaged with a pole side engaging projecting portion disposed in the pole so that the external teeth of the pole cannot be engaged with the internal teeth and a first lock engagement surface that is adjacent to the first unlock engagement surface in a circumferential direction, is formed on the inner circumferential surface, and releases the pole side engaging projecting portion so that the external teeth of the pole can be engaged with the internal teeth, being half-engaged in the radial direction at a boundary position of the first unlock engagement surface and the first lock engagement surface with respect to the pole side engaging projecting portion of the pole drawn to the radial-direction inner side in a state of a first unlock operation as the unlock operation to regulate a rise of the pole side engaging projecting portion from the first lock engagement surface toward the first unlock engagement surface, being integrally pivoted with the first member during a relative pivoting of the first member and the second member, allowing the rise of the pole side engaging projecting portion from the first lock engagement surface toward the first unlock engagement surface through a release of a radial-direction engagement with respect to the pole side engaging projecting portion in a state of a second unlock operation as the unlock operation, and being integrally pivoted with the second member during the relative pivoting of the first member and the second member which corresponds to a forward tilt of the seat back.

5. The vehicle seat operating device according to claim 1, wherein one of the abutting portion and the abutting piece is molded into an arc shape to be convex toward the other one.

6. The vehicle seat operating device according to claim 5, wherein the seat adjustment mechanism includes:
a first member that is fixed to one of a seat cushion side and a seat back side;
a second member that is fixed to the other one of the seat cushion side and the seat back side and is supported in a pivotable manner by the first member;
a pole whose radial-direction movement is guided by a guide groove formed in the first member, the pole having external teeth which can be engaged and disengaged with internal teeth disposed in the second member;
a cam that is disposed in a pivotable manner in the first member, releases an engagement between the external teeth and the internal teeth by drawing the pole to a radial-direction inner side in an unlock operation state of pivoting in one direction, and engages the external teeth with the internal teeth by pressing the pole to a radial-direction outer side in a lock operation state of pivoting in the other direction;
a biasing member that pivot-biases the cam toward a side of a lock operation;
an operation member as the input side member that causes the cam to pivot to a side of an unlock operation against a biasing force of the biasing member via the output side member in the unlock operation state; and
a memory ring that is disposed in a pivotable manner in an accommodating concave portion which is formed coaxially with the internal teeth in the second member in an elastic deformation state in which a diameter is reduced, the memory ring having a first unlock engagement surface that is formed on an inner circumferential surface thereof and is engaged with a pole side engaging projecting portion disposed in the pole so that the external teeth of the pole cannot be engaged with the internal teeth and a first lock engagement surface that is adjacent to the first unlock engagement surface in a circumferential direction, is formed on the inner circumferential surface, and releases the pole side engaging projecting portion so that the external teeth of the pole can be engaged with the internal teeth, being half-engaged in the radial direction at a boundary position of the first unlock engagement surface and the first lock engagement surface with respect to the pole side engaging projecting portion of the pole drawn to the radial-direction inner side in a state of a first unlock operation as the unlock operation to regulate a rise of the pole side engaging projecting portion from the first lock engagement surface toward the first unlock engagement surface, being integrally pivoted with the first member during a relative pivoting of the first member and the second member, allowing the rise of the pole side engaging projecting portion from the first lock engagement surface toward the first unlock engagement surface through a release of a radial-direction engagement with respect to the pole side engaging projecting portion in a state of a second unlock operation as the unlock operation, and being integrally pivoted with the second member during the relative pivoting of the first member and the second member which corresponds to a forward tilt of the seat back.

7. The vehicle seat operating device according to claim 1, wherein a distance from a shaft center of the output side member to abutting parts of the abutting portion and the abutting piece is set to be shorter than a distance from a shaft center of the output side member to a shaft center of the pulley.

8. The vehicle seat operating device according to claim 7, wherein the seat adjustment mechanism includes:
a first member that is fixed to one of a seat cushion side and a seat back side;
a second member that is fixed to the other one of the seat cushion side and the seat back side and is supported in a pivotable manner by the first member;
a pole whose radial-direction movement is guided by a guide groove formed in the first member, the pole having external teeth which can be engaged and disengaged with internal teeth disposed in the second member;
a cam that is disposed in a pivotable manner in the first member, releases an engagement between the external teeth and the internal teeth by drawing the pole to a radial-direction inner side in an unlock operation state of pivoting in one direction, and engages the external teeth with the internal teeth by pressing the pole to a radial-direction outer side in a lock operation state of pivoting in the other direction;
a biasing member that pivot-biases the cam toward a side of a lock operation;
an operation member as the input side member that causes the cam to pivot to a side of an unlock operation against a biasing force of the biasing member via the output side member in the unlock operation state; and
a memory ring that is disposed in a pivotable manner in an accommodating concave portion which is formed coaxially with the internal teeth in the second member in an elastic deformation state in which a diameter is reduced, the memory ring having a first unlock engagement surface that is formed on an inner circumferential surface thereof and is engaged with a pole side engaging projecting portion disposed in the pole so that the external teeth of the pole cannot be engaged with the internal teeth and a first lock engagement surface that is adjacent to the first unlock engagement surface in a circumferential direction, is formed on the inner circumferential surface, and releases the pole side engaging projecting portion so that the external teeth of the pole can be engaged with the internal teeth, being half-engaged in the radial direction at a boundary position of the first unlock engagement surface and the first lock engagement surface with respect to the pole side engaging projecting portion of the pole drawn to the radial-direction inner side in a state of a first unlock operation as the unlock operation to regulate a rise of the pole side engaging projecting portion from the first lock engagement surface toward the first unlock engagement surface, being integrally pivoted with the first member during a relative pivoting of the first member and the second member, allowing the rise of the pole side engaging projecting portion from the first lock engagement surface toward the first unlock engagement surface through a release of a radial-direction engagement with respect to the pole side engaging projecting portion in a state of a second unlock operation as the unlock operation, and being integrally pivoted with the second member during the relative pivoting of the first member and the second member which corresponds to a forward tilt of the seat back.

9. The vehicle seat operating device according to claim 1, wherein the seat adjustment mechanism includes:
a first member that is fixed to one of a seat cushion side and a seat back side;
a second member that is fixed to the other one of the seat cushion side and the seat back side and is supported in a pivotable manner by the first member;
a pole whose radial-direction movement is guided by a guide groove formed in the first member, the pole having external teeth which can be engaged and disengaged with internal teeth disposed in the second member;
a cam that is disposed in a pivotable manner in the first member, releases an engagement between the external teeth and the internal teeth by drawing the pole to a radial-direction inner side in an unlock operation state of pivoting in one direction, and engages the external teeth with the internal teeth by pressing the pole to a radial-direction outer side in a lock operation state of pivoting in the other direction;
a biasing member that pivot-biases the cam toward a side of a lock operation;
an operation member as the input side member that causes the cam to pivot to a side of an unlock operation against a biasing force of the biasing member via the output side member in the unlock operation state; and
a memory ring that is disposed in a pivotable manner in an accommodating concave portion which is formed coaxially with the internal teeth in the second member in an elastic deformation state in which a diameter is reduced, the memory ring having a first unlock engagement surface that is formed on an inner circumferential surface thereof and is engaged with a pole side engaging projecting portion disposed in the pole so that the external teeth of the pole cannot be engaged with the internal teeth and a first lock engagement surface that is adjacent to the first unlock engagement surface in a circumferential direction, is formed on the inner circumferential surface, and releases the pole side engaging projecting portion so that the external teeth of the pole can be engaged with the internal teeth, being half-engaged in the radial direction at a boundary position of the first unlock engagement surface and the first lock engagement surface with respect to the pole side engaging projecting portion of the pole drawn to the radial-direction inner side in a state of a first unlock operation as the unlock operation to regulate a rise of the pole side engaging projecting portion from the first lock engagement surface toward the first unlock engagement surface, being integrally pivoted with the first member during a relative pivoting of the first member and the second member, allowing the rise of the pole side engaging projecting portion from the first lock engagement surface toward the first unlock engagement surface through a release of a radial-direction engagement with respect to the pole side engaging projecting portion in a state of a second unlock operation as the unlock operation, and being integrally pivoted with the second member during the relative pivoting of the first member and the second member which corresponds to a forward tilt of the seat back.

* * * * *